(12) United States Patent
Kahn et al.

(10) Patent No.: US 7,979,281 B2
(45) Date of Patent: Jul. 12, 2011

(54) METHODS AND SYSTEMS FOR CREATING A SECOND GENERATION SESSION FILE

(75) Inventors: Jonathan Kahn, Crown Point, IN (US); Michael C. Huttinger, Valparaiso, IN (US); William Harbison, II, Valparaiso, IN (US)

(73) Assignee: Custom Speech USA, Inc., Terre Haute, IN (US)

( * ) Notice: Subject to any disclaimer, the term of this patent is extended or adjusted under 35 U.S.C. 154(b) by 231 days.

(21) Appl. No.: 10/554,774

(22) PCT Filed: Apr. 29, 2004

(86) PCT No.: PCT/US2004/013348
§ 371 (c)(1), (2), (4) Date: Nov. 10, 2006

(87) PCT Pub. No.: WO2004/097791
PCT Pub. Date: Nov. 11, 2004

(65) Prior Publication Data
US 2007/0106508 A1    May 10, 2007

Related U.S. Application Data

(60) Provisional application No. 60/466,512, filed on Apr. 29, 2003.

(51) Int. Cl.
*G10L 21/00* (2006.01)
*G10L 11/00* (2006.01)
*G10L 15/00* (2006.01)

(52) U.S. Cl. .................. 704/270; 704/211; 704/231
(58) Field of Classification Search .................. None
See application file for complete search history.

(56) References Cited

U.S. PATENT DOCUMENTS

| | | | | | |
|---|---|---|---|---|---|
| 4,627,001 | A | * | 12/1986 | Stapleford et al. | 704/260 |
| 4,779,209 | A | * | 10/1988 | Stapleford et al. | 704/278 |
| 5,572,625 | A | * | 11/1996 | Raman et al. | 704/260 |
| 5,649,060 | A | * | 7/1997 | Ellozy et al. | 704/278 |
| 5,799,273 | A | * | 8/1998 | Mitchell et al. | 704/235 |
| 5,850,629 | A | * | 12/1998 | Holm et al. | 704/260 |
| 5,960,447 | A | * | 9/1999 | Holt et al. | 715/201 |
| 6,076,059 | A | * | 6/2000 | Glickman et al. | 704/260 |
| 6,122,614 | A | | 9/2000 | Kahn et al. | |
| 6,260,011 | B1 | | 7/2001 | Heckerman et al. | |
| 6,263,308 | B1 | | 7/2001 | Heckerman et al. | |
| 6,513,003 | B1 | | 1/2003 | Angell et al. | |

* cited by examiner

*Primary Examiner* — David R Hudspeth
*Assistant Examiner* — Brian L Albertalli
(74) *Attorney, Agent, or Firm* — Loeb & Loeb LLP

(57) ABSTRACT

The present disclosure provides a speech editor for creating a session file having text segments synchronized with an audio file. The editor receives a text segment and a first file that has tag information lines associated with the text segment. Each tag information line has a portion of original text transcribed from the audio file and a corresponding audio length value. The editor stores the audio length of a current line in a new tag information line for the second file, determines whether the original text portion of the current line is found in the text segment, and if the original text portion of the current line is not found in the text segment, identifies a corrected text of the text segment adjusting the audio length of the new tag information line of the session file to correspond to the corrected text.

20 Claims, 39 Drawing Sheets

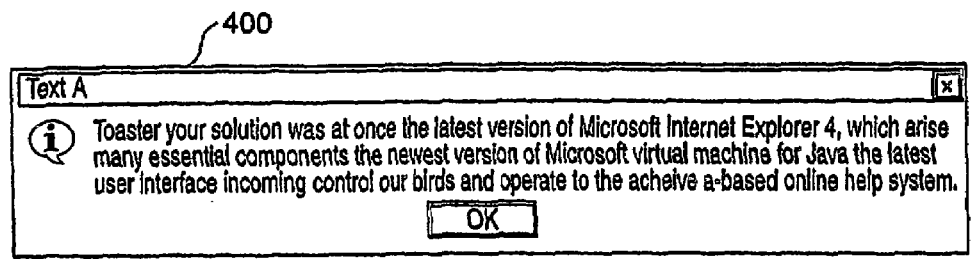
FIG. 4  Text A window.
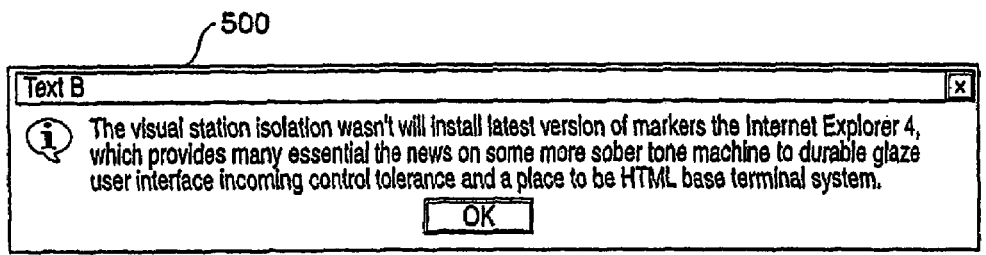
FIG. 5  Text B window.

FIG. 9

Document 1--Initial Visit

History and Physical

Patient Name: Henry Russell
Date of Birth: June 14, 1952
Medical Record Number: 456-61-6385
Chief Complaint: Epigastric pain
Patient Encounter: Initial Evaluation/Morrison Outpatient Center
Examination Date: June 17, 2002
Referring Physician: Dr. Albert Block
Examining Physician: Dr. Henry M. Steele History: Mr Russell is a 50 year old white male referred to me for intermittent epigastric pain. He self medicated with several over the counter drugs including Mylanta and Tagamet for several weeks before seeing his primary physician Dr. Block in late May. History and physical showed no significant abnormality. CBC and stool for occult blood was negative. Upper GI showed slight prominence of the gastric folds, suggestive of gastritis. Patient was referred for further evaluation. Patient complains of continued symptoms. He is otherwise in good health. Review of systems is noncontributory. He has no allergies and denies smoking, coffee, alcohol, or drug use.

On examination: Well developed, well nourished male. No acute distress. Oriented times 3. Vital signs are stable.

Head: Head normocephalic. Pupils equally round and reactive to light with accommodation. Hearing normal. Ears, nose, and throat not evaluated.

Neck: Supple. No significant adenopathy.

Chest: Lungs clear to auscultation and percussion. Heart sounds normal with no murmurs or rubs. Normal sinus rhythm.

Abdomen: Normal bowel sounds. Nontender. No palpable masses.

Rectum: Negative for occult blood. Prostate negative for masses.

Extremities: No cyanosis, clubbing, or edema. Old gunshot wound entry site right upper arm.

Neurological: Cranial nerves 2-12 intact.

Assessment and Plan: Continue with over the counter medications on an as needed basis. Prilosec, 20 milligrams, one tab per day times 7 days. Followup office visit in 1 week.

*FIG. 16*

Document 2--Second Visit
History and Physical

Patient Name: Henry Russell
Date of Birth: June 14, 1952
Medical Record Number: 456-61-6385
Chief Complaint: Epigastric pain
Patient Encounter: Followup/Morrison Outpatient Center
Examination Date: June 24, 2002
Referring Physician: Dr. Albert Block
Examining Physician: Dr. Henry M. Steele History: Mr Russell is a 50 year old white male referred to me for intermittent epigastric pain. He self medicated with several over the counter drugs including Mylanta and Tagamet for several weeks before seeing his primary physician Dr. Block in late May. History and physical showed no significant abnormality. CBC and stool for occult blood was negative. Upper GI showed slight prominence of the gastric folds, suggestive of gastritis. Patient was referred for further evaluation. Patient complains of continued symptoms. He is otherwise in good health. Review of systems is noncontributory. He has no allergies and denies smoking, coffee, alcohol, or drug use. After one week course of proton inhibitors he has no complaints.

On examination: Well developed, well nourished male. No acute distress. Oriented times 3. Vital signs are stable.

Head: Head normocephalic. Pupils equally round and reactive to light with accommodation. Hearing normal. Ears, nose, and throat not evaluated.

Neck: Supple. No significant adenopathy.

Chest: Lungs clear to auscultation and percussion. Heart sounds normal with no murmurs or rubs. Normal sinus rhythm.

Abdomen: Normal bowel sounds. Nontender. No palpable masses.

Rectum: Not examined.

Extremities: No cyanosis, clubbing, or edema. Old gunshot wound entry site right upper arm.

Neurological: Cranial nerves 2-12 intact.

Assessment and Plan: Continue with over the counter medications on an as needed basis. Return visit if required.

*FIG. 17*

History and Physical

Patient Name:
Date of Birth:
Medical Record Number:
Chief Complaint:
Patient Encounter:
Examination Date:
Referring Physician:
Examining Physician:

History:

On examination:

Head:

Neck:

Chest:

Abdomen:

Rectum:

Extremities:

Neurological:

Assessment and Plan:

FIG. 22     2200

History and physical

Patient name: blank
Date of birth: blank
Medical record number: blank
Chief complaint: blank
Patient encounter: blank
Examination date: blank
Referring physician: blank
Examining physician: blank History: blank On examination: blank Head: blank Neck: blank Chest: blank Abdomen: blank Rectum: blank Extremities: blank Neurological: blank Assessment and plan: blank

FIG. 24 

History and Physical

Patient Name: Henry Russell
Date of Birth: June 14, 1952
Medical Record Number: 456-61-6385
Chief Complaint: Epigastric pain
Patient Encounter: Followup Morrison Outpatient Center
Examination Date: June 24, 2002
Referring Physician: Dr. Albert Block
Examining Physician: Dr. Henry M. Steele History: Mr. Russell is a 50 year old white male referred to me for intermittent epigastric pain. He self medicated with several over the counter drugs including Mylanta and Tagamet for several weeks before seeing his primary physician Dr. Block in late May. History and physical showed no significant abnormality. CBC and stool for occult blood was negative. Upper GI showed slight prominence of the gastric folds, suggestive of gastritis. Patient was referred for further evaluation. Patient complains of continued symptoms. He is otherwise in good health. Review of systems is noncontributory. He has no allergies and denies smoking, coffee, alcohol, or drug use. After one week course of proton inhibitors he has no complaints.

On examination: Well developed, well nourished male. No acute distress. Oriented times 3. Vital signs are stable peer.

Head: Head normocephalic. Pupils equally round and reactive to light with accomodation. Hearing normal. Ears, nose, and throat not evaluated.

Neck: Supple. No significant adenopathy.

Chest: Lungs clear to auscultation and percussion. Heart sounds normal with no murmurs or rubs. Normal sinus rhythm.

Abdomen: Normal bowel sounds. Nontender. No palpable masses.

Rectum: Not examined.

Extremities: No cyanosis, clubbing, or edema. Old gunshot wound entry site right upper arm.

Neurological: Cranial nerves 2-12 intact.

Assessment and Plan: Continue with over the counter medications on an as needed basis. Return visit if required.

FIG. 26 

History and physical

Patient name: Henry Russell
Date of birth: June 14, 1952
Medical record number: 456-61-6385
Chief complaint: Epigastric pain
Patient encounter: Initial Evaluation/Morrison Outpatient Center
Examination date: June 17, 2002
Referring physician: Dr. Albert Block
Examining physician: Dr. Henry M. Steele History: Mr. Russell is a 50 year old white male referred to me for intermittent epigastric pain. He self medicated with several over the counter drugs including Mylanta and Tagamet for several weeks before seeing his primary physician Dr. Block in late May. History and physical showed no significant abnormality. CBC and stool for occult blood was negative. Upper GI showed slight prominence of the gastric folds, suggestive of gastritis. Patient was referred for further evaluation. Patient complains of continued symptoms. He is otherwise in good health. Review of systems is noncontributory. He has no allergies and denies smoking, coffee, alcohol, or drug use.

On examination: Well developed, well nourished male. No acute distress. Oriented times 3. Vital signs are stable.

Head: Head normocephalic. Pupils equally round and reactive to light with accomodation. Hearing normal. Ears, nose, and throat not evaluated.

Neck: Supple. No significant adenopathy.

Chest: Lungs clear to auscultation and percussion. Heart sounds normal with no murmurs or rubs. Normal sinus rhythm.

Abdomen: Normal bowel sounds. Nontender. No palpable masses.

Rectum: Negative for occult blood. Prostate negative for masses.

Extremities: No cyanosis, clubbing, or edema. Old gunshot wound entry site right upper arm.

Neurological: Cranial nerves 2-12 intact.

Assessment and plan: Continue with over the counter medications on an as needed basis. Prilosec, 20 milligrams, one tab per day times 7 days. Followup office visit in 1 week.

METHODS AND SYSTEMS FOR CREATING A SECOND GENERATION SESSION FILE

CROSS-REFERENCE TO RELATED APPLICATIONS

The present application is a U.S. national phase application based on International Application No. PCT/US2004/013348, filed Apr. 29, 2004, incorporated herein to the extent permitted by law, which claims the benefit of the following applications:

U.S. Non-Provisional application Ser. No. 09/889,870, filed Jul. 23, 2001, which claims the benefits of U.S. Provisional Application No. 60/118,949, filed Feb. 5, 1999, through PCT Application No. PCT/US00/0280, filed Feb. 4, 2000, each application of which is incorporated by reference to the extent permitted by law;

U.S. Non-Provisional application Ser. No. 09/889,398, filed Feb. 18, 2000, which claims the benefits of U.S. Provisional Application No. 60/120,997, filed Feb. 19, 1999, each application of which is incorporated by reference to the extent permitted by law;

U.S. Non-Provisional application Ser. No. 09/362,255, filed Jul. 27, 1999, U.S. Pat. No. 6,490,558, issued Dec. 3, 2002, which application is incorporated by reference to the extent permitted by law;

U.S. Non-Provisional application Ser. No. 09/430,144, filed Oct. 29, 1999, U.S. Pat. No. 6,421,643, issued Jul. 16, 2002, which application is incorporated by reference to the extent permitted by law;

U.S. Non-Provisional application Ser. No. 09/625,657, filed Jul. 26, 2000, U.S. Pat. No. 6,704,709, issued Mar. 9, 2004, which claims the benefits of U.S. Provisional Application No. 60/208,878, filed Jun. 1, 2000, each application of which is incorporated by reference to the extent permitted by law;

PCT Application No. PCT/US01/1760, filed May 31, 2001 which claims the benefits of U.S. Provisional Application No. 60/208,994, filed Jun. 1, 2000, each application of which is incorporated by reference to the extent permitted by law;

U.S. Non-Provisional application Ser. No. 09/995,892 filed Nov. 28, 2001, which claims the benefits of U.S. Provisional Application No. 60/253,632, filed Nov. 28, 2000, each application of which is incorporated by reference to the extent permitted by law;

U.S. Non-Provisional application Ser. No. 10/014677, filed Dec. 11, 2001, which claims the benefits of U.S. Provisional Application Nos. 60/118,949, filed Feb. 5, 1999; 60/120,997, filed Feb. 19, 1999; 60/208,878, filed Jun. 1, 2000; 60/208,994, filed Jun. 1, 2000; and 60/253,632, filed Nov. 28, 2000, each application of which is incorporated by reference to the extent permitted by law;

PCT Application No. PCT/US03/17414, filed May 30, 2003 which claims the benefits of U.S. Provisional Application No. 60/384,540, filed May 30, 2002, each application of which is incorporated by reference to the extent permitted by law;

PCT Application No. PCT/US03/20185, filed Jun. 26, 2003 which claims the benefits of U.S. Provisional Application No. 60/391,740, filed Jun. 26, 2002, each application of which is incorporated by reference to the extent permitted by law; and U.S. Provisional Application Ser. No. 60/466,512, filed on Apr. 29, 2003, which is incorporated herein by reference to the extent permitted by law.

BACKGROUND OF THE INVENTION

1. Field of the Invention

The present invention relates to speech recognition and creation of a second generation session file for text that has been corrected using a software speech editor.

2. Background Information

Speech recognition programs that automatically convert speech into text have been under continuous development since the 1980s. The first programs required the speaker to speak with clear pauses between each word to help the program separate one word from the next. One example of such a program was DragonDictate, a discrete speech recognition program originally produced by Dragon Systems, Inc. (Newton, Mass.).

In 1994, Philips Dictation Systems of Vienna, Austria introduced the first commercial, continuous speech recognition system. See, Judith A. Markowitz, Using Speech Recognition (1996), pp. 200-06. Currently, the two most widely used off-the-shelf continuous speech recognition programs are Dragon NaturallySpeaking™ (now produced by ScanSoft, Inc., Peabody, Mass.) and IBM ViaVoice™ (manufactured by IBM, Armonk, N.Y.). The focus of the off-the-shelf Dragon NaturallySpeaking™ and IBM ViaVoice™ products has been direct dictation into the computer and correction by the user of misrecognized text. Both the Dragon NaturallySpeaking™ and IBM ViaVoice™ programs are available in a variety of languages and versions and have a software development kit ("SDK") available for independent speech vendors.

Conventional continuous speech recognition programs are speaker dependent and require creation of an initial speech user profile by each speaker. This "enrollment" generally takes about a half-hour for each user. It usually includes calibration, text reading (dictation), and vocabulary selection. With calibration, the speaker adjusts the microphone output to insure adequate audio signal and minimal background noise. Then the speaker dictates a standard text provided by the program into a microphone connected to a handheld recorder or computer. The speech recognition program correlates the spoken word with the pre-selected text excerpt. It uses the correlation to establish an initial speech user profile based on that user's speech characteristics.

If the speaker uses different types of microphones or handheld recorders, an enrollment must be completed for each since the acoustic characteristics of each input device differ substantially. In fact, it is recommended a separate enrollment be performed on each computer having a different manufacturer's or type of sound card because the different characteristics of the analog to digital conversion may substantially affect recognition accuracy. For this reason, many speech recognition manufacturers advocate a speaker's use of a single microphone that can digitize the analog signal external to the sound card, thereby obviating the problem of dictating at different computers with different sound cards.

Finally, the speaker must specify the reference vocabulary that will be used by the program in selecting the words to be transcribed. Various vocabularies like "General English," "Medical," "Legal," and "Business" are usually available. Sometimes the program can add additional words from the user's documents or analyze these documents for word use frequency. Adding the user's words and analyzing the word use pattern can help the program better understand what words the speaker is most likely to use.

Once enrollment is completed, the user may begin dictating into the speech recognition program or applications such as conventional word processors like MS Word™ (Microsoft Corporation, Redmond, Wash.) or Wordperfect™ (Corel Corporation, Ottawa, Ontario, Canada). Recognition accuracy is often low, for example, 60-70%. To improve accuracy, the user may repeat the process of reading a standard text provided by the speech recognition program. The speaker may also select a word and record the audio for that word into the speech recognition program. In addition, written-spokens may be created. The speaker selects a word that is often incorrectly transcribed and types in the word's phonetic pronunciation in a special speech recognition window.

Most commonly, "corrective adaptation" is used whereby the system learns from its mistakes. The user dictates into the system. It transcribes the text. The user corrects the misrecognized text in a special correction window. In addition to seeing the transcribed text, the speaker may listen to the aligned audio by selecting the desired text and depressing a play button provided by the speech recognition program. Listening to the audio, the speaker can make a determination as to whether the transcribed text matches the audio or whether the text has been misrecognized. With repeated correction, system accuracy often gradually improves, sometimes up to as high as 95-98%. Even with 90% accuracy, the user must correct about one word a sentence, a process that slows down a busy dictating lawyer, physician, or business user. Due to the long training time and limited accuracy, many users have given up using speech recognition in frustration. Many current users are those who have no other choice, for example, persons who are unable to type, such as paraplegics or patients with severe repetitive stress disorder.

In the correction process, whether performed by the speaker or editor, it is important that verbatim text is used to correct the misrecognized text. Correction using the wrong word will incorrectly "teach" the system and result in decreased accuracy. Very often the verbatim text is substantially different from the final text for a printed report or document. Any experienced transcriptionist will testify as to the frequent required editing of text to correct errors that the speaker made or other changes necessary to improve grammar or content. For example, the speaker may say "left" when he or she meant "right," or add extraneous instructions to the dictation that must be edited out, such as, "Please send a copy of this report to Mr. Smith." Consequently, the final text can often not be used as verbatim text to train the system.

With conventional speech recognition products, generation of verbatim text by an editor during "delegated correction" is often not easy or convenient. First, after a change is made in the speech recognition text processor, the audio-text alignment in the text may be lost. If a change was made to generate a final report or document, the editor does not have an easy way to play back the audio and hear what was said. Once the selected text in the speech recognition text window is changed, the audio text alignment may not be maintained. For this reason, the editor often cannot select the corrected text and listen to the audio to generate the verbatim text necessary for training. Second, current and previous versions of off-the-shelf Dragon NaturallySpeaking™ and IBM ViaVoice™ SDK programs, for example, do not provide separate windows to prepare and separately save verbatim text and final text. If the verbatim text is entered into the text processor correction window, this is the text that appears in the application window for the final document or report, regardless of how different it is from the verbatim text. Similar problems may be found with products developed by independent speech vendors using, for example, the IBM ViaVoice™ speech recognition engine and providing for editing in commercially available word processors such as Word™ or WordPerfect™.

Another problem with conventional speech recognition programs is the large size of the session files. As noted above, session files include text and aligned audio. By opening a session file, the text appears in the application text processor window. If the speaker selects a word or phrase to play the associated audio, the audio can be played back using a hot key or button. For Dragon NaturallySpeaking™ and IBM ViaVoice™ SDK session files, the session files reach about a megabyte for every minute of dictation. For example, if the dictation is 30 minutes long, the resulting session file will be approximately 30 megabytes. These files cannot be substantially compressed using standard software techniques. Even if the task of correcting a session file could be delegated to an editor in another city, state, or country, there would be substantial bandwidth problems in transmitting the session file for correction by that editor. The problem is obviously compounded if there are multiple, long dictations to be sent. Until sufficient high-speed Internet connection or other transfer protocol comes into existence, it may be difficult to transfer even a single dictation session file to a remote editor. A similar problem would be encountered in attempting to implement the remote editing features using the standard session files available in the Dragon NaturallySpeaking™ and IBM ViaVoice™ SDK.

Another limitation concerns completion of forms using speech recognition. Currently, there are a variety of structured reporting formats available to the speech recognition user. These systems generally use a "fill-in-the-blank" format. The dictating user views a standard form displayed on the monitor, and skips from blank to blank, dictating the word or phrase to complete the form. This dictation is transcribed using real-time speech recognition, and the user usually can correct mistakes that the speech engine makes. At the end of the process, the user has a transcribed report or document that has been completed using a standard template. This type of structured reporting system requires that the user view the form on the screen and dictate directly into a microphone attached to the computer. Among other potential disadvantages, this approach is not practical for dictation and form completion using a telephone, handheld recorder, or other portable device. In these settings, the standard template typically is not displayed on a computer monitor, and the "blank" to be completed that corresponds to the audio cannot be selected by the user.

Accordingly, it is an object of the present invention to provide a system that offers training of the speech recognition program transparent to the end-users by performing an enrollment for them. It is an associated object to develop condensed session files for rapid transmission to remote editors. An additional associated object is to develop a convenient system for generation of verbatim text for speech recognition training through use of multiple linked windows in a text processor. It is another associated object to facilitate speech recognition training by use of a word mapping system for transcribed and verbatim text that has the effect of permanently aligning the audio with the verbatim text. Another associated object is to use speech recognition and text comparison to permit speakers to dictate into a telephone, handheld recorder, or other device without having to view the form on a screen, and to use comparison with a previously created form to speed up the back end completion of the report or document by a transcription editor for the busy dictating user.

These and other objects will be apparent to those of ordinary skill in the art having the present drawings, specifications, and claims before them.

SUMMARY OF THE INVENTION

In accordance with methods consistent with the present invention, a method is provided for creating a second file having text segments synchronized with an audio file. The method comprises: (a) receiving a text segment and a first file associated with the text segment. The first file includes an audio file and at least one tag information line. Each tag information line contains a respective portion of original text transcribed from the audio file and an audio length value reflecting time elapsed in the audio file corresponding to the respective original text portion. The method further comprises (b) identifying a current tag as a first of the at least one tag information lines; (c) storing the audio length value from the current tag in a new tag information line of the second file; (d) determining whether the original text portion of the current tag is found in the text segment; and (e) when it is determined that the original text portion of the current tag is not found in the text segment, identifying a corrected text of the text segment and adjusting the audio length value of the new tag information line of the second file to reflect time elapsed in the audio file corresponding to the corrected text.

In one embodiment, the method further comprises, (f) when it is determined that the original text portion of the current tag is found in the text segment, identifying a next of the least one tag information lines as the current tag; (g) when it is determined that the original text portion of the current tag is not found in the text segment, identifying a next of the least one tag information lines that has a respective original text portion found in the text segment as the current tag; and (h) repeating (c) through (g) until the first file has no more tag information lines.

In accordance with methods consistent with the present invention, a method is provided for creating a final text from an audio file. The method comprises: receiving a preexisting file formed by: (a) receiving a text segment and a first file associated with the text segment, the first file including an audio file and at least one tag information line, each tag information line containing a respective portion of original text transcribed from the audio file and an audio length value reflecting time elapsed in the audio file corresponding to the respective original text portion; (b) identifying a current tag as a first of the at least one tag information lines; (c) storing the audio length value from the current tag in a new tag information line of the preexisting file; (d) determining whether the original text portion of the current tag is found in the text segment; (e) when it is determined that the original text portion of the current tag is not found in the text segment, identifying a corrected text of the text segment, storing the corrected text in the new tag information line of the preexisting file, adjusting the audio length value of the new tag information line of the preexisting file to reflect time elapsed in the audio file corresponding to the corrected text, and identifying a next of the least tag information lines that has a respective original text portion found in the text segment as the current tag; (f) when it is determined that the original text portion of the current tag is found in the text segment, storing the original text portion of the current tag in the new tag information line of the preexisting file and identifying a next of the least tag information lines as the current tag; and (g) repeating (b) through (f) until the first file has no more tag information lines. The method further comprises creating a first text file from the tag information lines of the preexisting file; comparing the first text file with a previously created text file to determine differences between the first text file and the previously created text file, where the previously created text file corresponds to a form; and correcting one of the first text file or the previously created text file based upon the differences to create the final text.

In one embodiment, correcting includes playing back a portion of the audio file corresponding to one of the corrected texts in the preexisting file in response to a user selection of any portion of the one corrected text.

In accordance with articles of manufacture consistent with the present invention, a computer-readable medium containing instructions that cause a data processing system having a speech editor to perform a method for creating a second file having text segments synchronized with an audio file is provided. The method comprises: (a) receiving a text segment and a first file associated with the text segment. The first file includes an audio file and at least one tag information line. Each tag information line contains a respective portion of original text transcribed from the audio file and an audio length value reflecting time elapsed in the audio file corresponding to the respective original text portion. The method further comprises (b) identifying a current tag as a first of the at least one tag information lines; (c) storing the audio length value from the current tag in a new tag information line of the second file; (d) determining whether the original text portion of the current tag is found in the text segment; and (e) when it is determined that the original text portion of the current tag is not found in the text segment, identifying a corrected text of the text segment and adjusting the audio length value of the new tag information line of the second file to reflect time elapsed in the audio file corresponding to the corrected text.

In one embodiment, the method further comprises, (f) when it is determined that the original text portion of the current tag is found in the text segment, identifying a next of the least one tag information lines as the current tag; (g) when it is determined that the original text portion of the current tag is not found in the text segment, identifying a next of the least one tag information lines that has a respective original text portion found in the text segment as the current tag; and (h) repeating (c) through (g) until the first file has no more tag information lines.

In accordance with articles of manufacture consistent with the present invention, a computer-readable medium containing instructions that cause a data processing system having a speech editor to perform a method for creating a final text from an audio file. The method comprises: receiving a preexisting file formed by: (a) receiving a text segment and a first file associated with the text segment, the first file including an audio file and at least one tag information line, each tag information line containing a respective portion of original text transcribed from the audio file and an audio length value reflecting time elapsed in the audio file corresponding to the respective original text portion; (b) identifying a current tag as a first of the at least one tag information lines; (c) storing the audio length value from the current tag in a new tag information line of the preexisting file; (d) determining whether the original text portion of the current tag is found in the text segment; (e) when it is determined that the original text portion of the current tag is not found in the text segment, identifying a corrected text of the text segment, storing the corrected text in the new tag information line of the preexisting file, adjusting the audio length value of the new tag information line of the preexisting file to reflect time elapsed in the audio file corresponding to the corrected text, and identifying a next of the least tag information lines that has a respective original text portion found in the text segment as the current tag; (f) when it is determined that the original text portion of the current tag is found in the text segment, storing the original text portion of the current tag in the new tag information line of the preexisting file and identifying a next of the least tag information lines as the current tag; and (g) repeating (b) through (f) until the first file has no more tag information lines. The method further comprises creating a first text file from the tag information lines of the preexisting file; comparing the first text file with a previously created text file to determine differences between the first text file and the previously created text file, where the previously created text file corresponds to a form; and correcting one of the first text file or the previously created text file based upon the differences to create the final text.

In one embodiment, correcting includes playing back a portion of the audio file corresponding to one of the corrected texts in the preexisting file in response to a user selection of any portion of the one corrected text.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

FIG. 4 illustrates a text A 400;

FIG. 5 illustrates a text B 500;

FIG. 9 of the drawings is a view of an exemplary graphical user interface 900 to support the present invention;

FIG. 16 is an example of a previously created text file;

FIG. 17 is an example of a corrected text file created by comparing a transcribed text file with a previously corrected text file;

FIG. 22 is an example of a modified report form 2200 designed to facilitate rapid detection of differences and form completion;

FIG. 24 is an example of a completed form created by comparing the speech recognition text with the modified report form according to the present invention;

FIG. 26 is an example of an initial report form that has prior transcribed text designed to facilitate rapid detection of differences with subsequent transcribed text in accordance with the present invention;

DETAILED DESCRIPTION OF THE INVENTION

While the present invention may be embodied in many different forms, the drawings and discussion are presented with the understanding that the present disclosure is an exemplification of the principles of the invention and is not intended to limit the invention to the embodiments illustrated.

I. System 100

Figure 1:
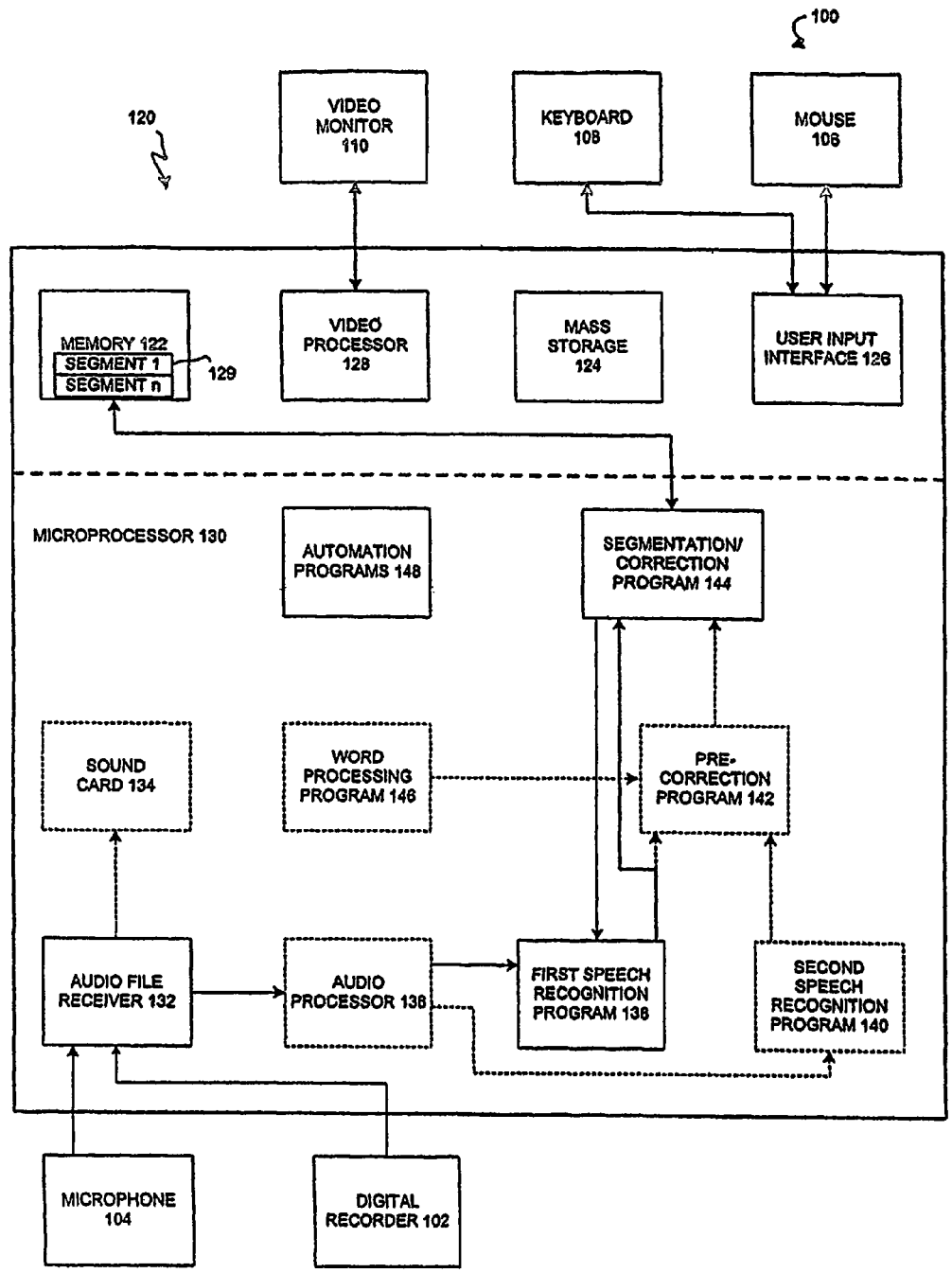
FIG. 1 is a block diagram of one potential embodiment of a system 100.

FIG. 1 is a block diagram of one potential embodiment of a system 100. The system 100 may be part of a speech recognition system of the invention. Alternatively, the speech recognition system of the invention may be employed as part of the system 100.

The system 100 may include input/output devices, such as a digital recorder 102, a microphone 104, a mouse 106, a keyboard 108, and a video monitor 110. The microphone 104 may include, but not be limited to, microphone on a telephone. Moreover, the system 100 may include a computer 120. As a machine that performs calculations automatically, the computer 120 may include input and output (I/O) devices, memory, and a central processing unit (CPU).

Preferably the computer 120 is a general-purpose computer, although the computer 120 may be a specialized computer dedicated to a speech recognition program (sometimes "speech engine"). In one embodiment, the computer 120 may be controlled by the WINDOWS 9.x operating system. It is contemplated, however, that the system 100 would work equally well using a MACINTOSH operating system or even another operating system such as a WINDOWS CE, UNIX or a JAVA™ based operating system, to name a few.

In one arrangement, the computer 120 includes a memory 122, a mass storage 124, a speaker input interface 126, a video processor 128, and a microprocessor 130. The memory 122 may be any device that can hold data in machine-readable format or hold programs and data between processing jobs in memory segments 129 such as for a short duration (volatile) or a long duration (non-volatile). Here, the memory 122 may include or be part of a storage device whose contents are preserved when its power is off.

The mass storage 124 may hold large quantities of data through one or more devices, including a hard disc drive (HDD), a floppy drive, and other removable media devices such as a CD-ROM drive, DITTO™, ZIP™ or JAZ™ drive (from Iomega Corporation of Roy, Utah).

The microprocessor 130 of the computer 120 may be an integrated circuit that contains part, if not all, of a central processing unit of a computer on one or more chips. Examples of single chip microprocessors include the Intel Corporation Pentium™, AMD K6, Compaq Digital Alpha, or Motorola 68000 and Power PC series. In one embodiment, the microprocessor 130 includes an audio file receiver 132, a sound card 134, and an audio preprocessor 136.

In general, the audio file receiver 132 may function to receive a pre-recorded audio file, such as from the digital recorder 102 or an audio file in the form of live, stream speech from the microphone 104. Examples of the audio file receiver 132 include a digital audio recorder, an analog audio recorder, or a device to receive computer files through a data connection, such as those that are on magnetic media. The sound card 134 may include the functions of one or more sound cards produced by, for example, Creative Labs, Trident, Diamond, Yamaha, Guillemot, NewCom, Inc., Digital Audio Labs, and Voyetra Turtle Beach, Inc.

Generally, an audio file can be thought of as a ".WAV" file. Waveform (wav) is a sound format developed by Microsoft and used extensively in Microsoft Windows. Conversion tools are available to allow most other operating systems to play .wav files. .wav files are also used as the sound source in wave table synthesis, e.g. in E-mu's SoundFont. In addition, some Musical Instrument Digital Interface (MIDI) sequencers as add-on audio also support .wav files. That is, pre-recorded .wav files may be played back by control commands written in the sequence script.

A ".WAV" file may be originally created by any number of sources, including digital audio recording software; as a byproduct of a speech recognition program; or from a digital audio recorder. Other audio file formats, such as MP2, MP3, RAW, CD, MOD, MIDI, AIFF, mu-law, WMA, or DSS, may be used to format the audio file, without departing from the spirit of the present invention.

The microprocessor 130 may also include at least one speech recognition program, such as a first speech recognition program 138 and a second speech recognition program 140. Preferably, the first speech recognition program 138 and the second speech recognition program 140 would transcribe the same audio file to produce two transcription files that are more likely to have differences from one another. The invention may exploit these differences to develop corrected text.

In one embodiment, the first speech recognition program 138 may be Dragon NaturallySpeaking™ and the second speech recognition program 140 may be IBM Viavoice™.

In some cases, it may be necessary to pre-process the audio files to make them acceptable for processing by speech recognition software. The audio preprocessor 136 may serve to present an audio file from the audio file receiver 132 to each program 138, 140 in a form that is compatible with each program 138, 140. For instance, the audio preprocessor 136 may selectively change an audio file from a DSS or RAW file format into a WAV file format. Also, the audio preprocessor 136 may upsample or downsample the sampling rate of a digital audio file. Software to accomplish such preprocessing is available from a variety of sources including Syntrillium Corporation, Olympus Corporation, or Custom Speech USA, Inc.

The microprocessor 130 may also include a pre-correction program 142, a segmentation correction program 144, a word processing program 146, and assorted automation programs 148.

A machine-readable medium includes any mechanism for storing or transmitting information in a form readable by a machine (e.g., a computer). For example, a machine-readable medium includes read only memory (ROM); random access memory (RAM); magnetic disk storage media; optical storage media; or flash memory devices. Methods or processes in accordance with the various embodiments of the invention may be implemented by computer readable instructions stored in any media that is readable and executable by a computer system. For example, a machine-readable medium having stored thereon instructions, which when executed by a set of processors, may cause the set of processors to perform the methods of the invention.

II. Process 200

Figure 2:
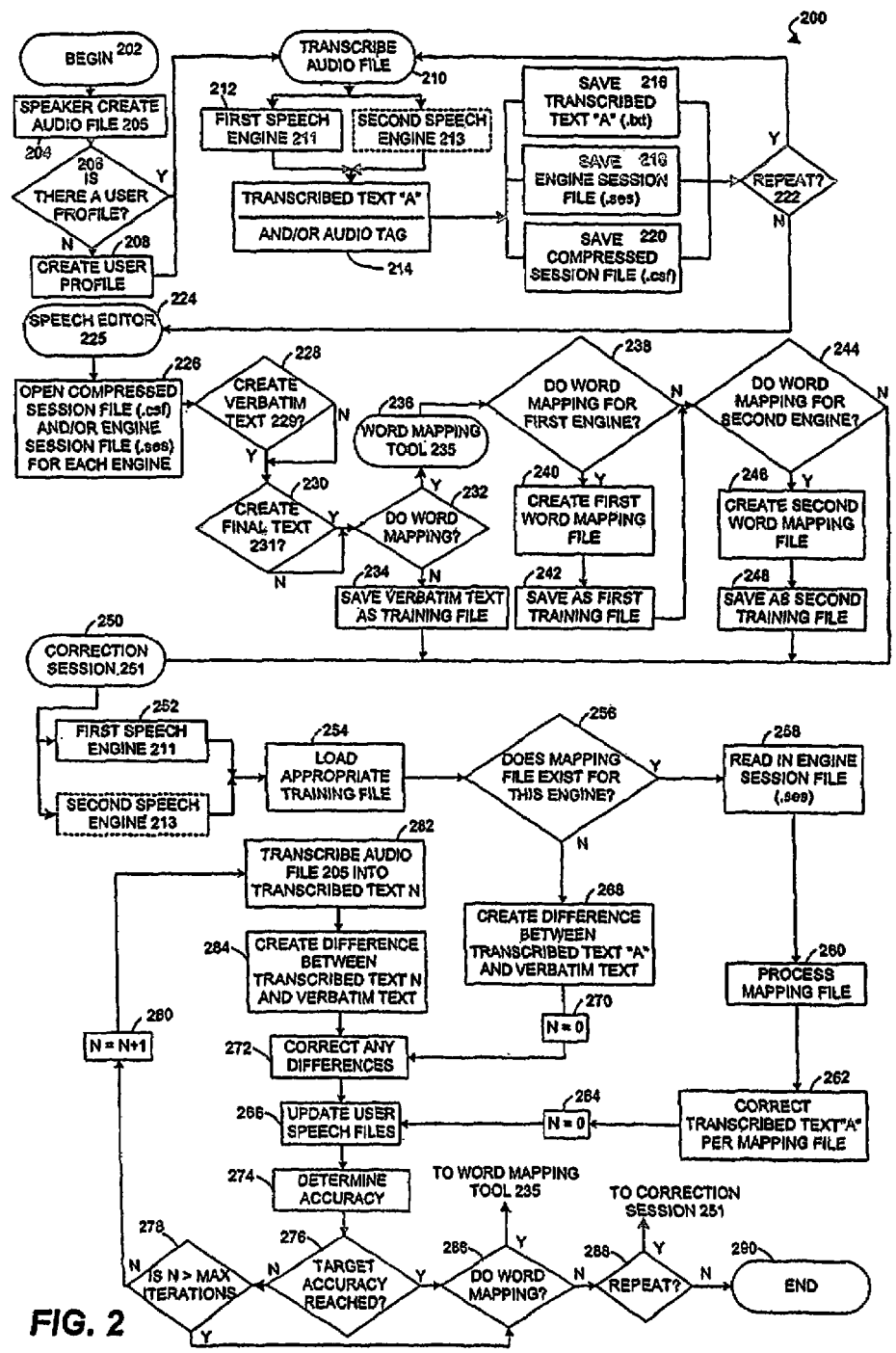
FIG. 2 is a flow diagram that illustrates a process 200 of the invention.

FIG. 2 includes a flow diagram that illustrates a process 200 of the invention. The process 200 includes simultaneous use of graphical user interface (GUI) windows to create both a verbatim text for speech engine training and a final text to be distributed as a document or report. The process 200 also includes steps to create a file that maps transcribed text to verbatim text. In turn, this mapping file may be used to facilitate a training event for a speech engine, where this training event permits a subsequent iterative correction process to reach a higher accuracy that would be possible were this training event never to occur. Importantly, the mapping file, the verbatim text, and the final text may be created simultaneously through the use of arranged GUI windows.

A. Non-Enrolled User Profile The process 200 begins at step 202. At step 204, a speaker may create an audio file 205, such as by using the microphone 104 of FIG. 1. The process 200 then may determine whether a user profile exists for this particular speaker at step 206. A user profile may include basic identification information about the speaker, such as a name, preferred reference vocabulary, information on the way in which a speaker pronounces particular words (acoustic information), and information on the way in which a speaker tends to use words (language model).

Most conventional speech engines for continuous dictation are manufactured with a generic user profile file comprising a generic name (e.g. "name"), generic acoustic information, and a generic language model. The generic acoustic information and the generic language model may be thought of as a generic speech model that is applicable to the entire class of speakers who use a particular speech engine.

Conventional speech engines for continuous dictation have been understood in the art to be speaker dependent so as to require manual creation of an initial speech user profile by each speaker. That is to say, in addition to the generic speech model that is generic to all users, conventional speech engines have been viewed as requiring the speaker to create speaker acoustic information and a speaker language model. The initial manual creation of speaker acoustic information and a speaker language model by the speaker may be referred to as enrollment. This process generally takes about a half-hour for each speaker.

The collective of the generic speech model, as modified by user profile information, may be copied into a set of user speech files. By supplying these speech files with acoustic and language information, for example, the accuracy of a speech engine may be increased.

In one experiment to better understand the role enrollment plays in the accuracy growth of a speech engine, the inventors of the invention twice processed an audio file through a speech engine and measured the accuracy. In the first run, the speech engine had a user profile that consisted of (i) the user's name, (ii) generic acoustic information, and (iii) a generic language model. Here, the enrollment process was skipped and the speech engine was forced to process the audio file without the benefit of the enrollment process. In this run, the accuracy was low, often as low or lower than 30%.

In the second run, enrollment was performed and the speech engine had a user profile within which went (i) the user's name, (ii) generic acoustic information, (iii) a generic language model, (iv) speaker acoustic information, and (v) a speaker language model. The accuracy was generally higher and might measure approximately 60%, about twice as great from the run where the enrollment process was skipped.

Based on the above results, a skilled person would conclude that enrollment is necessary to present the speaker with a speech engine product from which the accuracy reasonably may be grown. In fact, conventional speech engine programs require enrollment. However, as discussed in more detail below, the inventors have discovered that iteratively processing an audio file with a non-enrolled user profile through the correction session of the invention surprisingly increased the accuracy of the speech engine to a point at which the speaker may be presented with a speech product from which the accuracy reasonably may be improved.

This process has been designed to make speech recognition more user friendly by reducing the time required for enrollment essentially to zero and to facilitate the off-site transcription of audio by speech recognition systems. The off-site facility can begin transcription virtually immediately after presentation of an audio file by creating a user. A user does not have to "enroll" before the benefits of speech recognition can be obtained. User accuracy can subsequently be improved through off-site corrective adaptation and other techniques. Characteristics of the input (e.g., telephone, type of microphone or handheld recorder) can be recorded and input specific speech files developed and trained for later use by the remote transcription facility. In addition, once trained to a sufficient accuracy level, these speech files can be transferred back to the speaker for on-site use using standard export or import controls. These are available in off-the-shelf speech recognition software or applications produced by a, for example, Dragon NaturallySpeaking™ or IBM Viavoice™ software development kit. The user can import the speech files and then calibrate his or her local system using the microphone and background noise "wizards" provided, for example, by standard, off-the-shelf Dragon NaturallySpeaking™ and IBM Viavoice™ speech recognition products.

In the co-pending application U.S. Non-Provisional applicational Ser. No. 09/889,870, the assignee of the present invention developed a technique to make the enrollment process transparent to the speaker. U.S. Non-Provisional applicational Ser. No. 09/889,870 discloses a system for substantially automating transcription services for one or more voice users is disclosed. This system receives a voice dictation file from a current user, which is automatically converted into a first written text based on a first set of conversion variables. The same voice dictation is automatically converted into a second written text based on a second set of conversion variables. The first and second sets of conversion variables have at least one difference, such as different speech recognition programs, different vocabularies, and the like. The system further includes a program for manually editing a copy of the first and second written texts to create a verbatim text of the voice dictation file. This verbatim text can then be delivered to the current user as transcribed text. A method for this approach is also disclosed.

What the above U.S. Non-Provisional applicational Ser. No. 09/889,870 demonstrates is that at the time U.S. Non-Provisional applicational Ser. No. 09/889,870 was filed, the assignee of the invention believed that the enrollment process was necessary to begin using a speech engine. In the present patent, the assignee of the invention has demonstrated the surprising conclusion that the enrollment process is not necessary.

Returning to step 206, if no user profile is created, then the process 200 may create a user profile at step 208. In creating the user profile at step 208, the process 200 may employ the preexisting enrollment process of a speech engine and create an enrolled user profile. For example, a user profile previously created by the speaker at a local site, or speech files subsequently trained by the speaker with standard corrective adaptation and other techniques, can be transferred on a local area or wide area network to the transcription site for use by the speech recognition engine. This, again, can be accomplished using standard export and import controls available with off-the-shelf products or a software development kit. In a preferred embodiment, the process 200 may create a non-enrolled user profile and process this non-enrolled user profile through the correction session of the invention.

If a user profile has already been created, then the process 200 proceeds from step 206 to the transcribe audio file step 210.

B. Compressed Session File

From step 210, recorded audio file 205 may be converted into written, transcribed text by a speech engine, such a Dragon NaturallySpeaking™ or IBM Viavoice™. The information then may be saved. Due to the time involved in correcting text and training the system, some manufacturers, e.g., Dragon NaturallySpeaking™ and IBM Viavoice™, have now made "delegated correction" available. The speaker dictates into the speech recognition program. Text is transcribed. The program creates a "session file" that includes the text and audio that goes with it. The user saves the session file. This file may be opened later by another operator in the speech recognition text processor or in a commercially available word processor such as Word™ or WordPerfect™. The secondary operator can select text, play back the audio associated with it, and make any required changes in the text. If the correction window is opened, the operator can correct the misrecognized words and train the system for the initial user. Unless the editor is very familiar with the speaker's dictation style and content (such as the dictating speaker's secretary), the editor usually does not know exactly what was dictated and must listen to the entire audio to find and correct the inevitable mistakes. Especially if the accuracy is low, the gains from automated transcription by the computer are partially, if not completely, offset by the time required to edit and correct.

The invention may employ one, two, three, or more speech engines, each transcribing the same audio file. Because of variations in programming or other factors, each speech engine may create a different transcribed text from the same audio file 205. Moreover, with different configurations and parameters, the same speech engine used as both a first speech engine 211 and a second speech engine 213 may create a different transcribed text for the same audio. Accordingly, the invention may permit each speech engine to create its own transcribed text for a given audio file 205.

From step 210, the audio file 205 of FIG. 2 may be received into a speech engine. In this example, the audio file 205 may be received into the first speech engine 211 at step 212, although the audio file 205 alternatively (or simultaneously) may be received into the second speech engine 213. At step 214, the first speech engine 211 may output a transcribed text "A". The transcribed text "A" may represent the best efforts of the first speech engine 211 at this stage in the process 200 to create a written text that may result from the words spoken by the speaker and recorded in the audio file 205 based on the language model presently used by the first speech engine 211 for that speaker. Each speech engine produces its own transcribed text "A," the content of which usually differs by engine.

In addition to the transcribed text "A", the first speech engine 211 may also create an audio tag. The audio tag may include information that maps or aligns the audio file 205 to the transcribed text "A". Thus, for a given transcribed text segment, the associated audio segment may be played by employing the audio tag information.

Preferably, the audio tag information for each transcribed element (i.e. words, symbols, punctuation, formatting instructions etc.) contains information regarding a start time location and a stop time location of the associated audio segment in the original audio file. In one embodiment, in order to determine the start time location and stop time location of each associated audio segment, the invention may employ Microsoft's Speech API ("SAPI). The following is described with respect to the Dragon NaturallySpeaking™ speech recognition program, version 5.0 and Microsoft SAPI SDK version 4.0a. As would be understood by those of ordinary skill in the art, other speech recognition engines will interface with this and other version of the Microsoft SAPI. For instance, Dragon NaturallySpeaking™ version 6 will interface with SAPI version 4.0a, 113M Viavoice™ version 8 will also interface with SAPI version 4.0a, and IBM Viavoice™ version 9 will interface with SAPI version 5.

Figure 10:
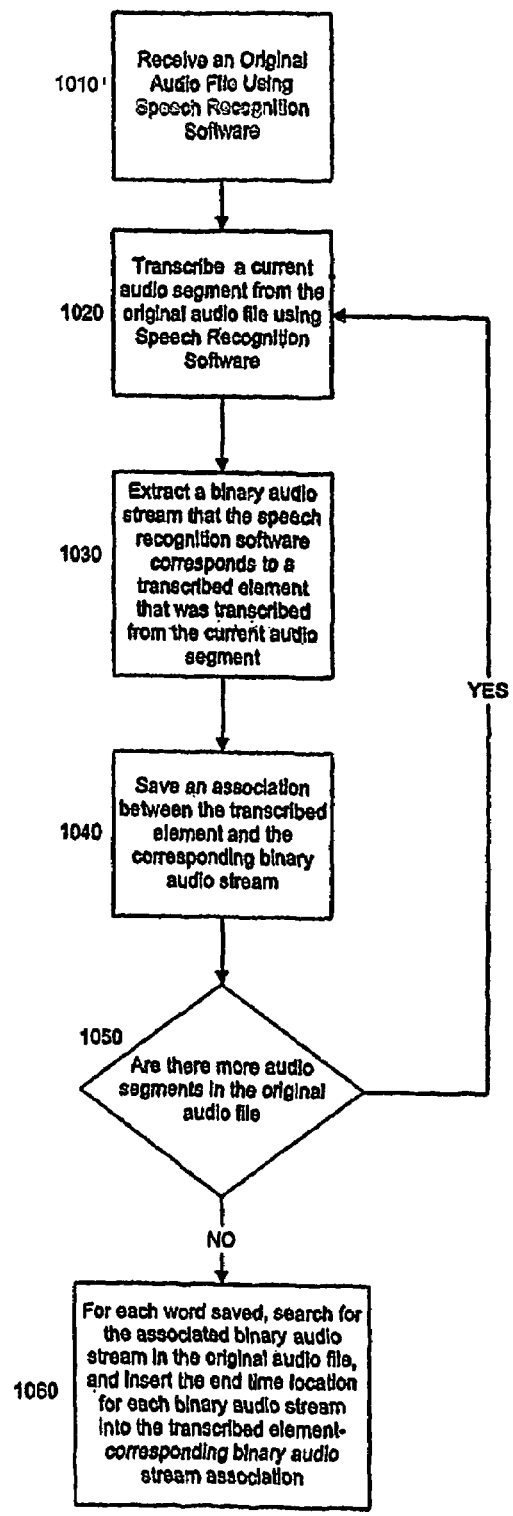
FIG. 10 is a flow diagram that illustrates a process 1000.

With reference to FIG. 10, Process 1000 uses the SAPI engine as a front end to interface with the Dragon NaturallySpeaking™ SDK modules in order to obtain information that is not readily provided by Dragon NaturallySpeaking™. In step 1010, an audio file is received by the speech recognition software. For instance, the speaker may dictate into the speech recognition program, using any input device such as a microphone, handheld recorder, or telephone, to produce an original audio file as previously described. The dictated audio is then transcribed using the first and/or second speech recognition program in conjunction with SAPI to produce a transcribed text. In step 1020, a transcribed element (word, symbol, punctuation, or formatting instruction) is transcribed from a current audio segment in the original audio file. The SAPI then returns the text of the transcribed element and a binary audio stream, preferably in WAV PCM format, that the speech recognition software corresponds to the transcribed word. (step 1030). The transcribed element text and a link to the associated binary audio stream are saved. (Step 1040). In step 1050, if there are more audio segments in the original audio file, the process returns to step 1020. In a preferred approach, the transcribed text may be saved in a single session file, with each other transcribed word and points to each associated separate binary audio stream file.

Step 1060 then searches the original audio file for each separate binary audio stream to determine the stop time location and the start time location for that separate audio stream and end with its associated transcribed element. The stop time location for each transcribed element is then inserted into the single session file. Since the binary audio stream produced by the SAPI engine has a DC offset when compared to the original audio file, it is not possible to directly search the original audio file for each binary audio segment. As such, in a preferred approach the step 1060 searches for matches between the mathematical derivatives of each portion of audio, as described in further detail in FIG. 11.

Figure 11:
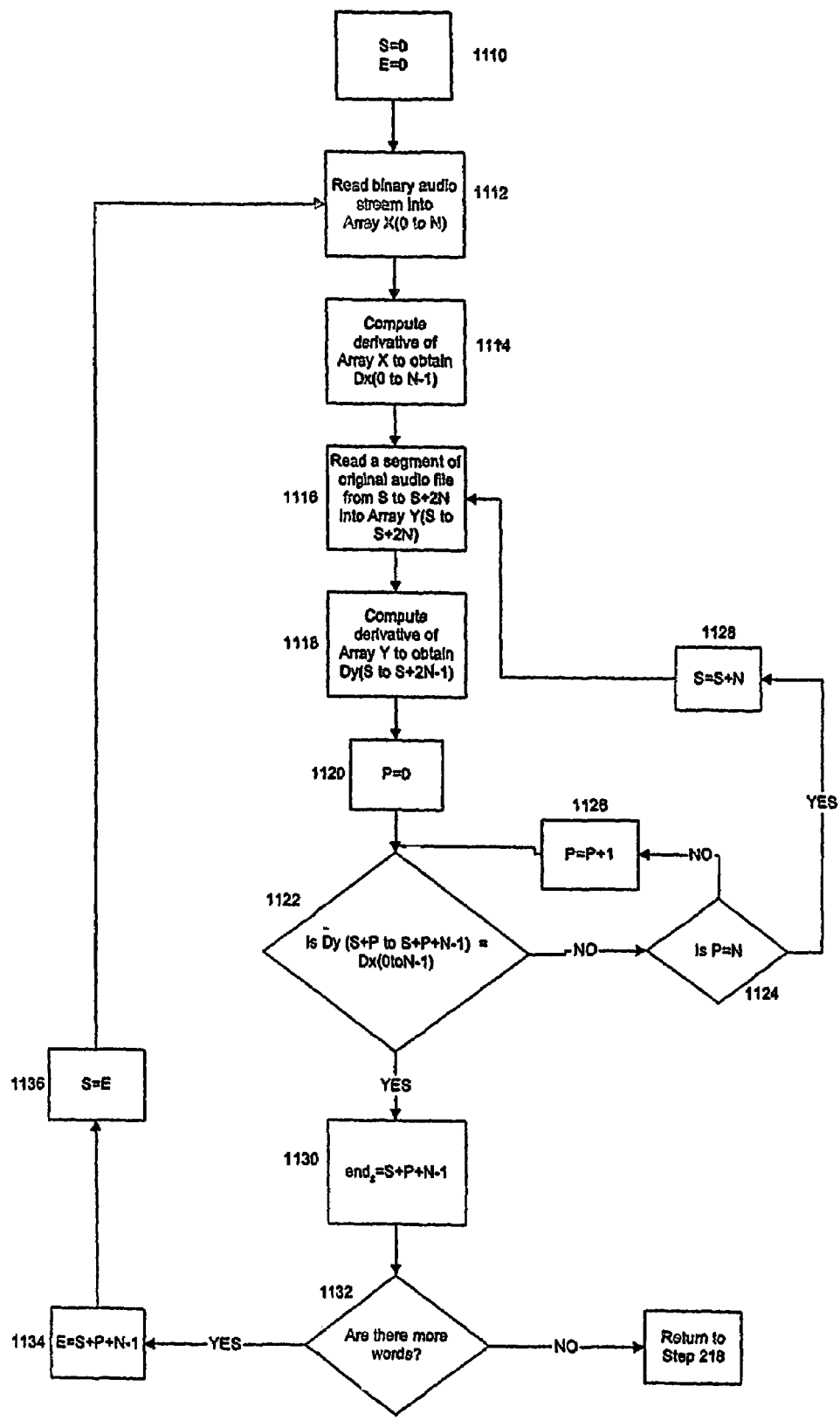
FIG. 11 is a flow diagram illustrating step 1060 of process 1000.

Referring to FIG. 11, step 1110 sets a start position S to S=0, and an end position E to E=0. At step 1112, a binary audio stream corresponding to the first association in the single session file is read into an array X, which is comprised of a series of sample points from time location 0 to time location N. In one approach, the number of sample points in the binary audio stream is determined in relation to the sampling rate and the duration of the binary audio stream. For example, if the binary audio stream is 1 second long and has a sampling rate of 11 samples/sec, the number of sample points in array X is 11.

At Step 1114 the mathematical derivative of the array X is computed in order to produce a derivative audio stream Dx(0 to N−1). In one approach the mathematical derivative may be a discrete derivative, which is determined by taking the difference between a number of discrete points in the array X. In this approach, the discrete derivative may be defined as follows:

$$Dx(0 \text{ to } N-1) = \frac{K(n+1) - K(n)}{Tn}$$

where n is an integer from 1 to N, K(n+1) is a sample point taken at time location n+1, K(n) is a previous sample point take at time location n, and Tn is the time base between K(n) and K(n−1). In a preferred approach, the time base Tn between two consecutive sample points is always equal to 1. Thus, simplifying the calculation of the discrete derivative to Dx(0 to N−1)=K(n+1)−K(n).

In step 1116, a segment of the original audio file is read into an array Y starting at position S, which was previously set to 0. In a preferred approach, array Y is twice as wide as array X such that the audio segment read into the array Y extends from time position S to time position S+2N. At Step 1118 the discrete derivative of array Y is computed to produce a derivative audio segment array Dy(S to S+2N−1) by employing the same method as described above for array X.

In step 1120, a counter P is set to P=0. Step 1122 then begins to search for the derivative audio stream array Dx(0 to N−1) within the derivative audio segment array Dy(S to S+2N−1). The derivative audio stream array Dx(0 to N−1) is compared sample by sample to a portion of the derivative audio segment array defined by Dy(S+P to S+P+N−1). If every sample point in the derivative audio stream is not an exact match with this portion of the derivative audio segment, the process proceeds to step 1124. At Step 1124, if P is less than N, P is incremented by 1, and the process returns to step 1122 to compare the derivative audio stream array with the next portion of the derivative audio segment array. If P is equal to N in Step 1124, the start position S is incremented by N such that S=S+N, and the process returns to step 1116 where a new segment from the original audio file is read into array Y.

When the derivative audio stream Dx(0 to N−1) matches the portion of the derivative audio segment Dy(S+P to S+P+N−1) at step 1122 sample point for sample point, the start time location of the audio tag for the transcribed word associated with the current binary audio stream is set as the previous end position E, and the stop time location ends of the audio tag is set to S+P+N−1 (step 1130). These values are saved as the audio tag information for the associated transcribed element in the session file. Using these values and the original audio file, an audio segment from that original audio file can be played back. In a preferred approach, only the end time location for each transcribed element is saved in the session file. In this approach, the start time location of each associated audio segment is simply determined by the end time location of the previous audio segment. However, in an alternative approach, the start time location and the end time location may be saved for each transcribed element in the session file.

In step 1132, if there are more word tags in the session file, the process proceeds to step 1134. In step 1134, S is set to E=S+P+N−1 and in step 1136, S is set to S=E. The process then returns to step 1112 where a binary audio stream associated with the next word tag is read into array X from the appropriate file, and the next segment from the original audio file is read into array Y beginning at a time location corresponding to the new value of S. Once there are no more word tags in the session file, the process may proceed to step 218 in FIG. 2.

When the process shown in FIG. 11 is completed, each transcribed element in the transcribed text will be associated with an audio tag that has at least the stop time location end of each associated audio segment in the original audio file. Since the start position of each audio tag corresponds to the end position of the audio tag for the previous word, the above described process ensures that the audio tags associated with the transcribed words include each portion of the original audio file even if the speech engine failed to transcribe some audio portion thereof. As such, by using the audio tags created by the playback of the associated audio segments will also play back any portion of the original audio file that was not originally transcribed by the speech recognition software.

Although the above described process utilizes the derivative of the binary audio stream and original audio file to compensate for offsets, the above process may alternatively be practiced by determining that relative DC offset between the binary audio stream and the original audio file. This relative DC offset would then be removed from the binary audio stream and the compensated binary audio stream would be compared directly to the original audio file.

It is also contemplated that the size of array Y can be varied with the understanding that making the size of this array too small may require additional complexity the matching of audio that spans across a nominal array boundary.

Figure 12A:
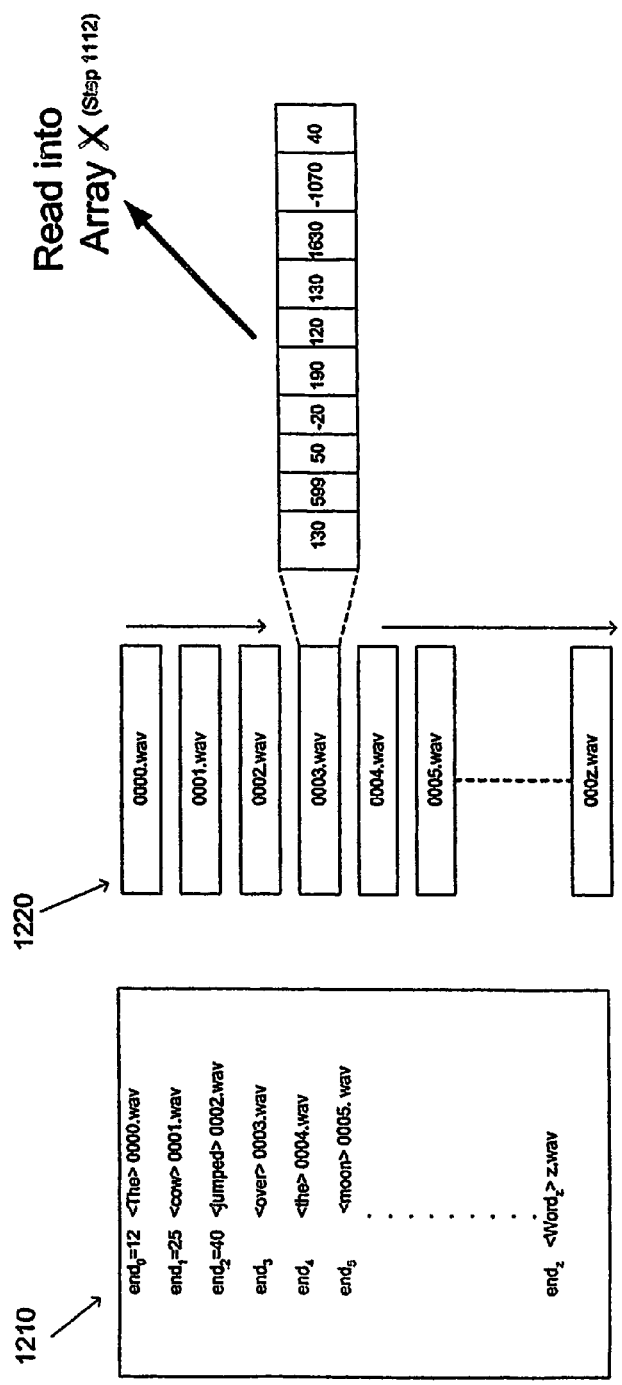
FIG. 12a-12c illustrate one example of the process 1000.
Figure 12B:
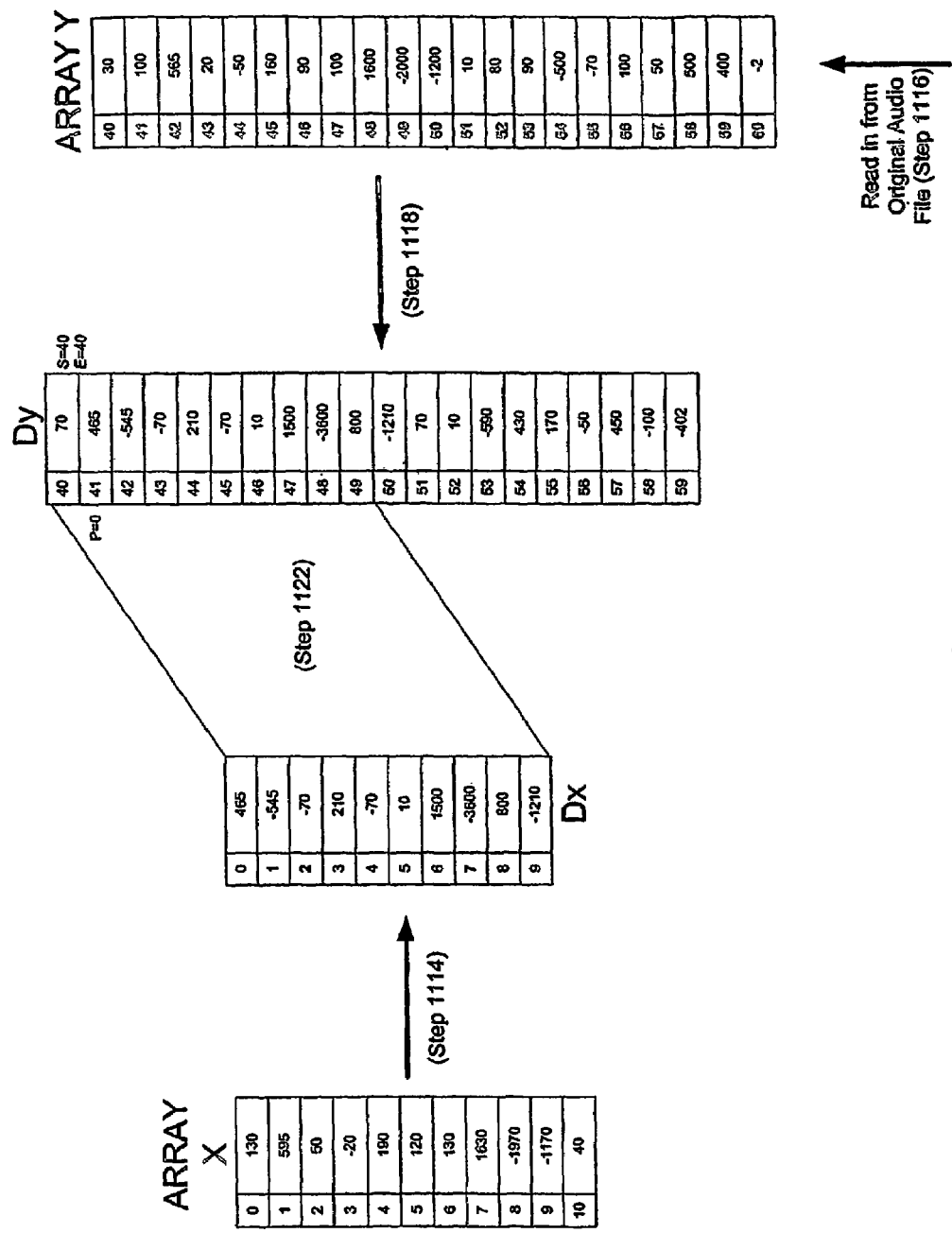
Figure 12C:
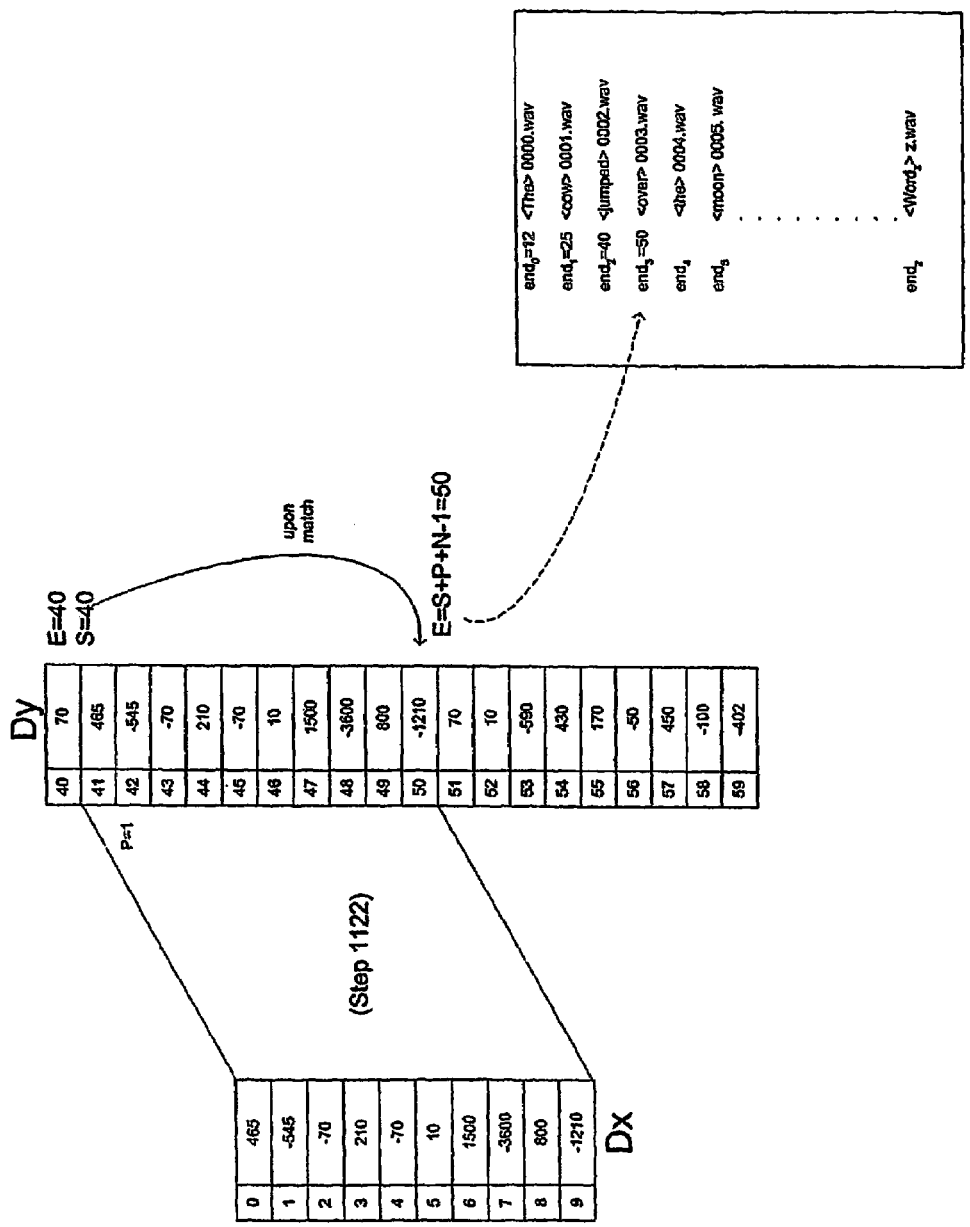

FIGS. 12a-12c show one exemplary embodiment of the above described process. FIG. 12a shows one example of a session file 1210 and a series of binary audio streams 1220 corresponding to each transcribed element saved in the session file. In this example, the process has already determined the end time locations for each of the files 0000.wav, 0001.wav, and 0002.wav and the process is now reading file 0003.wave into Array X. As shown in FIG. 12b, array X has 11 sample points ranging from time location 0 to time location N. The discrete derivative of Array X(0 to 10) is then taken to produce a derivative audio stream array Dx(0 to 9) as described in step 1114 above.

The values in the arrays X, Y, Dx, and Dy, shown in FIGS. 12a-12c, are represented as integers to clearly present the invention. However, in practice, the values may be represented in binary, ones complement, twos complement, sign-magnitude or any other method for representing values.

With further reference to FIGS. 12a and 12b, as the end time location for the previous binary audio stream 0002.wav was determined to be time location 40, end position E is set to E=40 (step 1134) and start position S is also set to S=40 (step 1136). Therefore, an audio segment ranging from S to S+2N, or time location 40 to time location 60 in the original audio file, is read into array Y (step 1116). The discrete derivative of array Y is then taken, resulting in Dy(40 to 59).

The derivative audio stream Dx(0 to 9) is then compared sample by sample to Dy(S+P to S+P+N−1), or Dy(40 to 49). Since every sample point in the derivative audio stream shown in FIG. 12b is not an exact match with this portion of the derivative audio segment, P is incremented by 1 and a new portion of the derivative audio segment is compared sample by sample to the derivative audio stream, as shown in FIG. 12c.

In FIG. 12c, derivative audio stream Dx(0 to 9) is compared sample by sample to Dy(41 to 50). As this portion of the derivative audio segment Dy is an exact match to the derivative audio stream Dx, the end time location for the corresponding word is set to end 3=S+P+N−1=40+1+10−1=50, and this value is inserted into the session file 1210. As there are more words in the session file 1210, end position E would be set to 50, S would be set to 50, and the process would return to step 1112 in FIG. 11.

Returning to FIG. 2, the process 200 may save the transcribed text "A" using a .txt extension at step 216. At step 218, the process 200 may save the engine session file using a .ses extension. Where the first speech engine 211 is the Dragon NaturallySpeaking™ speech engine, the engine session file may employ a .dra extension. Where the second speech engine 213 is an IBM Viavoice™ speech engine, the IBM Viavoice™ SDK session file employs an .isf extension.

At this stage of the process 200, an engine session file may include at least one of a transcribed text, the original audio file 205, and the audio tag. The engine session files for conventional speech engines are very large in size. One reason for this is the format in which the audio file 205 is stored. Moreover, the conventional session files are saved as combined text and audio that, as a result, cannot be compressed using standard algorithms or other techniques to achieve a desirable result. Large files are difficult to transfer between a server and a client computer or between a first client computer to a second client computer. Thus, remote processing of a conventional session file is difficult and sometimes not possible due to the large size of these files.

To overcome the above problems, the process 200 may save a compressed session file at step 220. This compressed session file, which may employ the extension .csf, may include a transcribed text, the original audio file 205, and the audio tag. However, the transcribed text, the original audio file 205, and the audio tag are separated prior to being saved. Thus, the transcribed text, the original audio file 205, and the audio tag are saved separately in a compressed cabinet file, which works to retain the individual identity of each of these three files. Moreover, the transcribed text, the audio file, and the mapping file for any session of the process 200 may be saved separately.

Because the transcribed text, the audio file, and the audio tag or mapping file for each session may be save separately, each of these three files for any session of the process 200 may be compressed using standard algorithm techniques to achieve a desirable result. Thus, a text compression algorithm may be run separately on the transcribed text file and the audio tag and an audio compression algorithm may be run on the original audio file 205. This is distinguished from conventional engine session files, which cannot be compressed to achieve a desirable result.

For example, the audio file 205 of a saved compressed session file may be converted and saved in a compressed format. Moving Picture Experts Group (MPEG)-1 audio layer 3 (MP3) is a digital audio compression algorithm that achieves a compression factor of about twelve while preserving sound quality. MP3 does this by optimizing the compression according to the range of sound that people can actually hear. In one embodiment, the audio file 205 is converted and saved in an MP3 format as part of a compressed session file. Thus, in another embodiment, a compressed session file from the process 200 is transmitted from the computer 120 of FIG. 1 onto the Internet. As is generally known, the Internet is an interconnected system of networks that connects computers around the world via a standard protocol. Accordingly, an editor or correctionist may be at location remote from the compressed session file and yet receive the compressed session file over the Internet.

Once the appropriate files are saved, the process 200 may proceed to step 222. At step 222, the process 222 may repeat the transcription of the audio file 205 using the second speech engine 213. In the alternative, the process 222 may proceed to step 224.

Alternatively, session file may be created by speaker dictating directly into computer loaded with speech recognition software such as Dragon NaturallySpeaking™. The computer will generate transcription in real time and a .dra session file that aligns audio and text. The text and the .dra session file can be saved to a local or network drive and the process may proceed to step 224.

C. Speech Editor: Creating Files in Multiple GUI Windows

At step 224, the process 200 may activate a speech editor 225 of the invention. In general, the speech editor 225 may be used to expedite the training of multiple speech recognition engines and/or generate a final report or document text for distribution. This may be accomplished through the simultaneous use of graphical user interface (GUI) windows to create both a verbatim text 229 for speech engine training and a final text 231 to be distributed as a document or report The speech editor 225 may also permit creation of a file that maps transcribed text to verbatim text 229. In turn, this mapping file may be used to facilitate a training event for a speech engine during a correction session. Here, the training event works to permit subsequent iterative correction processes to reach a higher accuracy than would be possible were this training event never to occur. Importantly, the mapping file, the verbatim text, and the final text may be created simultaneously through the use of linked GUI windows. Through use of standard scrolling techniques, these windows are not limited to the quantity of text displayed in each window. By way of distinction, the speech editor 225 does not directly train a speech engine. The speech editor 225 may be viewed as a front-end tool by which a correctionist corrects verbatim text to be submitted for speech training or corrects final text to generate a polished report or document.

After activating the speech editor 225 at step 224, the process 200 may proceed to step 226. At step 226 a compressed session file (.csf) may be open that has been created using the Dragon NaturallySpeaking™ or IBM ViaVoice™ SDK. Use of the speech editor 225 may require that audio be played by selecting transcribed text and depressing a play button. Although the compressed session file may be sufficient to provide the transcribed text, the audio text alignment from a compressed session file may not be as complete as the audio text alignment from an engine session file under certain circumstances. Thus, in one embodiment, the compressed session file may add an engine session file to a job by specifying an engine session file to open for audio playback purposes.

In another embodiment, the engine session file (.ses) is a Dragon NaturallySpeaking™ engine session file (.dra) that was created using real-time speech recognition on a local computer using the off-the-shelf product. An interface to open a dra file can be created using tools provided by the Dragon SDK. At the current time, the IBM ViaVoice™ SDK does not permit creation of a graphical user interface or other means to open an IBM ViaVoice™ session file (.vps) created using real-time speech recognition on a local computer with the off-the-shelf product. Those skilled in the art will recognize that the IBM SDK could be changed to include this feature and that a speech editor could be created to open native .vps files, as well as session files from other speech recognition programs, in a manner consistent with the description of the current invention.

From step 226, the process 200 may proceed to step 228. At step 228, the process 200 may present the decision of whether to create a verbatim text 229. In either case, the process 200 may proceed to step 230, where the process 200 may the decision of whether to create a final text 231. Both the verbatim text 229 and the final text 231 may be displayed through graphical user interfaces (GUIs).

Figure 3:
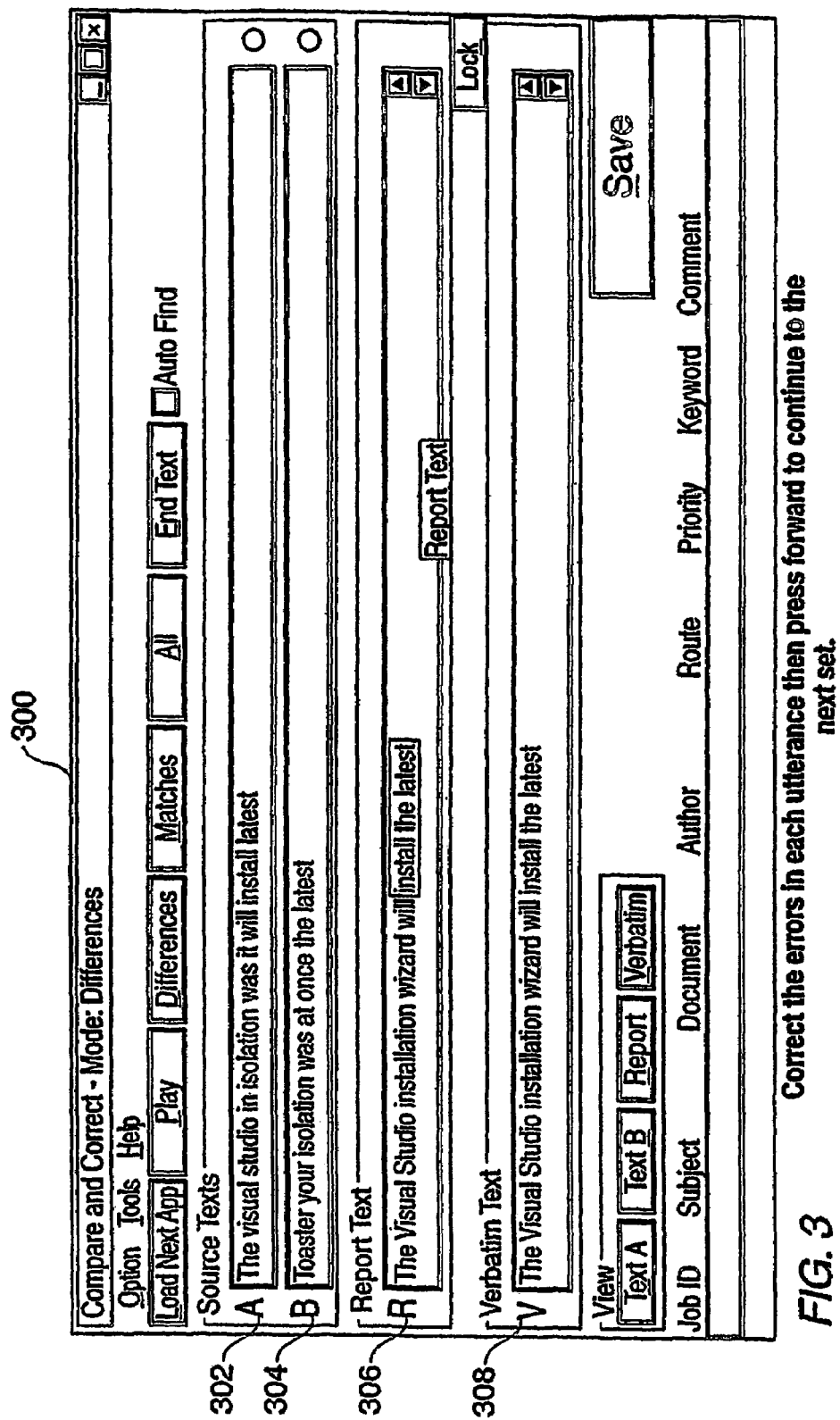
FIG. 3 is a view of an exemplary graphical user interface 300 to support the present invention.
Figure 20:
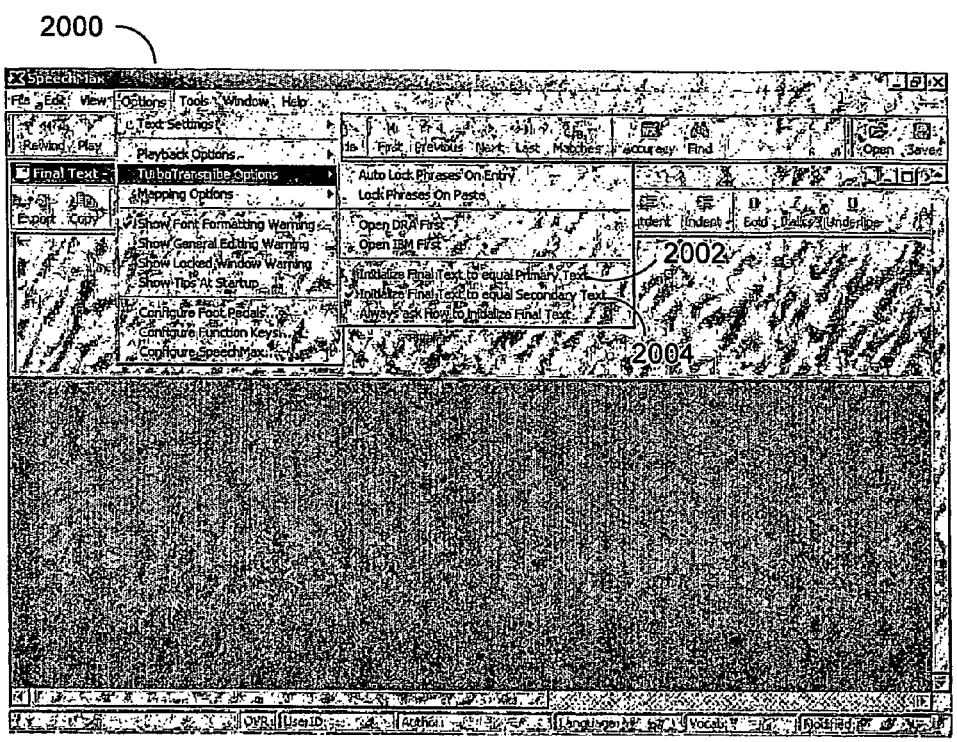
FIG. 20 is a view of an exemplary user interface to support another embodiment of the present invention.

FIG. 3 of the drawings is a view of an exemplary graphical user interface 300 to support the present invention. The graphical user interface (GUI) 300 of FIG. 3 is shown in Microsoft Windows operating system version 9.x. Controls have been incorporated to assist the editor in playing back audio and editing text, including hot key functionality (see, e.g. FIG. 20). Those with sufficient skill in the art will recognize that these and other enhancements, such as control by transcriptionist's foot pedal, text expander, macro activation, and other features, could be added without departing from spirit of the current invention. Moreover, the display and interactive features of the graphical user interface (GUI) 300 are not limited to the Microsoft Windows™ operating system, but may be displayed in accordance with any underlying operating system.

In previously filed, co-pending patent application PCT Application No. PCT/US01/1760, which claims the benefits of U.S. Provisional Application No. 60/208,994, the assignee of the present application discloses a system and method for comparing text generated in association with a speech recognition program. Using file comparison techniques, text generated by two speech recognition engines and the same audio file are compared. Differences are detected with each difference having a match listed before and after the difference, except for text begin and text end. In those cases, there is at least one adjacent match associated to it. By using this "bookend" or "sandwich" technique, text differences can be identified, along with the exact audio segment that was transcribed by both speech recognition engines. FIG. 3 of the present invention was disclosed as FIG. 7 in Ser. No. 60/208,994. U.S. Ser. No. 60/208,994 is incorporated by reference to the extent permitted by law.

GUI 300 of FIG. 3 may include a source text window A 302, a source text window B 304, and two correction windows: a report text window 306 and a verbatim text window 308. A submenu is available which permits the user to determine which speech engine text opens first. That text goes into source text window A 302, the other text appears within source window B 304. A submenu option on the main user interface permits the user to substitute different text into source text window B 304. A browse window is available that enables the user to select any available text file to be inserted in place of the speech engine text originally placed in source text window B 304. The user may elect to open a text file from a single speech engine into source text window A 302, and open the preexisting text file into the report and verbatim text windows 306, 308. Using the paste function of the underlying operating system, the transcriptionist can quickly place newly dictated and transcribed text into the correction windows 606, 608 and edit that text, if required.

FIG. 4 illustrates a text A 400 and FIG. 5 illustrates a text B 500. The text A 400 may be transcribed text generated from the first speech engine 211 and the text B 500 may be transcribed text generated from the second speech engine 213. The two correction windows 306 and 308 may be linked or locked together so that changes in one window may affect the corresponding text in the other window. At times, changes to the verbatim text window 308 need not be made in the report text window 306 or changes to the report text window 306 need not be made in the verbatim text window 308. During these times, the correction windows may be unlocked from one another so that a change in one window does not affect the corresponding text in the other window. In other words, the report text window 306 and the verbatim text window 308 may be edited simultaneously or singularly as may be toggled by a correction window lock mode.

As shown in FIG. 3, each text window may display utterances from the transcribed text. An utterance may be defined as a first group of words separated by a pause from a second group of words. By highlighting one of the source texts 302, 304, playing the associated audio, and listening to what was spoken, the report text 231 or the verbatim text 229 may be verified or changed in the case of errors. By correcting the errors in each utterance and then pressing forward to continue to the next set, both a (final) report text 231 and a verbatim text 229 may be generated simultaneously in multiple windows. Speech engines such as the IBM Viavoice™ SDK engine do not permit more than ten words to be corrected using a correction window. Accordingly, displaying and working with utterances works well under some circumstances. Although displaying and working with utterances works well under some circumstances, other circumstances require that the correction windows be able to correct an unlimited amount of text.

Figure 6:
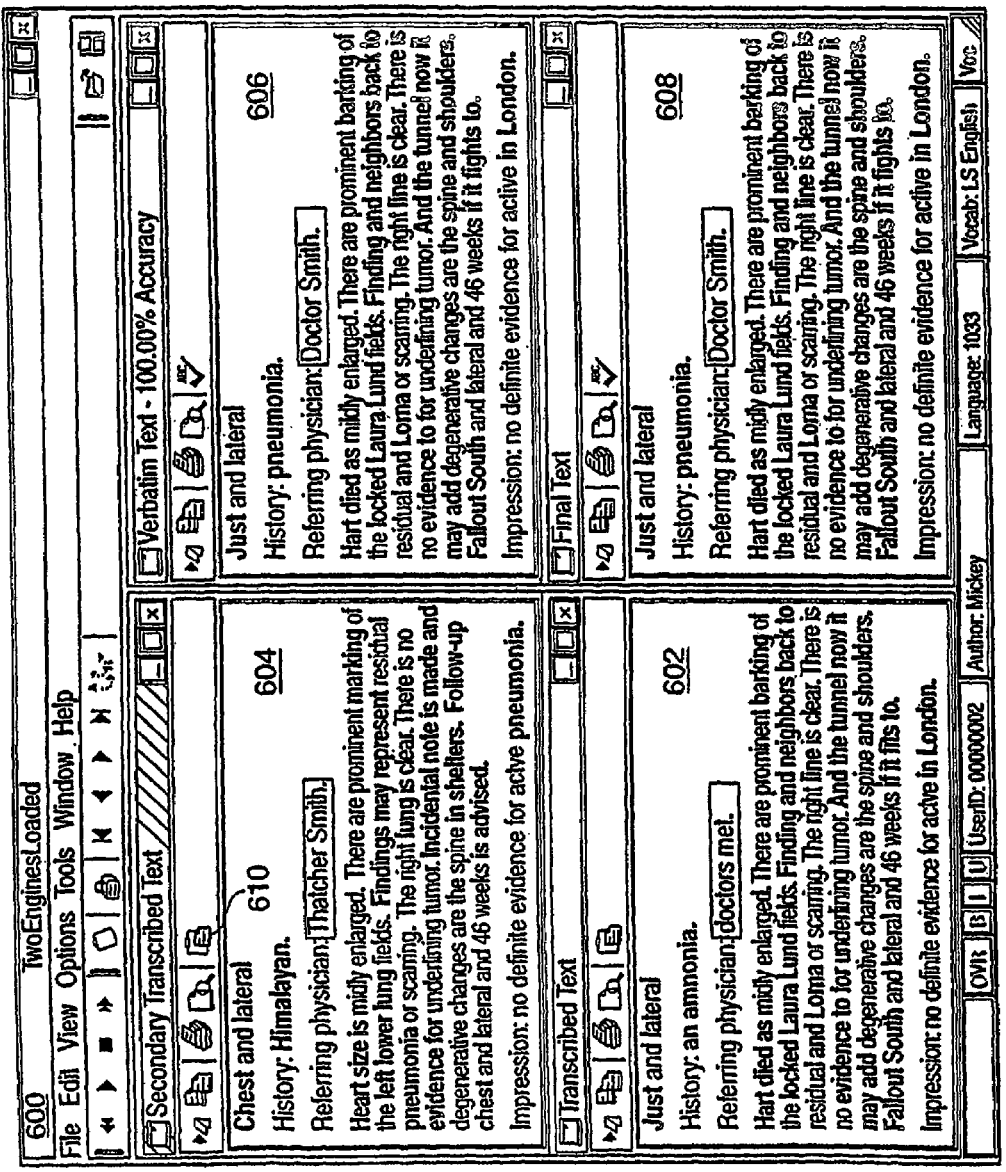
FIG. 6 is a view of an exemplary graphical user interface 600 to support the present invention.

However, from the correctionist's stand-point, utterance-by-utterance display is not always the most convenient display mode. As seen in comparing FIG. 3 to FIG. 4 and FIG. 5, the amount of text that is displayed in the windows 302, 304, 306 and 308 is less than the transcribed text from either FIG. 4 or FIG. 5. FIG. 6 of the drawings is a view of an exemplary graphical user interface 600 to support the present invention. The speech editor 225 may include a front end, graphical user interface 600 through which a human correctionist may review and correct transcribed text, such as transcribed text "A" of step 214. The GUI 600 works to make the reviewing process easy by highlighting the text that requires the correctionist's attention. Using the speech editor 225 navigation and audio playback methods, the correctionist may quickly and effectively review and correct a document.

The GUI 600 may be viewed as a multidocument user interface product that provides four windows through which the correctionist may work: a first transcribed text window 602, a secondary transcribed text window 604, and two correction windows—a verbatim text window 606 and a final text window 608. Modifications by the correctionist may only be made in the final text window 606 and verbatim text window 608. The contents of the first transcribed text window 602 and the second transcribed text window 604 may be fixed so that the text cannot be altered. In the another embodiment depicted in FIG. 20, the first transcribed text window 602 (not shown in FIG. 20) and the second transcribed text window 604 (not shown in FIG. 20) contain text that cannot be modified but text from these windows may be cut and pasted to correct the text shown in the final or verbatim windows as described in further detail below. Furthermore, in this embodiment, the graphical user interface permits the user to place either the text from a speech engine or any source file in the final and verbatim and text windows.

The first transcribed text window 602 may contain the transcribed text "A" of step 214 as the first speech engine 211 originally transcribed it. The second transcribed text window 604 may contain a transcribed text "B" (not shown) of step 214 as the second speech engine 213 originally transcribed it. Typically, the content of transcribed text "A" and transcribed text "B" will differ based upon the speech recognition engine used, even where both are based on the same audio file 205.

Each transcribed window 602, 604 is designed to provide a reference for the correctionist to always know what the original transcribed text is, to provide an avenue to play back the underlying audio file, and to provide an avenue by which the correctionist may select specific text for audio playback. The text in either the final or verbatim window 606, 608 is not linked directly to the audio file 205. The audio in each window for each match or difference may be played by selecting the text and hitting a playback button. The word or phrase played back will be the audio associated with the word or phrase where the cursor was last located. If the correctionist is in the "All" mode (which plays back audio for both matches and differences), audio for a phrase that crosses the boundary between a match and difference may be played by selecting and playing the phrase in the final (608) or verbatim (606) windows corresponding to the match, and then selecting and playing the phrase in the final or verbatim windows corresponding to the difference. Details concerning playback in different modes are described more fully in the Section 1 "Navigation" below. If the correctionist selects the entire text in the "All" mode and launches playback, the text will be played from the beginning to the end. Those with sufficient skill in the art the disclosure of the present invention before them will realize that playback of the audio for the selected word, phrase, or entire text could be regulated through use of a standard transcriptionist foot pedal.

The verbatim text window 606 may be where the correctionist modifies and corrects text to identically match what was said in the underlying dictated audio file 205. A main goal of the verbatim text window 606 is to provide an avenue by which the correctionist may correct text for the purposes of training a speech engine. Moreover, the final text window 608 may be where the correctionist modifies and polishes the text to be filed away as a document product of the speaker. A main goal of the final text window 608 is to provide an avenue by which the correctionist may correct text for the purposes of producing a final text file for distribution.

To start a session of the speech editor 225, a session file is opened at step 226 of FIG. 2. This may initialize three of four windows of the GUI 600 with transcribed text "A" ("Transcribed Text," "Verbatim Text," and "Final Text"). In the example, the initialization texts were generated using the IBM Viavoice™ SDK engine. Opening a second session file may initialize the second transcribed text window 604 with a different transcribed text from step 214 of FIG. 2. In the example, the fourth window ("Secondary Transcribed Text) was created using the Dragon NaturallySpeaking™ engine. The verbatim text window is, by definition, described as being 100.00% accurate, but actual verbatim text may not be generated until corrections have been made by the editor.

The verbatim text window 606 and the final text window 608 may start off initially linked together. That is to say, whatever edits are made in one window may be propagated into the other window. In this manner, the speech editor 225 works to reduce the editing time required to correct two windows. The text in each of the verbatim text window 606 and the final text window 608 may be associated to the original source text located and displayed in the first transcribed text window 602. Recall that the transcribed text in first transcribed text window 602 is aligned to the audio file 205. Since the contents of each of the two modifiable windows (final and verbatim) is mapped back to the first transcribed text window 602, the correctionist may select text from the first transcribed text window 602 and play back the audio that corresponds to the text in any of the windows 602, 604, 606, and 608. By listening to the original source audio in the audio file 205 the correctionist may determine how the text should read in the verbatim window (Verbatim 606) and make modifications as needed in final report or document (Final 608).

The text within the modifiable windows 606, 608 conveys more information than the tangible embodiment of the spoken word. Depending upon how the four windows (Transcribed Text, Secondary Transcribed Text, Verbatim Text, and Final Text) are positioned, text within the modifiable windows 606, 608 may be aligned "horizontally" (side-by-side) or "vertically" (above or below) with the transcribed text of the transcribed text windows 602, 604 which, in turn, is associated to the audio file 205. This visual alignment permits a correctionist using the speech editor 225 of the invention to view the text within the final and verbatim windows 606, 608 while audibly listening to the actual words spoken by a speaker. Depending upon playback options selected, the correctionist may listen to some audio preceding and/or trailing the audio associated to the text that was selected. This improves audio recognition at the text boundary, as well as permitting the transcriptionist to quickly check audio for matches adjacent to the text differences. Both audio and visual cues may be used in generating the final and verbatim text in windows 606, 608.

In the example, the original audio dictated, with simple formatting commands, was "Chest and lateral ["new paragraph"] History ["colon"] pneumonia ["period"] ["new paragraph"] Referring physician ["colon"] Dr. Smith ["period"] ["new paragraph"] Heart size is mildly enlarged ["period"] There are prominent markings of the lower lung fields ["period"] The right lung is clear ["period"] There is no evidence for underlying tumor ["period"] Incidental note is made of degenerative changes of the spine and shoulders ["period"] Follow-up chest and lateral in 4 to 6 weeks is advised ["period"] ["new paragraph"] No definite evidence for active pneumonia ["period"].

Once a transcribed file has been loaded, the first few words in each text window 602, 604, 606, and 608 may be highlighted. If the correctionist clicks the mouse in a new section of text, then a new group of words may be highlighted identically in each window 602, 604, 606, and 608. As shown the verbatim text window 606 and the final text window 608 of FIG. 6, the words and "an ammonia" and "doctors met" in the IBM Viavoice™-generated text have been corrected. The words "Doctor Smith." are highlighted. This highlighting works to inform the correctionist which group of words they are editing. Note that in this example, the correctionist has not yet corrected the misrecognized text "Just". This could be modified later.

In one embodiment, the invention may rely upon the concept of "utterance." Placeholders may delineate a given text into a set of utterances and a set of phrases. In speaking or reading aloud, a pause may be viewed as a brief arrest or suspension of voice, to indicate the limits and relations of sentences and their parts. In writing and printing, a pause may be a mark indicating the place and nature of an arrest of voice in speaking. Here, an utterance may be viewed as a group of words separated by a pause from another group of words. Moreover, a phrase may be viewed as a word or a first group of words that match or are different from a word or a second group of words. A word may be text, formatting characters, a command, and the like.

By way of example, the Dragon NaturallySpeaking™ engine works on the basis of utterances. In one embodiment, the phrases do not overlap any utterance placeholders such that the differences are not allowed to cross the boundary from one utterance to another. However, the inventors have discovered that this makes the process of determining where utterances in an IBM Viavoice™ SDK speech engine generated transcribed file are located difficult and problematic. Accordingly, in another embodiment, the phrases are arranged irrespective of the utterances, even to the point of overlapping utterance placeholder characters. In a third embodiment, the given text is delineated only by phrase placeholder characters and not by utterance placeholder characters.

Conventionally, the Dragon NaturallySpeaking™ engine learns when training occurs by correcting text within an utterance. Here the locations of utterances between each utterance placeholder characters must be tracked. However, the inventors have noted that transcribed phrases generated by two speech recognition engines give rise to matches and differences, but there is no definite and fixed relationship between utterance boundaries and differences and matches in text generated by two speech recognition engines. Sometimes a match or difference is contained within the start and end points of an utterance. Sometimes it is not. Furthermore, errors made by the engine may cross from one Dragon NaturallySpeaking™-defined utterance to the next. Accordingly, speech engines may be trained more efficiently when text is corrected using phrases (where a phrase may represent a group of words, or a single word and associated formatting or punctuation (e.g., "new paragraph" [double carriage return] or "period" [.] or "colon" [.]). In other words, where the given text is delineated only by phrase placeholder characters, the speech editor 225 need not track the locations of utterances with utterance placeholder character. Moreover, as discussed below, the use of phrases permit the process 200 to develop statistics regarding the match text and use this information to make the correction process more efficient.

1. Efficient Navigation

The speech editor 225 of FIG. 2 becomes a powerful tool when the correctionist opens up the transcribed file from the second speech engine 213. One reason for this is that the transcribed file from the second speech engine 213 provides a comparison text from which the transcribed file "A" from the first speech engine 211 may be compared and the differences highlighted. In other words, the speech editor 225 may track the individual differences and matches between the two transcribed texts and display both of these files, complete with highlighted differences and unhighlighted matches to the correctionist.

GNU is a project by The Free Software Foundation of Cambridge, Mass. to provide a freely distributable replacement for Unix. The speech editor 225 may employ, for example, a GNU file difference compare method or a Windows FC File Compare utility to generate the desired difference.

The matched phrases and difference phrases are interwoven with one another. That is, between two matched phrases may be a difference phrase and between two difference phrases may be a match phrase. The match phrases and the difference phrases permit a correctionist to evaluate and correct the text in a the final and verbatim windows 606, 608 by selecting just differences, just matches, or both and playing back the audio for each selected match or phrase. When in the "differences" mode, the correctionist can quickly find differences between computer transcribed texts and the likely site of errors in any given transcribed text.

In editing text in the modifiable windows 606, 608, the correctionist may automatically and quickly navigate from match phrase to match phrase, difference phrase to difference phrase, or match phrase to contiguous difference phrase, each defined by the transcribed text windows 602, 604. Jumping from one difference phrase to the next difference phrase relieves the correctionist from having to evaluate a significant amount of text. Consequently, a transcriptionist need not listen to all the audio to determine where the probable errors are located. Depending upon the reliability of the transcription for the matches by both engines, the correctionist may not need to listen to any of the associated audio for the matched phrases. By reducing the time required to review text and audio, a correctionist can more quickly produce a verbatim text or final report. As mentioned, however, depending upon playback options selected, the correctionist may listen to some audio preceding and/or trailing the audio associated to the text difference that was selected. This improves audio recognition at the text boundary, as well as permitting the transcriptionist to quickly check audio for matches adjacent to the text differences.

2. Reliability Index

"Matches" may be viewed as a word or a set of words for which two or more speech engines have transcribed the same audio file in the same way. As noted above, it was presumed that if two speech recognition programs manufactured by two different corporations are employed in the process 200 and both produces transcribed text phrases that match, then it is likely that such a match phrase is correct and consideration of it by the correctionist may be skipped. However, if two speech recognition programs manufactured by two different corporations are employed in the process and both produces transcribed text phrases that match, there still is a possibility that both speech recognition programs may have made a mistake. For example, in the screen shots accompanying FIG. 6, both engines have misrecognized the spoken word "underlying" and transcribed "underlining". The engines similarly misrecognized the spoken word "of" and transcribed "are" (in the phrase "are the spine"). While the evaluation of differences may reveal most, if not all, of the errors made by a speech recognition engine, there is the possibility that the same mistake has been made by both speech recognition engines 211, 213 and will be overlooked. Accordingly, the speech editor 225 may include instructions to determine the reliability of transcribed text matches using data generated by the correctionist. This data may be used to create a reliability index for transcribed text matches.

In one embodiment, the correctionist navigates difference phrase by difference phrase. Assume that on completing preparation of the final and verbatim text for the differences in windows 606, 608, the correctionist decides to review the matches from text in windows 602, 604. The correctionist would go into "matches" mode and review the matched phrases. The correctionist selects the matched phrase in the transcribed text window 602, 604, listens to the audio, then corrects the match phrase in the modifiable windows 606, 608. This correction information, including the noted difference and the change made, is stored as data in the reliability index. Over time, this reliability index may build up with further data as additional mapping is performed using the word mapping function.

Using this data of the reliability index, it is possible to formulate a statistical reliability of the matched phrases and, based on this statistical reliability, have the speech editor 225 automatically judge the need for a correctionist to evaluate correct a matched phrase. As an example of skipping a matched phrase based on statistical reliability, assume that the Dragon NaturallySpeaking™ engine and the IBM Viavoice™ engine are used as speech engines 211, 213 to transcribe the same audio file 205 (FIG. 2). Here both speech engines 211, 213 may have previously transcribed the matched word "house" many times for a particular speaker. Stored data may indicate that neither engine 211, 213 had ever misrecognized and transcribed "house" for any other word or phrase uttered by the speaker. In that case, the statistical reliability index would be high. However, past recognition for a particular word or phrase would not necessarily preclude a future mistake. The program of the speech editor 225 may thus confidently permit the correctionist to skip the match phrase "house" in the correction window 606, 608 with a very low probability that either speech engine 211, 213 had made an error.

On the other hand, the transcription information might indicate that both speech engines 211, 213 had frequently mistranscribed "house" when another word was spoken, such as "mouse" or "spouse". Statistics may deem the transcription of this particular spoken word as having a low reliability. With a low reliability index, there would be a higher risk that both speech engines 211, 213 had made the same mistake. The correctionist would more likely be inclined to select the match phrase in the correction window 606, 608 and playback the associated audio with a view towards possible correction. Here the correctionist may preset one or more reliability index levels in the program of the speech editor 225 to permit the process 200 to skip over some match phrases and address other match phrases. The reliability index in the current application may reflect the previous transcription history of a word by at least two speech engines 211, 213. Moreover, the reliability index may be constructed in different ways with the available data, such as a reliability point and one or more reliability ranges.

3. Pasting

Word processors freely permit the pasting of text, figures, control characters, "replacement" pasting, and the like in a Microsoft Word™ document. Conventionally, this may be achieved through control-v "pasting." However, such free pasting would throw off all text tracking of text within the modifiable windows 606, 608. In one embodiment, each of the transcribed text windows 602, 604 may include a paste button 610. In the dual speech engine mode where different transcribed text fills the first transcribed text window 602 and the second transcribed text window 604, the paste button 610 saves the correctionist from having to type in the correction window 606, 608 under certain circumstances. For example, assume that the second speech engine 213 is better trained than the first speech engine 211 and that the transcribed text from the first speech engine 211 fills the windows 602, 606, and 608. Here the text from the second speech engine 213 may be pasted directly into the correction window 606, 608.

Alternatively, the secondary transcribed text window 604 may contain manually transcribed text from the same audio file. Text from this window may be pasted directly into the verbatim and final text correction windows 606, 608. This may be used for rapid generation of verbatim text for speech recognition training, as was described in U.S. Pat. No. 6,122, 614, entitled "System and Method for Automating Transcription Services" and incorporated herein by reference, in which assignee of the invention disclosed a method for rapid production of verbatim text by comparing output from speech recognition and manual transcription generated from the same audio file. Other potential uses of this comparison technique include, but are not limited to, various forms of quality assurance—for example, checking speech recognition accuracy against a known typed standard, or comparing manually transcribed text with computer generated output.

However, there is no requirement that the secondary transcribed window 604 contain text derived from the same audio file. As described above, the graphical user interface (FIG. 3) permits the user to text from any source may be placed into that correction window.

4. Deleting

Under certain circumstances, deleting words from one of the two modifiable windows 606, 608 may result in a loss its associated audio. Without the associated audio, a human correctionist cannot determine whether the verbatim text words or the final report text words matches what was spoken by the human speaker. In particular, where an entire phrase or an entire utterance is deleted in the correction window 606, 608, its position among the remaining text may be lost. To indicate where the missing text was located, a visible "yen" ("¥") character is placed so that the user can select this character and play back the audio for the deleted text. In addition, a repeated integral sign ("§") may be used as a marker for the end point of a match or difference within the body of a text. This sign may be hidden or viewed by the user, depending upon the option selected by the correctionist.

For example, assume that the text and invisible character phrase placeholders "§" appeared as follows:

§1111111§§2222222§§33333333333§§§4444444§§55555555§

If the phrase "33333333333" were deleted, the inventors discovered that the text and phrase placeholders "§" would appeared as follows:

§1111111§§2222222§§§§4444444§§55555555§

Here four placeholders "§" now appear adjacent to one another. If a phrase placeholder was represented by two invisible characters, and a bolding placeholder was represented by four invisible placeholders, and the correctionist deleted an entire phrase, the four invisible characters which would be misinterpreted as a bolding placeholder.

One solution to this problem is as follows. If an utterance or phrase is reduced to zero contents, the speech editor 225 may automatically insert a visible placeholder character such as "¥" so that the text and phrase placeholders "§" may appeared as follows:

§1111111 §§2222222§§¥§§4444444§§55555555§

This above method works to prevent characters from having two identical types appear contiguously in a row. Preferably, the correctionist would not be able to manually delete this character. Moreover, if the correctionist started adding text to the space in which the visible placeholder character "¥" appears, the speech editor 225 may automatically remove the visible placeholder character "¥".

5. Audio Find Function

Figure 13:
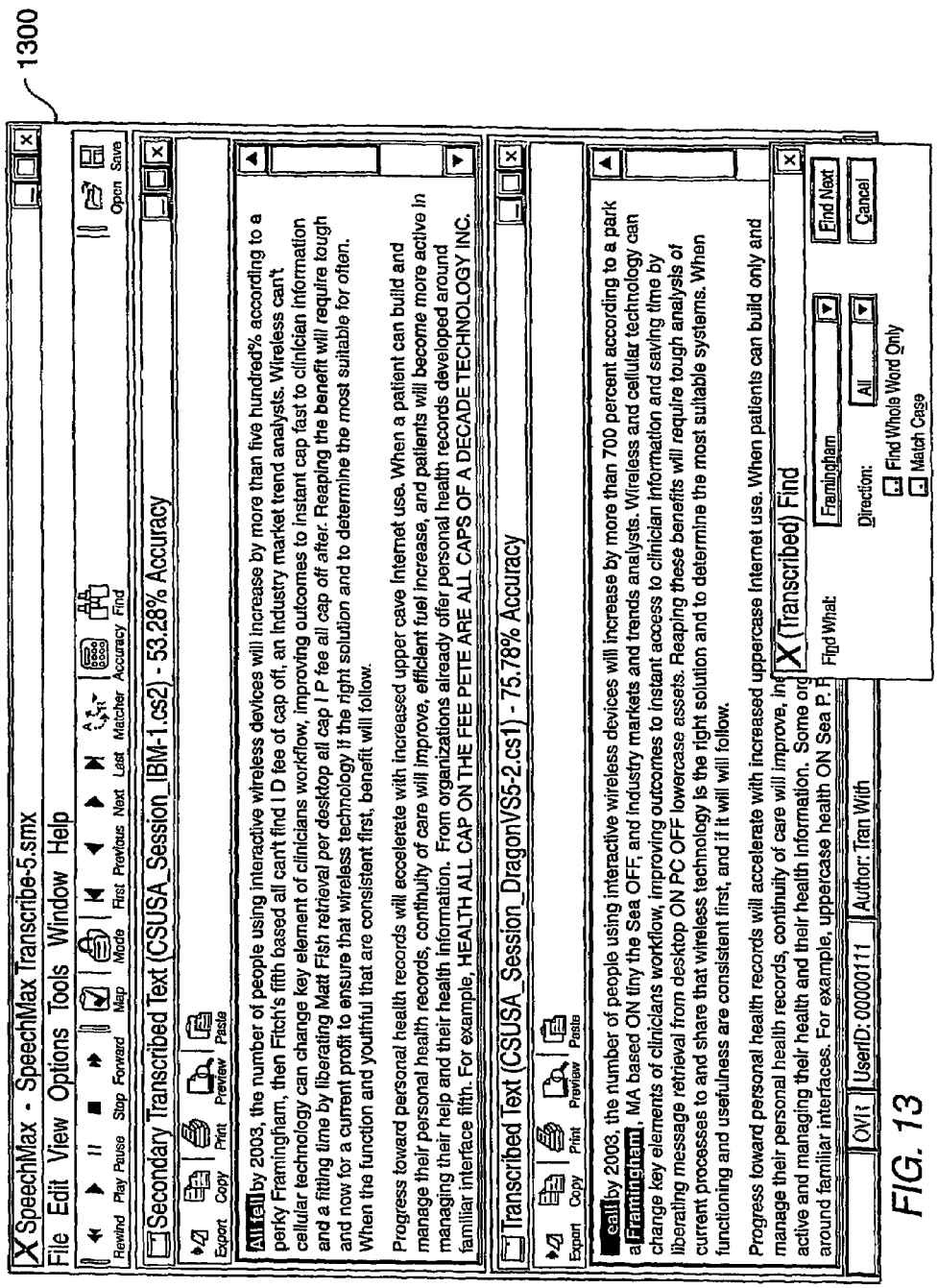
FIG. 13 is a view of an exemplary graphical user interface depicting an audio mining feature 1300.

In one embodiment, functionality may be provided to locate instances of a spoken word or phrase in an audio file. The audio segment for the word or phrase is located by searching for the text of the word or phrase within the transcribed text and then playing the associated audio segment upon selection of the located text by the user. In one embodiment, the user may locate the word or phrase using a "find" utility, a technique well-known to those skilled in the art and commonly available in standard word processors. As shown in FIG. 13, the Toolbar 1302 may contain a standard "Find" button 1304 that enables the user to find a word in the selected text window. The same "find" functionality may also be available through the Edit menu item 1306.

One inherent limitation of current techniques for locating words or phrases is the unreliability of the speech recognition process. Many "found" words do not correspond to the spoken audio. For example, a party may wish to find the audio for "king" in an audio file. The word "king" may then be located in the text generated by the first speech recognition software by using the "find" utility, but the user may discover that audio associated with the found word is "thing" instead of "king" because the speech engine has incorrectly transcribed the audio. In order to enhance the reliability of the find process, the text file comparison performed by the speech editor 228 may be used to minimize those instances where the spoken audio differs from the located word or phrase in the text.

Figure 14:
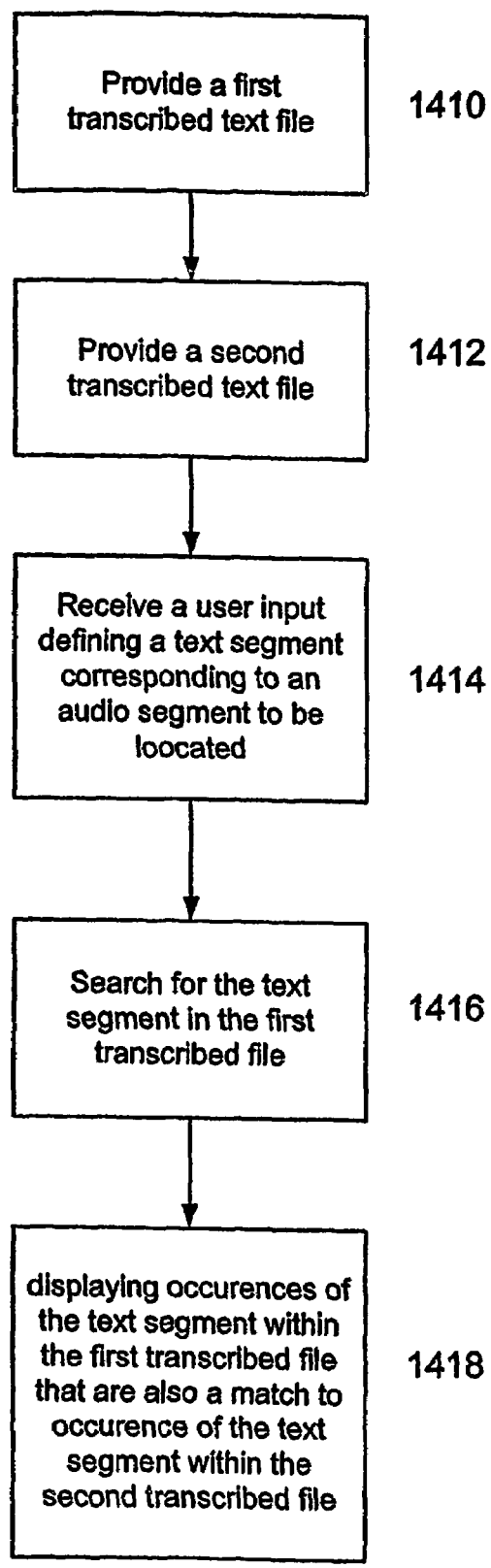
FIG. 14 is a flow diagram illustrating a process of locating an audio segment within an audio file.

As discussed above, a speaker starts at begin 202 and creates an audio file 205. The audio file is transcribed 210 using first and second speech engines 212. (steps 1410 and 1412 in FIG. 14) The compressed session file (.csf) and/or engine session file (.ses) are generated for each speech engine and opened in the speech editor 228. The speech editor 228 may then generate a list of "matches" and "differences" between the text transcribed by the two speech recognition engines. A "match" occurs when a word or phrase transcribed from an audio segment by the first speech recognition engine is the same as the word or phrase transcribed from the same audio engine by the second speech recognition software. A "difference" then occurs when the word or phrase transcribed by each of the two speech recognition engines from the same audio segment is not the same. In an alternative embodiment, the speech editor may instead find the "matches" and "differences" between a text generated by a single speech engine, and the verbatim text produced by a human transcriptionist.

To find a specific word or phrase, a user may input a text segment, corresponding to the audio word or phrase that the user wishes to find, by selecting Find Button 1304 and entering the text segment into the typing field. (Step 1414) Once the user has input the text segment to be located, the find utility may search for the text segment within the first transcribed file. (Step 1416) To increase the probability that the located text corresponds to the correct audio, the "matches" of the searched word or phrase are then displayed in the Transcribed Text window 602. (Step 1418) The "matches" may be indicated by any method of highlighting or other indicia commonly known in the art for displaying words located by a "find" utility. In one embodiment, as shown in FIG. 13, only the "matches" 1308 are displayed in the Text Window 602. In an alternative embodiment, the "matches" and the "differences" may both be displayed using different indicia to indicate which text segments are "matches" and which are "differences." This process could alternatively generate a list that could be referenced to access and playback separate instances of the word or phrase located in the audio file.

Agreement by two speech recognition engines (or a single speech recognition engine and human transcribed verbatim text) increases the probability that there has been a proper recognition by the first engine. The operator may then search the "matches" 1308 in the Transcribed Text window 602 for the selected audio word or phrase. Since the two texts agree, it is more likely that the located text was properly transcribed and that the associated audio segment correctly corresponds to the text.

Using any of these disclosed approaches, there is a higher probability of locating a useful snippet of audio that may be desired for other uses. For instance, audio clips of various speakers uttering numbers (e.g. "one," "two," "three") may have utility in designing more robust voice-controlled call centers. Particularly desirable audio clips may be useful in designing new speech models or specialized vocabularies for speech recognition. In fact, by using only selected audio/text clips, confidentiality concerns that could arise from supplemental use of client dictation is significantly, if not totally, alleviated.

6. Comparison of Text Generated by a Speech Engine with Text from Another Source The invention described above deals primarily with text production by two speech engines from a single audio file. As indicated, the user can substitute text from any source into the secondary transcribed text window 604 using browse window to locate and insert the text file. The text file may have been generated from the same or different audio file or from another source.

Consequently, it is possible to use the secondary transcribed text window 604 to compare text generated from a different audio source to text generated by a speech engine using audio source 205. As indicated, using the graphical user interface (FIG. 3) the user may select a text file from any source to place into the secondary transcribed text window 604. This can be of particular importance where the dictating speaker has previously dictated a report or document similar or identical to the current dictation represented by audio source 205. In these cases, the previous final text may be used as a template for rapid preparation of final text from the new audio file using the above described comparison techniques.

Furthermore, with the graphical user interface (such as that depicted in FIG. 20), the user may elect to open a text file from a single speech engine in the transcribed text window 602, and open the preexisting text file in the secondary transcribed text file window 604 in the verbatim and final text windows 606, 608 via option 2002 or 2004. Using the paste function, the transcriptionist can quickly place newly dictated and transcribed text into the correction windows 606, 608 and edit if required as explained in further detail below (e.g., see FIG. 23).

In one embodiment, the speaker has previously created audio file 205. This has been transcribed by two speech engines and final text created in correction window 608 and saved as a file in a directory or subdirectory known to the correctionist. When the speaker creates a new audio file, this may be transcribed by two speech engines. As described above, the correctionist may use the graphical user interface (such as FIG. 3) to substitute text from any source into the secondary transcribed text window 604. This permits the correctionist to compare the output text from the new audio source and a speech engine to the previously created report or document. If the speaker has dictated an identical report or document and the speech engine has transcribed it 100% accurately, there will be no differences identified. An experienced correctionist can visually scan the text in the transcribed text 602 or final text 608 windows and decide whether there is a need to listen to any audio to the audio before returning the final text for approval by the dictating speaker or saving the final text for other purpose.

In an alternative embodiment, changes to the final text may be proposed based upon the differences between the transcribed text and the substitute text. For example, if it is determined that a paragraph in the substitute text is substantially identical to a paragraph in the transcribed text except for a single different word, the final text in window 608 may be automatically corrected by deleting the word in the final text found to be different and inserting the word from the substitute text. The user may then be prompted to accept or deny this change.

In another embodiment, a user may be able to search for a previously created document that has text which is similar to the text in the transcribed text. In one approach, the user may be able to search all of the previously created files based on various criteria, such as dictating author, subject, or other type of variable that is saved in conjunction with the file, either in the path name of the file or in a header associated with the file. In another approach, the user may also be able to search for a previously created document by searching for similar text. For example, a user may highlight a portion of the text in the transcribed text and then press a find key (not shown). All of the previously created documents, or a selected subset thereof, will then be searched to determine if those documents contain a portion of text that is substantially similar to the highlighted portion. If a previously created text with a substantially similar portion of text is found, it can then be loaded as a comparison text to the transcribed text.

In yet another alternative embodiment, the system can automatically place substitute text from a previous dictation as a comparison text. Once again, this may be based upon default configuration or selection criteria, such as dictating author, subject of dictation, document type, or other variable contained in path ("string") of the folder/file of the earlier created final text.

In those cases where there is less than 100% accuracy in the speech engine's transcription and/or there are differences in the actual dictated content between audio file 205 and a subsequent audio file, there could still be considerable time savings in using the comparison method described above. Often the dictating speaker makes very few, if any changes, in the dictated report or document and relies extensively upon "boilerplate" and other standard language. This is true in health care, law, insurance, public safety, manufacturing, and other fields where dictated reports and documents use the same format and contain similar if not identical content.

For example, a physician may see a patient periodically for a chronic, long-term illness. There may be very little change in the dictated report for each patient visit where the patient's condition is stable, except for changes in the date and, possibly, a few other items. In these circumstances, in transcribing the new report, it is very useful for a transcriptionist to see what the doctor dictated before and be able to copy identical language rapidly from an earlier report into the current transcription. If the transcriptionist can quickly identify the location of differences between the current dictation, and the earlier dictation represented by audio source 205, he or she can quickly listen to the audio for the probable differences, determine if an error was made by the speech engine in transcribing the current dictation, make any required correction, and then use standard paste functions to insert "matches" into the current report. If the author is using a standard template and the original transcription was reviewed for accuracy, the matches most likely reflect "boilerplate" or other language repeated by the author in the second dictation.

Figure 15:
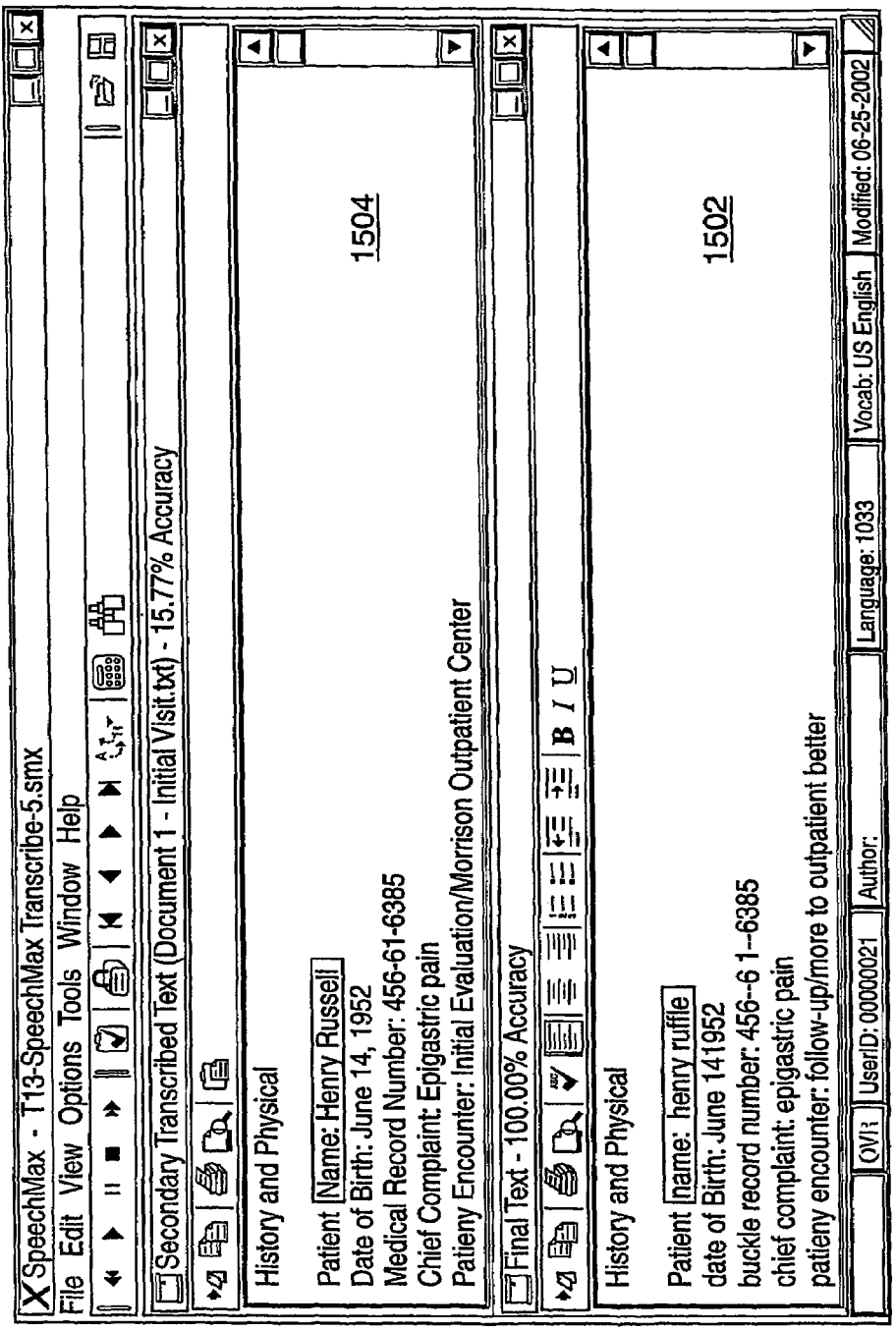
FIG. 15 is a view of an exemplary user interface to support the present invention.

FIGS. 15-17 shows one exemplary embodiment of the present invention. FIG. 15 shows a window 1504 displaying a first text which was previously transcribed, and preferably corrected for any errors, from a audio file created during a patient's initial visit to a doctor. A complete version of the first text is shown in FIG. 16. Referring back to FIG. 15, Window 1502 displays a second text that was transcribed using a speech recognition software during a subsequent second visit to the doctor. A correctionist may then compare the second text in window 1502 with the first text in window 1504 in order to quickly determine if there are any errors that were created during the transcription of the second text. As may be seen from FIG. 15, the speech recognition software incorrectly transcribed the patient's name as "henry ruffle." By comparing the second text with the first text, the correctionist may edit the name in the second text to the correct spelling, "Henry Russell." A final version of the second text after correction is shown in FIG. 17.

Figure 18:
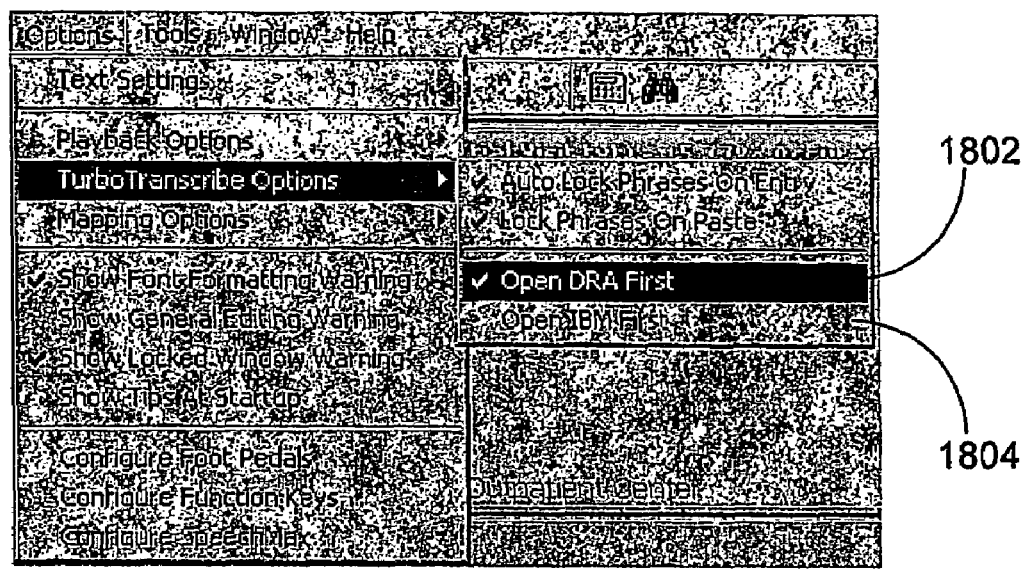
FIG. 18 is an example of a user interface to support the present invention.
Figure 19:
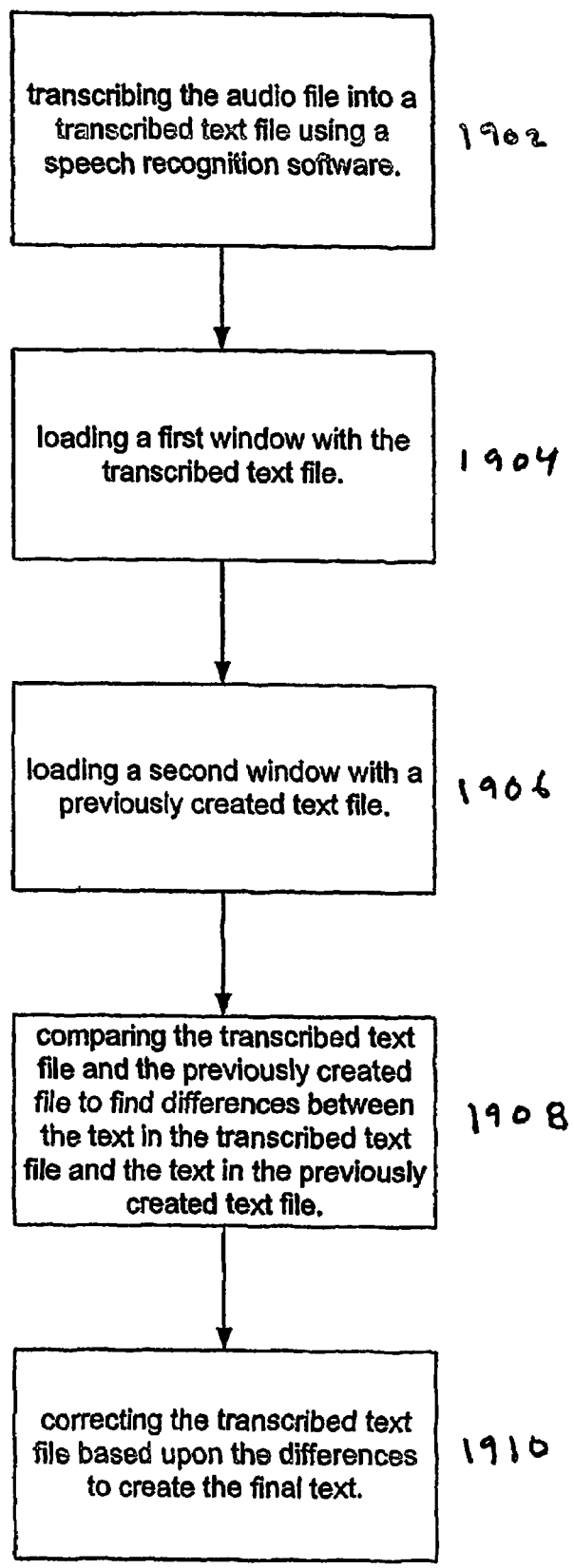
FIG. 19 is a flow diagram illustrating a process of comparing a previously created text file with a transcribed text file.

FIG. 18 further shows another embodiment of the invention having a user interface that allows a user to determine the order in which the transcribed text files are loaded into the windows. As discussed above, the present invention allows an audio file to be transcribed using two different speech recognition engines in order to compare difference between the two transcribed files. If a user selects the option "OPEN DRA FIRST" 1802, the interface will load a text file transcribed using the Dragon NaturallySpeaking™ engine from a WAV file on a server into the transcribed text window 602 and the final text window 608. The user may also open a Dragon NaturallySpeaking™ session file (.dra) created from local real time speech recognition by a dictating user and view the associated text file. A text file transcribed using the IBM Viavoice™ engine is then loaded into text window 604. The text in window 604 may then be substituted with a previously created substitute text as shown in FIG. 15. As such, the user will be able to compare an audio file transcribed using Dragon NaturallySpeaking™ with a previously created text file.

If the user wishes to compare the previously created text file with a text file created by transcribing an audio file using IBM Viavoice™, the user may choose "OPEN IBM FIRST" 1804. As a result, a text file transcribed using IBM Viavoice™ is loaded into windows 602 and 608, and the text file transcribed using Dragon NaturallySpeaking™ is loaded into window 604. The text file in window 604 may then be substituted with a previously created text file, allowing the user to compare the previously created text file with the text file transcribed using IBM ViaVoice™.

In another embodiment, the graphical user interface (such as that shown in FIG. 20) permits the user to determine which speech recognition text will be loaded in the primary transcribed text window 602. This interface permits the user to select a text file from any source using a browse function to load the secondary transcribed text window 604.

This method offers distinct advantages to those currently employed. Currently, automatic transcription using speech recognition is not widely used. Using standard, manual transcription the transcriptionist must listen to the entire dictated audio and type the report "from scratch." With conventional speech recognition, the transcriptionist has no way of knowing before hand where the probable differences are between the text created from the original audio file and the currently dictated report. The method disclosed in this invention permits much, if not all, of the report to be automatically transcribed by a speech recognition system. "Error spotting" techniques locate differences between the speech recognition text and the previously transcribed text, minimizing the audio that the transcriptionist must listen to.

The current invention also provides advantages compared to "structured" reporting and other similar systems using speech recognition. In these cases, templates are prepared using standard, repeated language. Blanks are left for the author to "fill in" by dictating a word or phrase that is transcribed by a speech recognition system in real time. The author sits at a computer station, dictates and reviews the transcribed text, and then moves the cursor to the next field. In some systems, the dictating author must correct the errors made by the speech engine. In others, this may be done later by an editor. Unlike the current invention, this structured reporting system forces the dictating author to view the template on a screen and necessarily requires a computer monitor for operation. On the other hand, the current invention affords the dictating user considerable mobility. The dictating author may use a template displayed on a monitor, but dictation, with or without reference to a paper form, into a handheld recorder or telephone at any site is also possible.

7. Comparison of Text Generated by a Speech Engine with a Form

Text comparison using speech engine output and text file from a previous, similar dictation is one case of many where user elects to compare single engine output with a text file. Text comparison using single engine output may also be used for rapid generation of verbatim text for speech recognition training or for quality assurance to check the accuracy of computer or human generated text. Another potential use is the rapid completion of forms using speech recognition by comparing engine output with a preexisting form.

Forms are ubiquitous in all businesses and organizations, and are created to assist in collecting and storing information. Text comparison using single engine speech engine output as well as "dual-engine" comparison may be used to facilitate rapid form completion.

a. Completion of Form Using Single Engine Mode

It is possible to use the secondary transcribed text window 604 to display text representing a form and compare that form's text to text generated by a single speech engine (Dragon or IBM) using audio source 205 .wav file. In this case, the text from session file (.ses) or compressed session file (.csf) will be opened into the primary transcribed text window 602. It is also possible to open a Dragon session file (.dra) that was originally produced by a speaker dictating into a computer and transcribing in real-time using the off-the-shelf Dragon NaturallySpeaking™ software. In this case the user may have saved the dra file to a local or network drive. The associated text may be in .txt or .rtf format. The session file contains audio aligned to text, but no separate WAV file is available. If the user opens the locally-produced .dra file as a primary transcribed text, the text will be opened into the primary transcribed text 602 window.

Using the graphical user interface (FIG. 3), the correctionist may place the text file corresponding to the desired form into the secondary transcribed text window 604. In one embodiment, using controls (e.g., via options 2002 or 2004 in FIG. 20) available through another embodiment of the graphical user interface, the correctionist can load the form into the verbatim text and final text windows 606, 608. Using the paste function, the transcriptionist may also place some or all of the text transcribed by the speech engine into the verbatim and final text windows 606, 608, and edit as required.

Figure 21:
FIG. 21 is an example of a report form 2100.
Figure 25A:
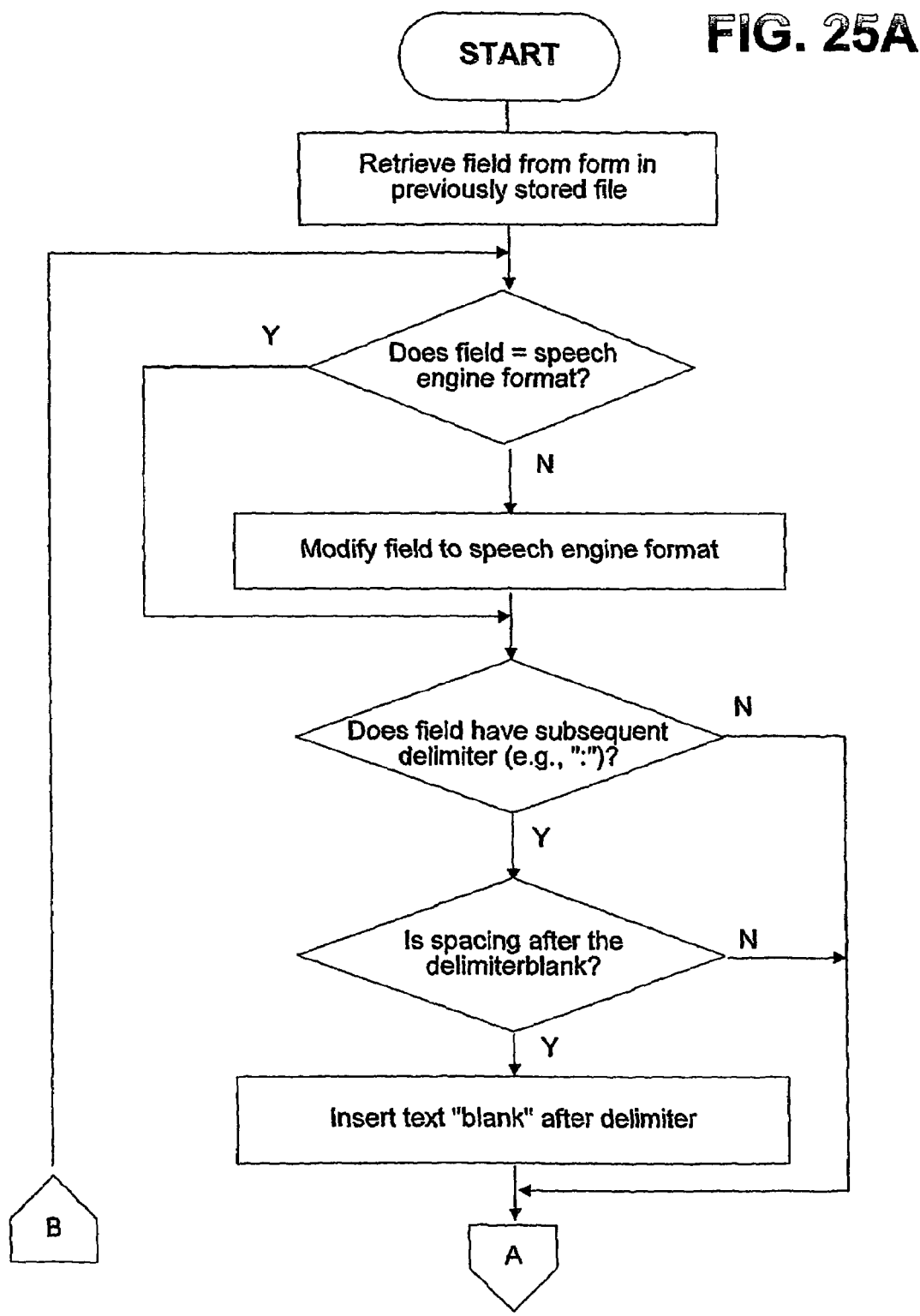
FIGS. 25A-B depict a flow diagram illustrating the process of creating the modified report and comparing the modified report form with the speech recognition text.
Figure 25B:
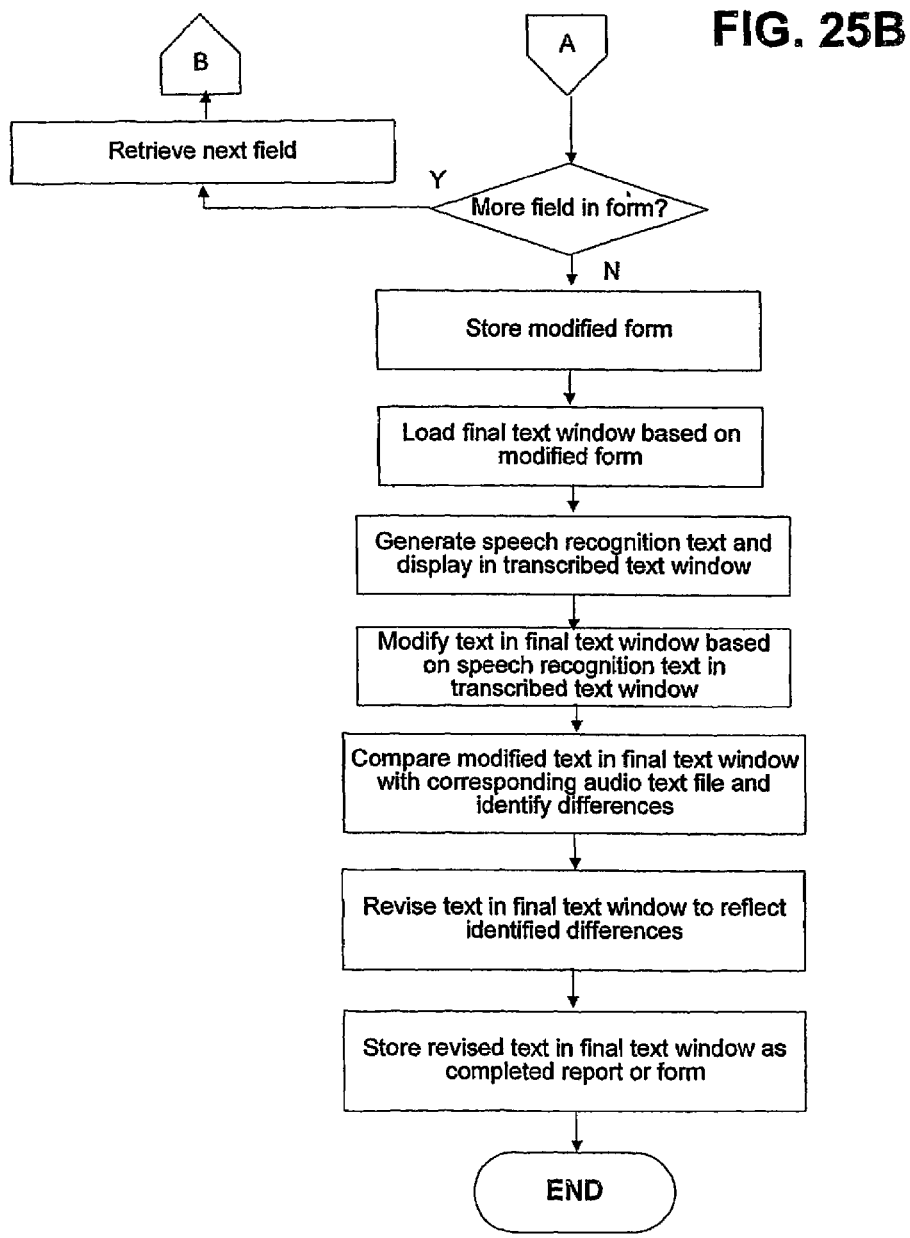

In one embodiment, shown in flow diagram FIG. 25, the speaker has previously created audio file 205. This audio file will have been transcribed by one or two speech engines. A form has been previously saved as a text file 2100 in a directory or subdirectory known to the correctionist. The correctionist may use the graphical user interface (FIG. 3) to substitute text from any source into the secondary transcribed text window 604, including the form 2100. This permits the correctionist to compare the output text from the audio source 205 and a speech engine to the form 2100. An example of a form, that might be used for a patient medical note, is provided in FIG. 21.

Due to formatting of text output by the speech engines, there may be a great number of differences detected between the fields in the form, and the fields dictated by the speaker in audio file 205, even when the speech engine achieves 100% accuracy in its speech-to-text conversion. For example, the form may have some first letters in the field name capitalized (e.g., "Date of Birth"), but the speech engine may automatically format text output such that only the first word in a field name is capitalized (e.g., "Date of birth") or none at all (e.g., "date of birth"). In addition, the distributed report or document may have identifying information about the organization, report or document title, and other text that was added later by a transcriptionist using a formatting template or "shell" (also known as "transcription shell"), or by post processing software that automatically adds the information in a separate step on the same or different computer on a workflow. For example, in a medical report, the name and address of the hospital or clinic, phone and fax number, name of transcriptionist, date of transcription, referring physician, admitting diagnosis, previous admissions, and other information may be included in the final, distributed report. This "shell" text is not commonly dictated by the user, and is usually added by the transcriptionist or post-processing workflow software after the dictation has been transcribed. The additional "shell" text will also appear as differences using text comparison, although the speech engine transcribed the dictated audio file 205 with complete, 100% accuracy.

To reduce the time evaluating "differences" between the text in form 2100 and text output from transcribing audio file 205 that are not due to actual speech engine misrecognitions, it is preferable to create a modified form that may be used for a single or multiple speakers. Depending upon the dictating characteristics of the speakers, the modified form for each speaker may vary.

In an alternative embodiment, shown in flow diagram FIG. 25, a modified form has been created and saved as a file 2200 (FIG. 22) in a directory or subdirectory known to the correctionist. This modified form has been created to facilitate rapid entry of text into a form using text comparison with speech engine text generated by audio file 205. The modified form does not include information generally not dictated by the speaker, and uses capitalization format for fields identical to that produced by the speech engine. For example, instead of "Medical Record Number:" the modified form 2200 uses "Medical record number:" To reduce the number of differences due to in spacing after the colon (":"), the form includes the text "blank" after the colon using the same spacing as the speech engine text output. Those familiar with the art will recognize that other modifications may be necessary based upon the characteristics of the speech engine text output.

Figure 23:
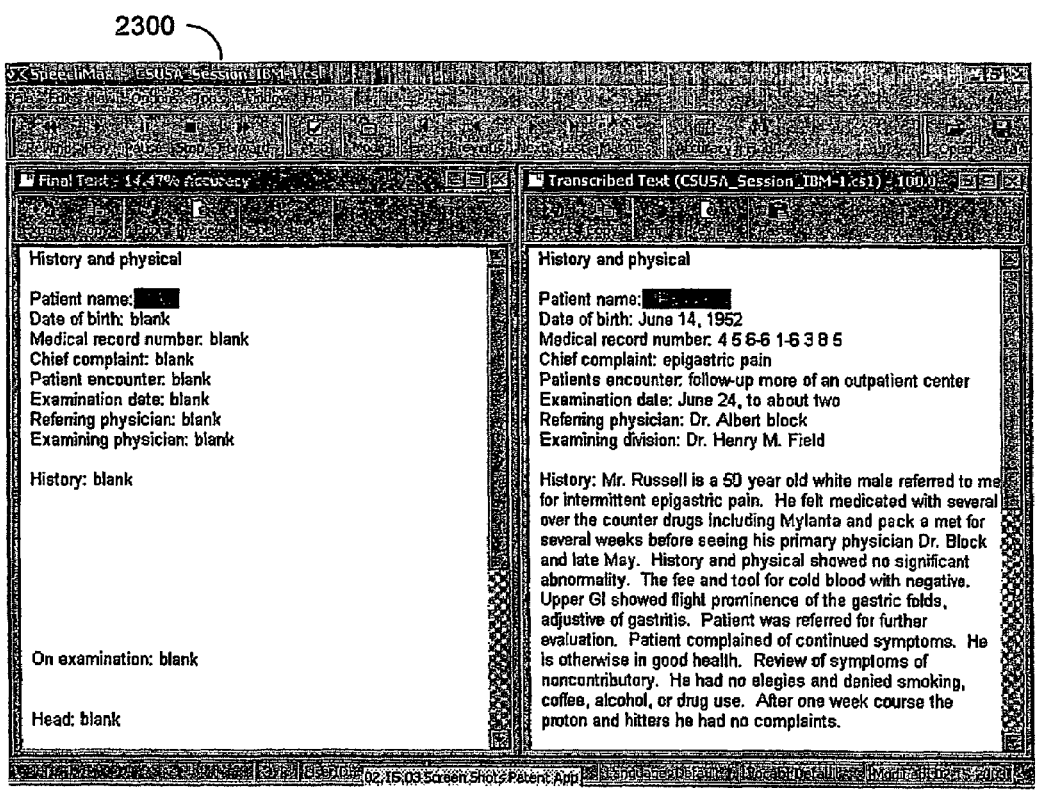
FIG. 23 is a view of an exemplary user interface 2300 displaying final text based on the modified report and corresponding speech recognition text in accordance with the present invention.

If the speaker has dictated the field names, punctuation, new line, and new paragraph and other text for modified form 2200 and the speech engine correctly transcribes the dictation, according to the current invention, the differences detected will be the field content represented by "blank" in the modified form 2200, and the dictated text. The modified form text 2200 is loaded (e.g., via options 2002 or 2004 of FIG. 20) into the verbatim text 606 and final text 608 windows as shown in FIG. 23. Each of the detected differences between the modified form text 2200 shown in final text 608 window and the transcribed text 604 will represent the dictated information for the field. Using the paste function from the underlying operating system, the correctionist can quickly fill in the blanks on the form in the final text 608 window from transcribed text window 604.

Once the final text 608 is edited, a completed form 2400 has been created. An example of this completed form, a patient medical note, is provided in FIG. 24. Now, this completed form 2400 can be post-processed to add header, footer, and other formatting. This transcription "shell," which includes header, footer, and other formatting, can be added by a transcriptionist by copying and pasting the completed form 2400 to a standard word processor such as Word™ or WordPerfect™. Necessary formatting changes, such as capitalization changes, can be made by using standard search/replace functionality. This can be accomplished more readily by creation of macro tools that automatically search and replace certain words in the raw report and by adding the transcription "shell." For example, the distributed completed form may have "Medical Record Number" instead of "Medical record number." Alternatively, the completed form 2400 can be post-processed on a workflow using document processor software such as Document Processor Server (distributed by Custom Speech USA, Inc.) to add the necessary changes.

In addition, the text data for each field may be post-processed to extract the data for entry into a spreadsheet or database. This can be performed using a document processor server or standard document processing and data extraction applications. Those with sufficient skill and knowledge of the art will recognize that these options are not exclusive, and that other alternatives to format and process the completed form 2400 are available. Dictation using speech recognition with text comparison, therefore, becomes an important step in the sequence of data accumulation and data entry into an organizational database.

Although the speech recognition output is usually not 100% accurate, the above-described techniques help streamline the process of form completion and data entry. Differences between the field name and the name transcribed by the speech engine can be visually detected by the editor. These do not have to be corrected and may be disregarded, as the final text window 608 displays the modified report form text 2200 which already includes the proper field names. The editor can also use the dictated audio and visual cues to determine which text goes with which field, even when the text for each field is dictated out of order with respect to the field names in the modified report form 2200, or where the speech engines may have made recognition errors. Consequently, text transcribed by the speech engine can be rapidly pasted into the final text window 608 to the appropriate field and edited, if incorrectly transcribed. A completed report form 2400 becomes available for addition of the transcription "shell," or other post-processing. One example of a completed report form is the patient medical note shown in FIG. 24.

Figure 27:
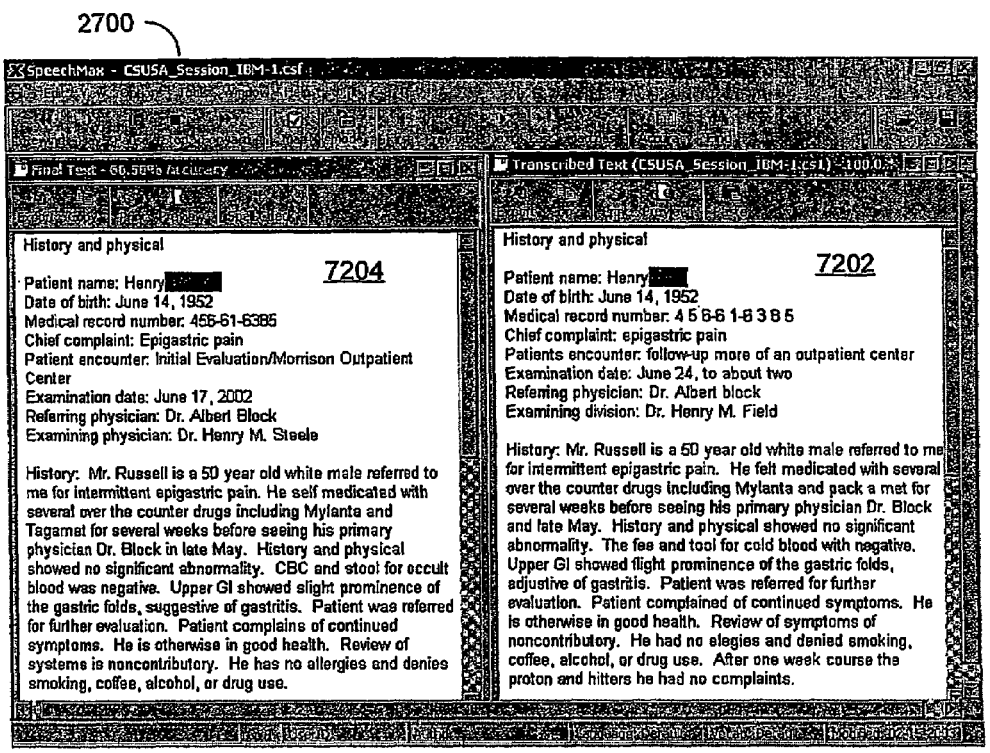
FIG. 27 is an example of an exemplary user interface 2700 displaying final text based on the initial report form and corresponding speech recognition text in accordance with the present invention.

In another alternative embodiment, a modified text form may be created that uses the modified report form 2200, but also includes transcribed text from a previous, similar report, such as completed form 2400, as described above. This modified text form with prior text or initial report form 2600 may be loaded in the verbatim and final text windows 606, 608 using the graphical user interface (e.g., see options 2002 and 2004 of FIG. 20). An example of a previously dictated text with form modification or initial report form is provided in FIG. 26, which shows a previously transcribed medical note on the same patient from an earlier date with changes made to the field names. Changes to the final text may be made after reviewing the differences between the transcribed text 2702 and the previously dictated text loaded into final text window 2704 as shown in FIG. 27. Thus, an initial report form 2600 may be used in accordance with the present inventions to generate follow-up reports by cutting and pasting from the transcribed text 2702 to the final text 2704.

These differences will be identified in a process similar to that described in FIGS. 15-17 in section 6 on use of text comparison using a text file from a different audio source, except that modifications in field name capitalization will reduce the number of "differences" detected. FIG. 15 shows a window 1504 displaying a first text which was previously transcribed and corrected from an audio file created during a patient's initial visit to a doctor. A complete version of the first text is shown in FIG. 16. Referring back to FIG. 15, Window 1502 displays a second text that was transcribed using a speech recognition software during a subsequent second visit to the doctor. As described in section 6, a correctionist may then compare the second text in window 1502 with the first text in window 1504 in order to quickly determine if there are any errors that were created during the transcription of the second text. As may be seen from FIG. 15, the speech recognition software incorrectly transcribed the patient's name as "henry ruffle." By comparing the second text with the first text the correctionist may edit the name in the second text to the correct spelling, "Henry Russell." A final version of the second text after correction is shown in FIG. 17. Similar steps would be used in comparing text in a form with modified field names and other changes to reduce the number of differences detected.

In another embodiment, a user may be able to search for a previously created document that has text which is similar to the text in the transcribed text. In one approach, the user may be able to search all of the previously created files based on various criteria, such as dictating author, subject, or other type of variable that is saved in conjunction with the file, either in the path name of the file or in a header associated with the file. In another approach, the user may also be able to search for a previously created document by searching for similar text. For example, a user may highlight a portion of the text in the transcribed text and then press a find key (not shown). All of the previously created documents, or a selected subset thereof, will then be searched to determine if those documents contain a portion of text that is substantially similar to the highlighted portion. If a previously created text with a substantially similar portion of text is found, it can be loaded as a comparison text.

In yet another alternative embodiment, the system can automatically place substitute text from a previous dictation as a comparison text. Once again, this may be based upon default configuration or selection criteria, such as dictating author, subject of dictation, document type, or other variable contained in path ("string") of the folder/file of the earlier created final text.

This method offers distinct advantages to those currently employed. Currently, automatic transcription using speech recognition is not widely used. Using standard, manual transcription the transcriptionist must listen to the entire dictated audio and type the report "from scratch." With conventional speech recognition, the transcriptionist has no way of knowing before hand where the probable differences are between the text created from the original audio file and the currently dictated report. The method disclosed in this invention permits much, if not all, of the report to be automatically transcribed by a speech recognition system. "Error spotting" techniques locate differences between the speech recognition text and the previously transcribed text, minimizing the audio that the transcriptionist must listen to.

The current invention also provides advantages compared to "structured" reporting and other similar systems using speech recognition. In these cases, templates are prepared using standard, repeated language. Blanks are left for the author to "fill in" by dictating a word or phrase that is transcribed by a speech recognition system in real time. The author sits at a computer station, dictates and reviews the transcribed text, and then moves the cursor to the next field. In some systems, the dictating author must correct the errors made by the speech engine. In others, this may be done later by an editor. Unlike the current invention, this structured reporting system forces the dictating author to view the template on a screen and necessarily requires a computer monitor for operation. On the other hand, the current invention affords the dictating user considerable mobility. The dictating author may use a template displayed on a monitor, but dictation, with or without reference to a paper form, into a handheld recorder or telephone at any site is also possible.

b. Completion of Form Using "Dual-Engine" Mode

FIG. 18 further shows embodiment of the invention having a user interface that allows a user to determine the order in which the transcribed text files are loaded into the windows. As discussed above, the present invention allows an audio file to be transcribed using two different speech recognition engines in order to compare difference between the two transcribed files. If a user selects the option "OPEN DRA FIRST" 1802, the interface will load a text file transcribed using the Dragon NaturallySpeaking™ engine into the transcribed text window 602 and the final text window 608. A text file transcribed using the IBM ViaVoice™ engine is then loaded into text window 604. The text in window 604 may then be substituted with a previously created substitute text as shown in FIG. 15. As such, the user will be able to compare the same audio file transcribed using Dragon NaturallySpeaking™ and IBM ViaVoice™.

It is also possible to open a Dragon session file (.dra) that was originally produced by a speaker dictating into a computer and transcribing in real-time using the off-the-shelf Dragon NaturallySpeaking™ software. In this case the user may have saved the dra file to a local or network drive. The associated text may be in .txt or .rtf format. The session file contains audio aligned to text, but no separate WAV file is available. If the user opens the locally-produced .dra file as a primary transcribed text, the text will be opened into the primary transcribed text 602 window. This could then be compared to text created from the same audio file using the IBM ViaVoice™ speech engine and opened in the secondary transcribed text window 604. The WAV file for transcription by the IBM speech engine can be obtained by recording audio from the Dragon session file, as described in the previously submitted application dealing with permanently aligning utterances to their associated audio, or by other means.

If the user selects "OPEN IBM FIRST" 1804, the text file transcribed using IBM Viavoice™ is loaded into windows 602 and 608, and the text file transcribed using Dragon NaturallySpeaking™ is loaded into secondary transcribed text window 604. The text file in window 604 may then be substituted with a previously created text file, allowing the user to compare the previously created text file with the text file transcribed using IBM ViaVoice™.

Using text comparison, the correctionist may create verbatim and final text 606, 608. In the final text window 608, the can enter field names and the appropriate text. As is well known to those experienced in the art, the text can we arranged so as to facilitate subsequent formatting of the report or document on a standard word processor such as Microsoft Word™ or Corel WordPerfect™ using a transcription shell. As is well known, the formatting could also be performed by creating programming scripts using the techniques of "regular expressions" programming to rearrange and format the text into a completed, polished document. This might require that the correctionist follow a certain structure when correcting and editing the text in the final text window. The correctionist might have to enter the field name with the associated dictated text and place each on a separate line, or other structure as the post-processing program may require. For example, the correctionist might have to "Patient Name: John Doe" on one line, "Medical Record Number: 222-33-4444" on the next, "Date of Birth: Jan. 1, 1960," on the next and so on. Using post-processing software such as Document Processor Server or other similar application, a polished and completed report with transcription "shell" and other formatting can be automatically created on a workflow. Those with sufficient knowledge in the art will understand that these and a number of alternatives exist for post-processing and formatting the text once it has been corrected in the final text window 608.

As is the case using single-engine mode, the current invention using dual-engine mode affords the dictating user considerable flexibility. Dictation may occur at a computer, or off-site using a telephone, handheld recorder, or other mobile device. Furthermore, the use of editor helps insure that dictated text will be associated with the appropriate field. Text comparison with a paste function also promotes more rapid edit of the transcribed text.

8. Creation of a Second Generation Session File

Figure 32:
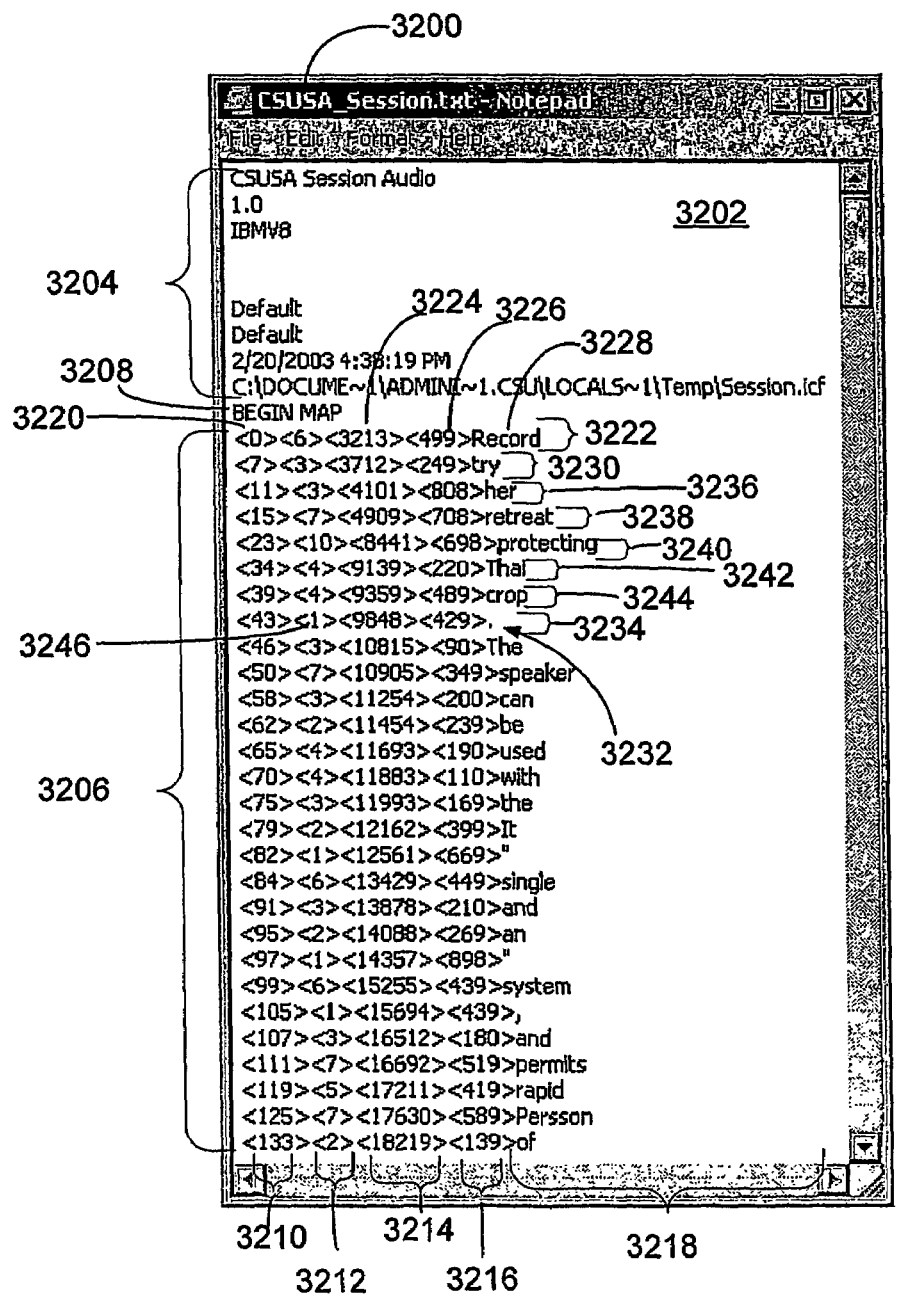
FIG. 32 depicts an exemplary primary session file 3202 produced by the speech editor in FIG. 2.

As described above, the speech editor 225 may be used to compare speech recognition text in primary transcribed text 602 window (FIG. 6) to a secondary transcribed 604 text from any source, including, but not limited to, a previously transcribed text from another audio source (such as discussed in section 6) or form (such as described in section 7). When a primary transcribed 602 text window is loaded with text from a primary session file (e.g., as shown in FIG. 32), the speech editor 225 sets the verbatim 606 and final 608 texts to initially be identical to the primary transcribed text 602 before allowing the user to modify either the verbatim 606 or final text 608. Using the speech editor 225, the user may then open a secondary transcribed 604 text from any source, and load this text into the final 608 text window. If the final text 608 window has been reloaded, the primary transcribed 602 text corresponds only to the verbatim 606 text. The user may then use the speech editor 225 to compare the secondary transcribed 604 and primary transcribed 602 text, the former corresponding to the final text 608. In effect, the speech editor 225 allows the user to compare the secondary text 604 and the final text 608.

Using the techniques as described in sections (6) and (7) above, the user does not have the ability to play back audio in selected verbatim text 606 or final text 608 when the speech editor 225 is reopened with the saved verbatim text 606 or final text 608. If the selected text from any source loaded into the secondary transcribed 604 window represents a verbatim 606 or final 608 text derived from comparing two previous session files in the primary 602 and secondary 604 windows, the user cannot select any part of the derived verbatim text 606 or final text 608 that has been loaded into secondary transcribed 604 text windows and play back audio associated to that text. In this instance, the loaded text (e.g., the derived verbatim text 606 or final text 608) is a text file only.

Also, using only the techniques as described in sections (6) and (7) above, the speech editor 225 allows the user to reload (e.g., after restarting the speech editor) a primary session file that was used to create and store the verbatim text 606 and final text 608 into the primary transcribed 602 window. The speech editor 225 then allows the user to load the previously created verbatim 606 or final 608 text into the secondary transcribed 604 window to cause the speech editor 225 to load this text (i.e., the previously created text verbatim 606 or final text 608) into the final text 608 window. Using the speech editor 225, the user may play back the audio associated with this primary session file in the primary transcribed 604 window, but not the audio associated with the verbatim 606 or final 608 text that was previously created by comparing two primary session files.

Thus, without implementing the methods and systems discussed herein for generating a second generation session file, the user cannot reopen the speech editor 225 and compare a previously created verbatim or final text with a form and listen to the audio associated with the verbatim or final text. In addition, without generating a second generation session file, the user is not able to reopen the speech editor 225 and view a previously created verbatim text to quickly and easily confirm that the selected verbatim text corresponds to what the speaker actually said.

To permit the user to reopen the speech editor 225, select text from previously created verbatim 606 or final 608 text, and play back the associated audio, the speech editor 225 as described below allows the user (e.g., a transcriptionist editor) to form a second generation session (.sx2) file from a verbatim or final text file. The speech editor 225 enables the user to select text associated with the second generation session (.sx2) file and to listen to the corresponding portion of the audio file. If the verbatim 606 or final 608 text represent uncorrected text from the primary session file originally appearing in the primary transcribed text 602 window, then the text in the second generation session (.sx2) file will be the same as in the original primary session file.

By way of illustration, an audio file may be transcribed by the two speech engines Dragon NaturallySpeaking™ and IBM ViaVoice™. The primary transcribed text 602 may represent either the "Dragon" or "IBM" text loaded by the speech editor 225, depending upon the selection of the user of the speech editor 225 of which source to designate as "primary" and "secondary." In this illustration, the secondary transcribed text 604 will represent the text derived from the other speech recognition engine as loaded by the speech editor 225. Consequently, if the verbatim text 606 and final text 608 are not modified by the user, they will represent the "Dragon" or "IBM" text, depending upon the user's initial choice of "primary" and "secondary." In "single-engine" mode, the uncorrected text would represent the "Dragon" or "IBM" text only, depending upon which speech recognition engine transcribed the audio. As noted, other speech recognition engines could be used to transcribe the audio file, and the references to the Dragon NaturallySpeaking™ or IBM ViaVoice™ speech recognition engines are illustrative only, and not intended to limit the scope or usefulness of the present invention.

By allowing a user to generate a second generation session (.sx2) file from the primary session file as described in detail below, the speech editor 225 associates audio corresponding to the primary session file with previously created verbatim 606 or final 608 texts. Using the speech editor 225, a user is able to open the second generation session file generated from the verbatim 606 or final 608 text in the primary transcribed 602 or secondary transcribed 604 text window, select a word or phrase, and play back the audio for the selected text. The speech editor 225 also allows the user to compare text from the second generation session file to the following, among other text documents: (1) text from a manual transcription of the same audio file associated with the second generation session file, or a different audio file, (2) a form 2100 or modified form 2200, (3) text from a compressed session file (.csf) derived from Dragon or IBM speech engines, or (4) text from a native Dragon (.dra) session file. As one skilled in the art will appreciate, methods and systems consistent with the current invention for generating and using a second generation session file may be applied not only to Dragon and IBM speech engines, but also to any speech engine that creates a primary session file.

To compare texts (1) or (2) with a second generation session file as described in further detail below, the user causes the speech editor 225 to load the secondary generation session file as the primary transcribed 602 text. The speech editor 225 then initially loads the text of the second generation (.sx2) file as the verbatim 606 and final 608 texts. The user may then use the speech editor 225 via a browse feature of the speech editor 225 to locate the text file corresponding to (1) or (2), and prompt the speech editor 225 to load the located text file as secondary transcribed text 604. The speech editor 225 may then load the secondary transcribed 604 text corresponding to the located text file (1) or (2) as the final 606 text, replacing the text initially loaded by the speech editor from the second generation session (.sx2) file. As a result, before the user corrects or modifies the text in verbatim or final text windows 606 or 608, the primary transcribed 602 text has the same text as the verbatim 608 text and the secondary transcribed 604 text has the same text as the final 606 text.

To compare texts (3) or (4) with a second generation session file, the speech editor 225 allows the user to load the secondary generation session file as either the primary transcribed 602 or secondary transcribed 604 texts. Depending upon which option is chosen, the compressed session (.csf) file or Dragon (.dra) session file may then be loaded by the speech editor 225 into the primary 602 or secondary 604 transcribed texts.

Figure 28A:
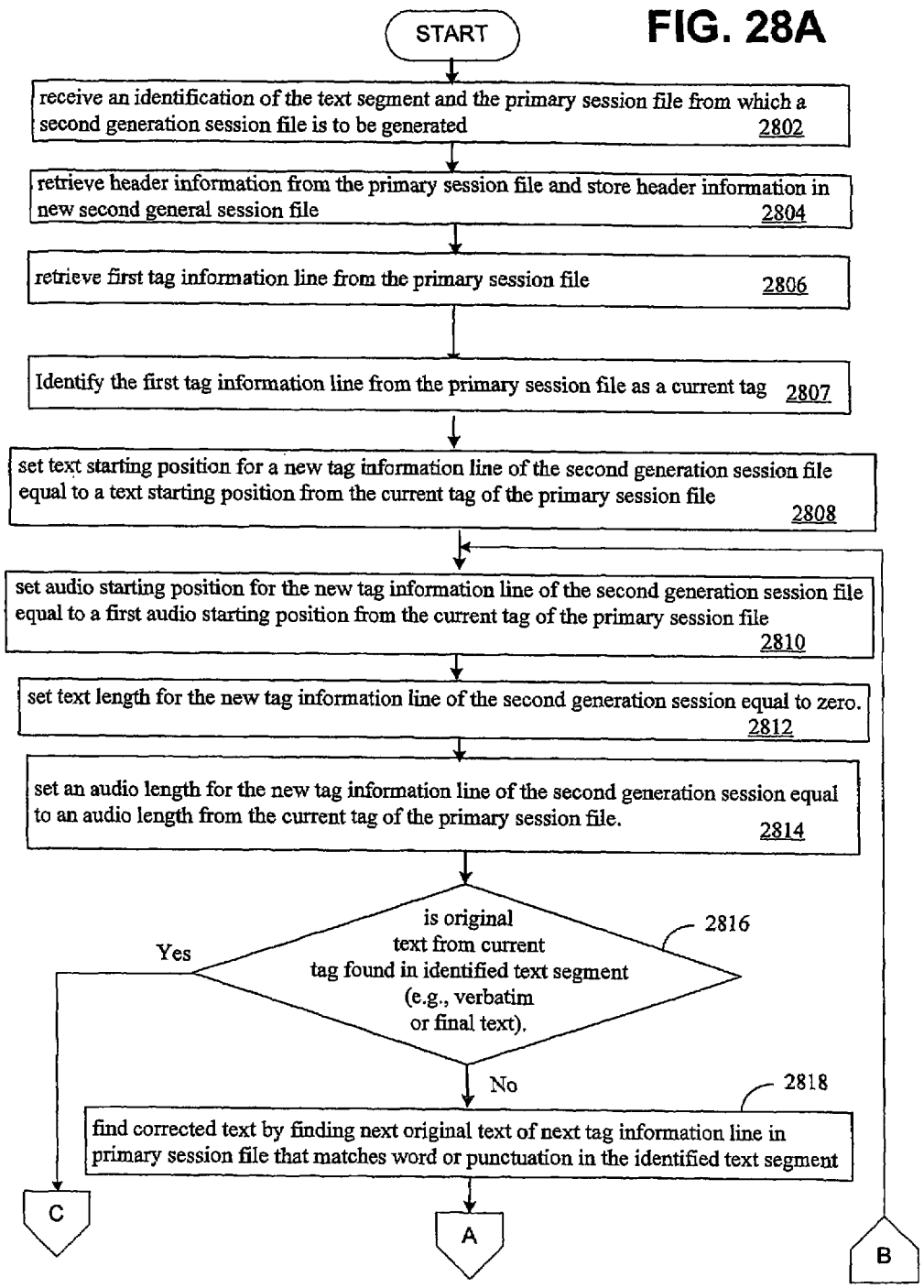
FIGS. 28A-B depicts a flow diagram illustrating an exemplary process performed by the speech editor 225 to generate a second generation session file.
Figure 28B:
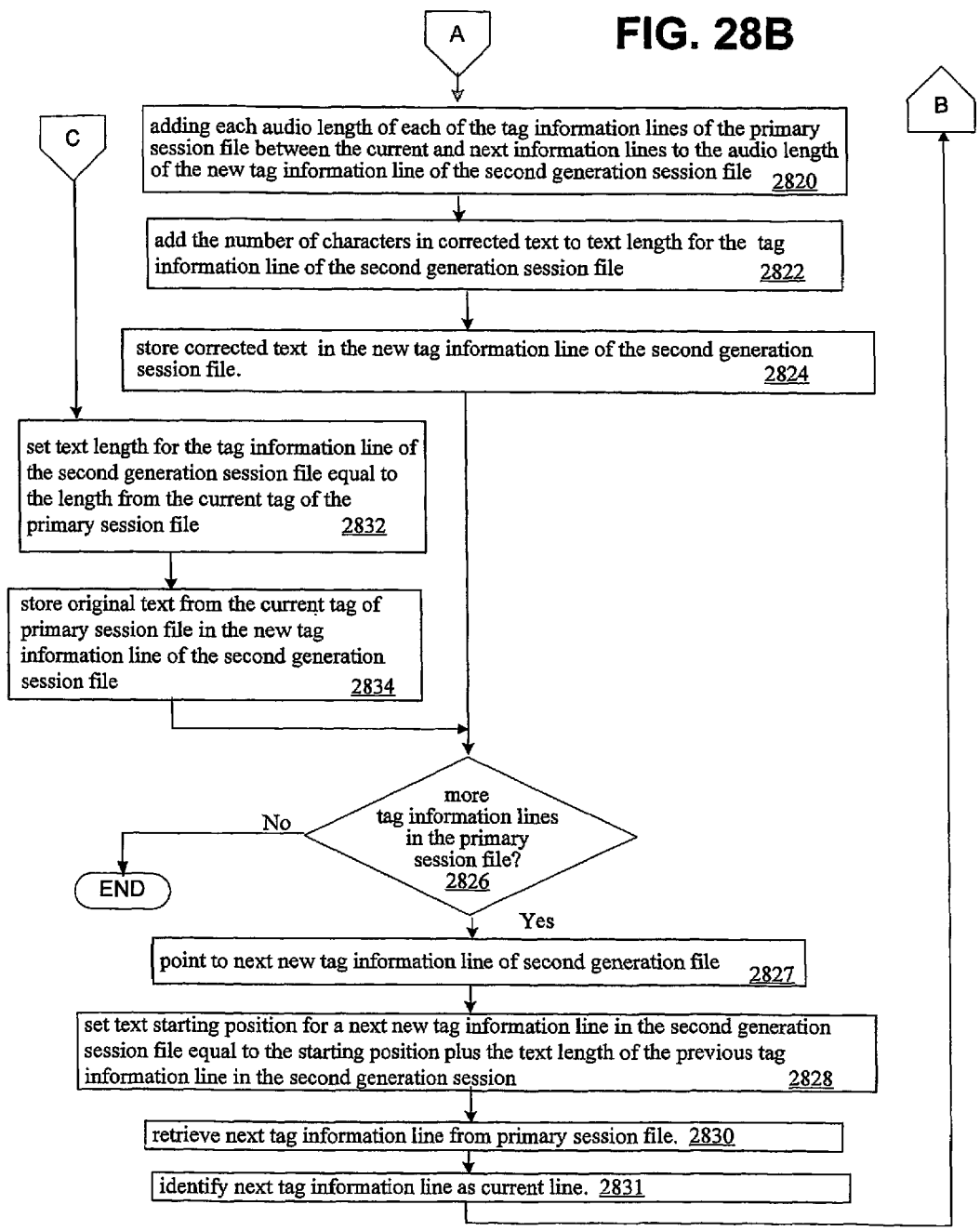
Figure 29:
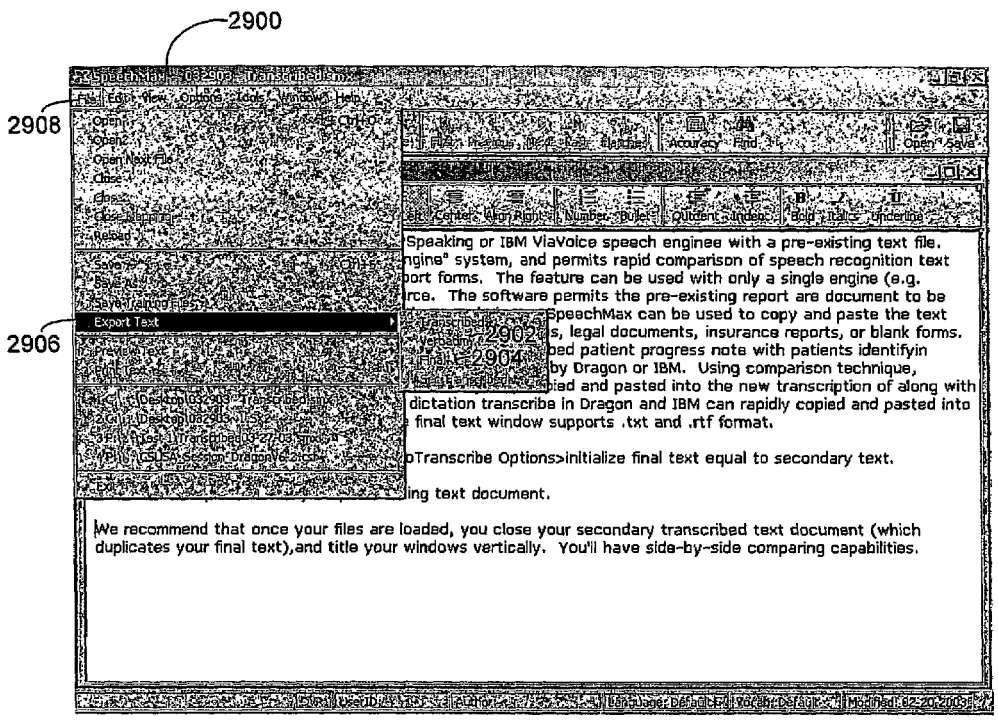
FIG. 29 is an example of an exemplary user interface display 2900 generated by the speech engine in FIG. 2 to allow a user to identify verbatim text or the final text to the speech editor 225 for generating a second generation session file.
Figure 30:
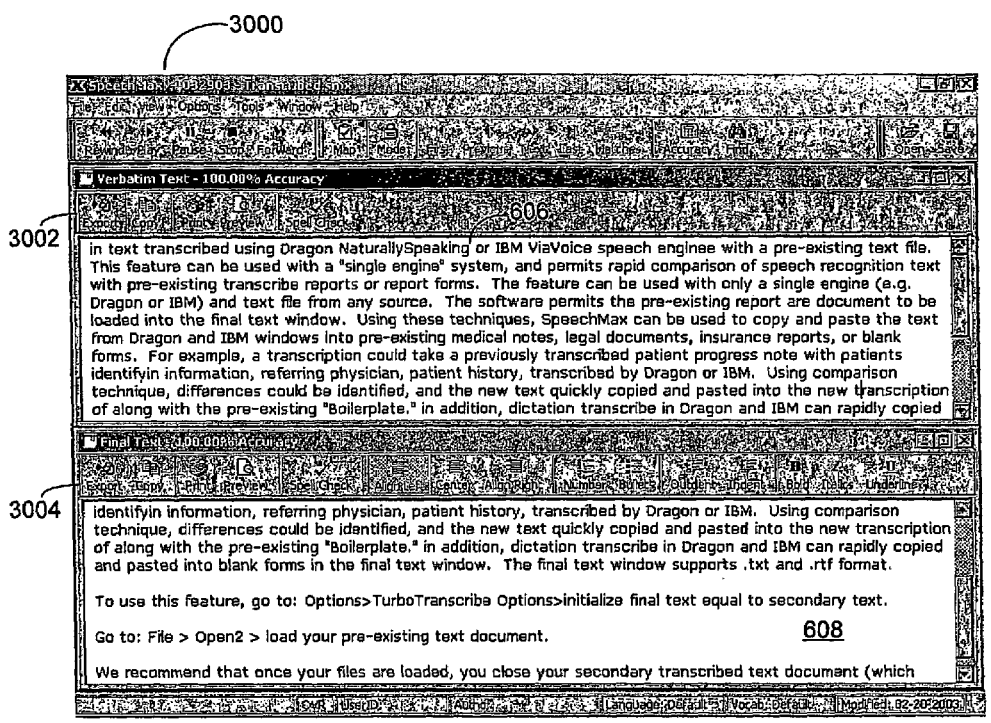
FIG. 30 is an example of another exemplary user interface display 3000 generated by the speech engine in FIG. 2 to allow a user to identify verbatim text or the final text to the speech editor 225 for generating a second generation session file.
Figure 31:
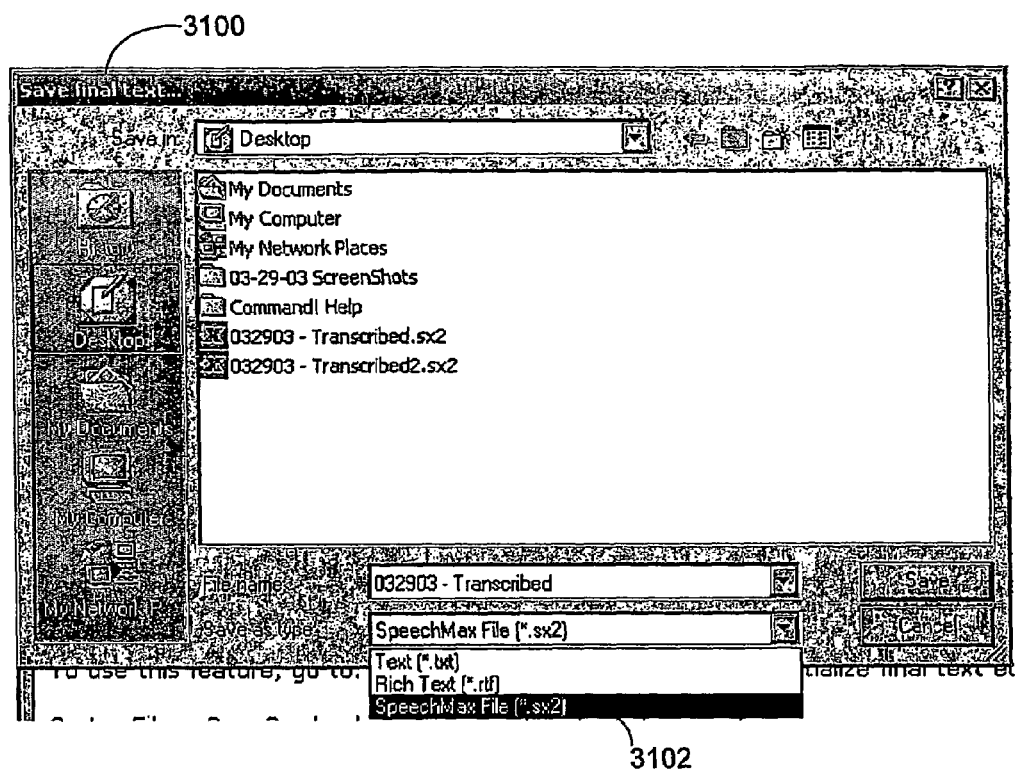
FIG. 31 is an example of an exemplary user interface display 3100 generated by the speech engine in FIG. 2 to allow a user to prompt the speech editor in FIG. 2 to create a second generation session file using the identified verbatim text or final text.

FIGS. 28A-B depict a flow diagram illustrating an exemplary process performed by the speech editor 225 to generate a second generation session file from an identified text segment (such as verbatim or final text displayed in windows 606 and 608 in FIG. 6) and an associated primary session file that includes an original audio file and transcribed text. Initially, the speech editor 225 receives an identification of the text segment (which may correspond to an utterance of an entire audio file) and the primary session file from which a second generation session file is to be generated. (Step 2802). As discussed above, the speech editor 225 allows a user to generate verbatim text 606 and/or final text 608 from a transcribed text 602 associated with a primary session file generated by a speech recognition engine, such as the Dragon NaturallySpeaking™ speech engine or the IBM ViaVoice™ speech engine. In an exemplary implementation shown in FIG. 29, the user may then feed either the verbatim text 606 or the final text 608 to the speech editor 225 for generating a second generation session file by selecting a corresponding option 2902 or 2904 from the Export submenu 2906 in the File menu 2908 of a user interface display 2900 generated by the speech engine 225. In another exemplary implementation shown in FIG. 30, the user may feed the verbatim text 606 or final text 608 by selecting an export button 3002 or 3004 that corresponds to the verbatim text 606 and final text 608, respectively. The speech editor 225 may then automatically generate a second generation session file for the selected verbatim text 606 or final text 608. Alternatively, as shown in FIG. 31, the speech editor 225 may generate a user interface 3100 to allow the user to designate a second generation session file option 3102 (e.g., SpeechMax (*.sx2) option) from a graphic user interface 3100 to prompt the speech editor 225 to create a second generation session file using the identified verbatim text 606 or final text 608. FIG. 32 depicts an exemplary primary session file 3202 produced by the speech editor or a known speech recognition engine such as IBM ViaVoice™ speech engine. In the implementation shown in FIG. 32, the primary session file 3202 includes header information 3204 and a group of tag information lines 3206 demarcated by key words 3208, such as "BEGIN MAP" and "END MAP" (not shown in FIG. 32). Each of the tag information lines 3206 includes <text starting position> 3210, <text length> 3212, <audio starting position in ms> 3214, <audio length in ms> 3216, and original text 3218, which may be the actual word(s) or character (or lack of word in some cases) originally transcribed from the audio (e.g., as stored at 3214) associated with the primary session file 3202.

Figure 33:
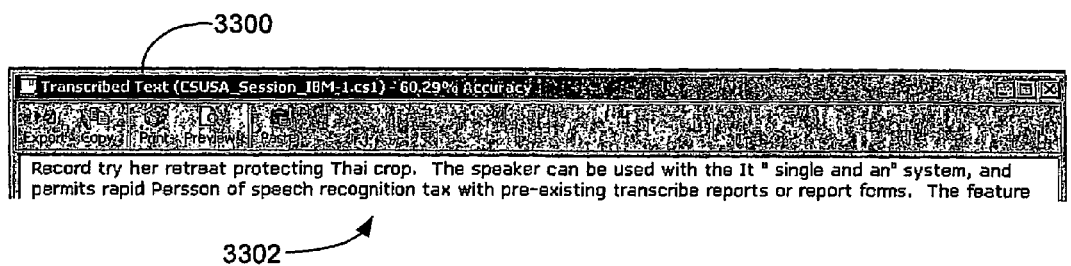
FIG. 33 depicts an exemplary user interface display 3300 generated by the speech editor to allow the user to view an original transcribed text 3302 corresponding to the original text of the primary session file in FIG. 32.

FIG. 33 depicts an exemplary user interface 3300 display generated by the speech editor 225 to allow the user to view the original transcribed text 3302 corresponding to the original text 3218 of the primary session file 3202. In the example shown in FIG. 33, the first two sentences of the original transcribed text 3302 (that has automatically been transcribed from the audio file associated with the primary session file 3202) are as follows: "Record try her retreat protecting Thai crop. The speaker can be used with the It "single and an" system, and permits rapid Persson of speech recognition tax with pre-existing transcribe reports or report forms."

Figure 34:
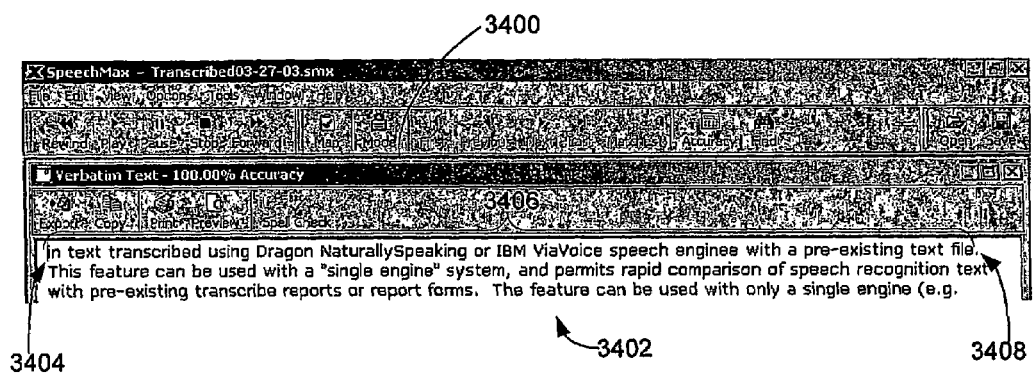
FIG. 34 depicts an exemplary user interface display 3400 generated by the speech editor to allow the user to generate verbatim text 3406 from the original transcribed text in accordance with the present invention.

FIG. 34 depicts an exemplary user interface 3400 display generated by the speech editor 225 to allow the user to generate verbatim text 3402 from the original transcribed text 3302 using methods consistent with the present invention. In the example shown in FIG. 34, the user or correctionist using the speech editor 225 has corrected the first two sentences of the original transcribed text 3302 to the following two sentences in verbatim text 3402: "In text transcribed using Dragon NaturallySpeaking™ or IBM ViaVoice™ speech enginee with a pre-existing text file. This feature can be used with a "single engine" system, and permits rapid comparison of speech recognition text with pre-existing transcribe reports or report forms." Note that the first instance of "engine" (i.e., "enginee") was misspelled by the user or correctionist in this example.

For brevity and a clear understanding of the process of FIG. 28 performed by the speech editor 225, it is assumed that the user has identified the verbatim text 3402 in step 2802 to the speech editor 225 as the text segment for generating a second generation session file. The speech editor 225 recognizes that the primary session file 3202 is associated with the verbatim text 3402.

Figure 35:
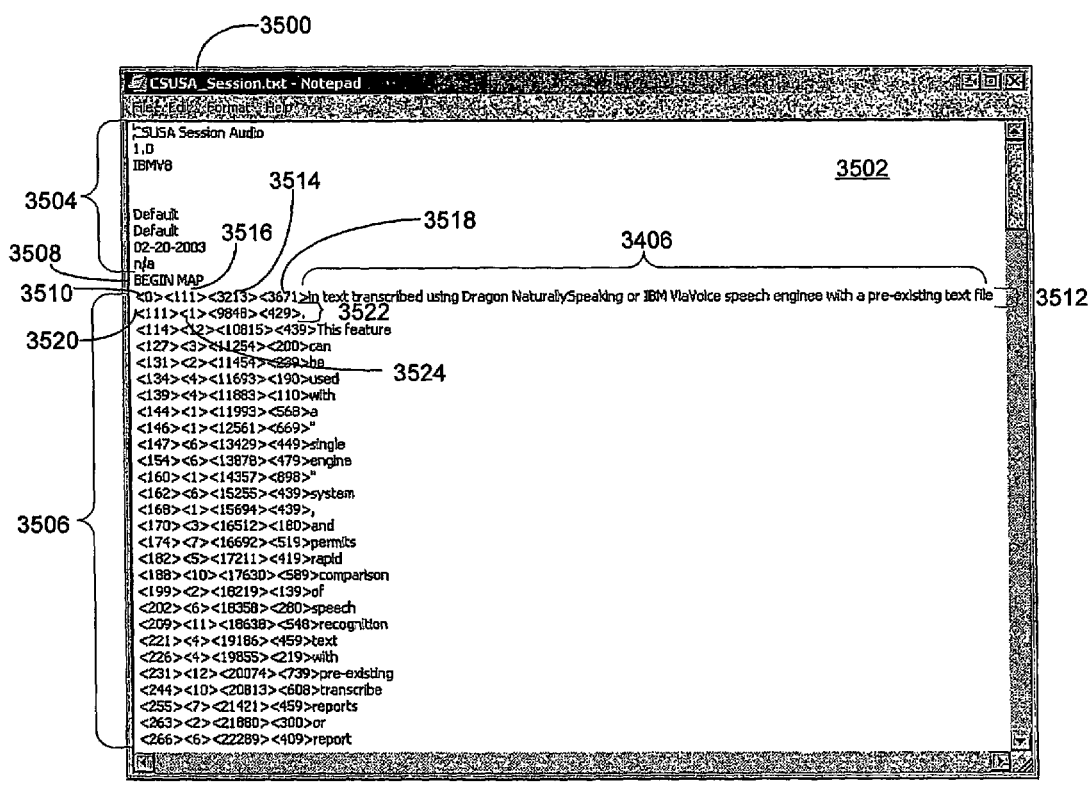
FIG. 35 depicts an exemplary secondary session file 3502 produced by the speech editor in FIG. 2 in accordance with methods and systems consistent with the present invention.

Returning to FIG. 28, the speech editor 225 next retrieves header information 3204 (FIG. 32) from the primary session file and stores corresponding header information in a new second generation session file. (Step 2804.) As shown in FIGS. 32 and 35, the speech editor 225 stores corresponding header information 3504 in new second generation session file 3502 based on the header information 3204 from the primary session file 3202. To demarcate a group of tag information lines 3205 lines created by the speech editor 225 as described below, the speech editor may bound the tag information lines by key words 3508, such as "BEGIN MAP" and "END MAP" (not shown in FIG. 35).

Next, the speech editor 225 retrieves a first tag information line 3222 from the primary session file 3202. (Step 2806) and identifies the first tag information line from the primary session file as a current tag (Step 2807). The speech editor 225 then sets a text starting position 3510 for a tag information line 3512 of the second generation session file 3502 to correspond to a text starting position 3220 from the current tag (e.g., first information line) 3222 of the primary session file 3202. (Step 2808). In the example shown in FIGS. 32 and 35, the speech editor 225 sets the text starting position 3510 of the second generation session file 3502 to zero (e.g., "<0>"), which is the corresponding text starting position 3220 from the first current tag 3222 of the primary session file.

The speech editor 225 then sets an audio starting position 3514 for the tag information line 3512 of the second generation session file 3502 to correspond to an audio starting position 3224 from the current tag 3222 of the primary session file 3202. (Step 2810). In the example shown in FIGS. 32 and 35, the speech editor 225 sets the audio starting position 3514 of the second generation session file 3502 to "<3213>," which is the corresponding audio starting position 3224 from the current line 3222 of the primary session file. The audio starting position of "<3213>" indicates that if the user wants to listen to the underlying audio, audio must start playing at 3.213 seconds into the recorded audio file.

The speech editor 225 then initially sets a text length 3516 equal to 0 (initial setting of 0 not shown in FIG. 35) (Step 2812) and sets an audio length 3518 for the tag information line of the second generation session equal to an audio length 3226 (e.g., "499" or 0.499 ms) from the current tag 3222 of the primary session file. (Step 2814). As discussed below, the speech editor 225 may adjust the text length 3516 and the audio length 3518 of the second generation session file based on a difference between the corrected text from the verbatim text 3402 and the original transcribed text 3302.

Next, the speech editor 225 determines whether the original text from the current tag of the primary session file is found in the identified text segment (e.g., verbatim or final text). (Step 2816). For example, the speech editor 225 compares the original text "Record" 3228 from the current tag 3222 of the primary session file to the identified text segment or verbatim text 3402 in FIG. 34 and finds that the original text "Record" is not present or has been replaced by at least the word "In" 3404 as shown in FIG. 34. If the original text is not found in the identified text segment, the speech editor 225 then finds a corrected text by finding the next original text of the next tag information line in the primary session file that matches a word or punctuation in the identified text segment ("the matching original text"). (Step 2818). For the example shown in FIGS. 32 and 34, the speech editor 225 finds that the next original text 3232 that matches a word or punctuation in the verbatim text 3402 is a period (".") 3232 of the current tag 3234. Thus, the speech editor 225 is able to identify the corrected text 3406, in this example, as "In text transcribed using Dragon NaturallySpeaking or IBM ViaVoice speech enginee with a pre-existing text file" but not the subsequent period ".".

The speech editor 225 then adds to the audio length for the tag information line of the second generation session file each audio length from each next tag information line of the primary session file between the current tag and the next information line (Step 2820). In the example shown in FIG. 32, the speech editor 225 is able to identify that the original text 3218 (e.g., "Record", "try", "her", "retreat", "protecting", "Thai", and "crop") of the next tag information lines 3230, 3234, 3236, 3238, 3240, 3242 has been replaced by the corrected text "In text transcribed using Dragon NaturallySpeaking or IBM ViaVoice speech enginee with a pre-existing text file" from the identified text segment or verbatim text 3402. Accordingly, the speech editor adds all the audio lengths 3216 of the these tag information lines (e.g., 249+808+708+698+220+489) to the audio length 3518 (e.g., currently "499") of the tag information line 3512 of the second generation file 3502 to obtain the result <3671> as shown in FIG. 35. The audio length 3518 tag of "<3671>" indicates to play the audio for 3.671 seconds in order to hear the uttered audio corresponding to the corrected text 3406.

The speech editor 225 also adds the number of characters in the corrected text to the text length for the tag information line of the second generation session file. (Step 2822.) Continuing with the example shown in FIG. 32, the speech editor 225 adds the number of characters in the corrected text 3406 to the text length 3516 for the tag information line 3512 of the of the second generation file 3502 to obtain the result "<111>" as shown in FIG. 35. The text length 3516 of "<111>" indicates that one hundred and eleven characters are in the corrected text 3406 that corresponds to the audio segment at starting position 3514 and having an audio length 3518 tag of 3.671 seconds.

Next, the speech editor 225 appends the corrected text 3406 to the tag information line 3512 of the second generation session file 3502. (Step 2824). In the example shown in FIG. 35, the speech editor 225 appends the following corrected text to the tag information line 3512: "in text transcribed using Dragon NaturallySpeaking or IBM ViaVoice speech engine with a pre-existing text file".

Next, the speech editor 225 determines whether there is there more tag information lines in the primary session file. (Step 2826.) The speech editor 225 recognizes that there is at least one more tag information line if the demarcating key word 3508 (e.g., "END MAP") has not been reached. Alternatively, the speech editor 225 may attempt to retrieve a next tag information line, such as the tag information line 3234 that the speech editor 225 previously recognized as having original text 3232 or a period that matched a word or punctuation in the verbatim text 3402 of FIG. 34.

If there are more tag information lines in the primary session file, the speech editor 225 creates and points to a next new tag information line in the second generation session file (Step 2827). The speech editor 225 then sets the text starting position for the next tag information line in the second generation session file equal to the starting position plus the text length of the previous tag information in the second generation session (Step 2828). In the example shown in FIG. 35, the text editor 225 sets the next text starting position 3520 equal to the starting position 3510 (e.g., zero or "<0>") plus the text length 3516 (e.g., "<111>") of the previous tag information line 3512. If the last character of the previous tag information line is a period ("."),the text editor 225 may adjust the text starting position for the next tag information line by two to accommodate two spaces before the next word following a period. If the last character of the previous tag information line is letter or number, the text editor 225 may adjust the text starting position for the next tag information line by one to accommodate a single space before the next word or number.

The speech editor then retrieves the next tag information line from the primary session file (Step 2830), identifies the next tag information line of the primary session file as the current line (Step 2831), and continues processing at step 2810. The speech editor is able to recognize that the next tag information line of the primary session file is the next tag information line following the current line when original text from the current tag is found in the identified text segment in step 2816. The speech editor is also able to recognize that the next tag information line of the primary session file is the next tag information line that has a respective original text portion found in the text segment.

If the speech editor 225 finds that the original text from the tag information line of the primary session file is in the identified text segment, the speech editor 225 then sets the text length for the tag information line of the second generation session file equal to the corresponding text length from the tag information line of the primary session file. (Step 2832.) In the example shown in FIG. 32, the speech editor 225 processes the tag information line 3234 as the next tag information line and recognizes in step 2816 that the original text 3232 or a period (e.g., ".") of the current tag (e.g., tag information line 3234) that matches the period 3408 after the corrected text 3406 in the identified text segment or verbatim text 3402 in FIG. 34. The speech editor 225 subsequently sets the text length 3524 for the tag information line 3522 of the second generation session file equal to the corresponding text length 3246 of the current tag 3234 of the primary session file 3202.

Next, the speech editor 225 stores the original text 3232 from the current tag (e.g., tag information line 3234) of the primary session file 3202 in the new tag information line 3522 of the second generation session file 3502. (Step 2834). The speech editor 225 then continues processing at step 2826 to determine if there are more tag information lines in the primary session file. If there are no more tag information lines in the primary session file, the speech editor 225 ends processing.

By performing the process of FIG. 28, the speech editor 225 generates the second generation session file 3502 based the identified text segment, such as verbatim text 3402 and the associated primary session file 3202.

After the second generation session file has been generated, the user may use the speech editor 225 to load the second generation session file as primary text 602 to generate a corresponding verbatim 606 from the second generation session file, or to load the second generation session file as secondary text 604 to generate a corresponding final text 608 from the second generation file (in this implementation, the speech editor 225 does not allow the final text 608 to be overwritten when text from a form, document, or another session file is loaded by the speech editor as primary text 602 in response to a user prompt). Thus, the speech editor 225 may load the secondary session text (e.g., text 3406 in FIG. 35) associated with the second generation session file as either primary text 602 or secondary text 604 for comparison to another form or document.

Figure 36:
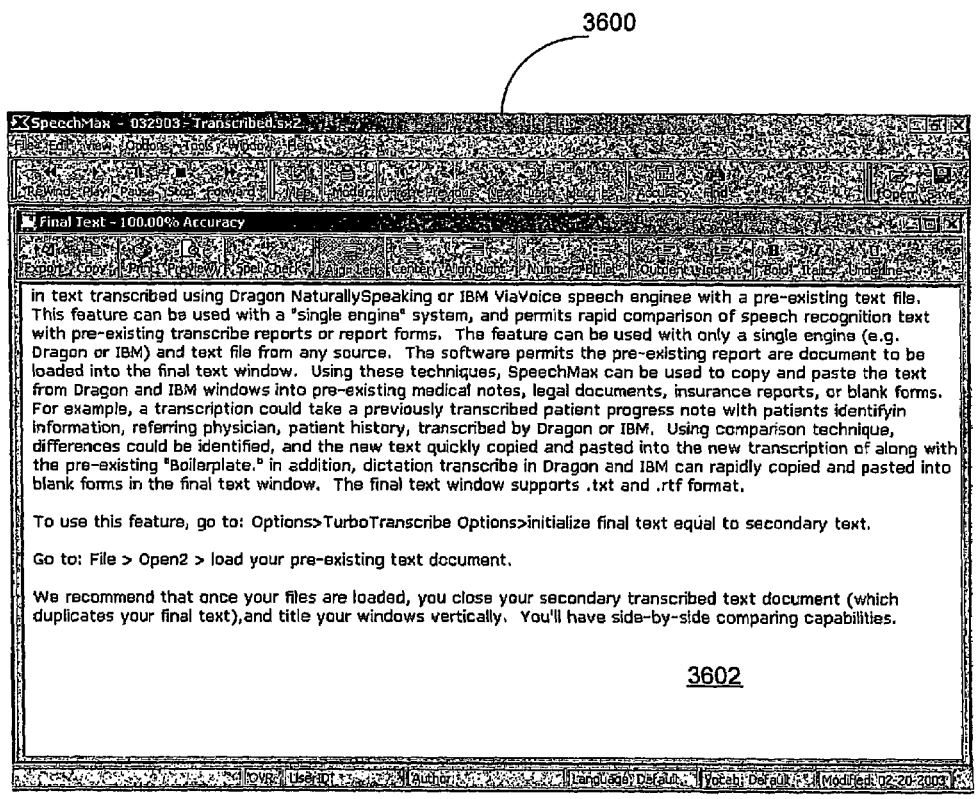
FIG. 36 depicts an exemplary user interface display 3600 generated by the speech editor to allow a user to generate and view final text 3602 from the second generation session file in accordance with methods and systems consistent with the present invention.

In one exemplary embodiment shown in FIG. 36, the speech editor 225, in accordance with methods consistent with the present invention and discussed herein, generates the final text 3602 from the text associated with the second generation session file 3502 when loaded as secondary text 604. Using the speech editor 225, a user may then compare the final text 3602 from the second generation session file to verbatim text 606 produced by the speech editor 225 when another second generation session file, a primary session file, a text file (e.g., an ASCII txt or rich text file), or a native Dragon session (.dra) file is loaded as primary text 602.

Creation of a second generation session file for verbatim and final text using the speech editor 225 has several advantages over the previously disclosed processes and other prior art. One object is to facilitate a two-stage editing process, especially as it relates to form completion.

Under the current disclosure, the first transcriptionist may use speech editor 225 to prepare verbatim 606 and final 608 text. Each of these files can now be saved using the speech editor 225 as part of a second generation session file with the associated audio. The same transcriptionist or another can open the second generation file (.sx2), and compare another text using the speech editor 225. This text may be an incomplete form.

In section 7 above, comparison of text with a form 2100 or modified form 2200 in the final text 608 window is described. This form lists key words (or "variables" or "fields") line by line. With the second generation session file loaded into the primary transcribed 602 window, not only can the editor see the dictated key word and its associated text in the primary 602 transcribed text window, but he or she can play back the audio for a selected word or phrase, and confirm that the previously transcribed text following the key word is what the speaker actually said. For example, the text in the second generation session file may be "Patient Name: John Doe". The editor can select "John Doe" in the speech editor 225, play back the associated audio, and confirm that the original speaker said "John Doe" after the key words "Patient Name," not for example, "Don Snow."

As described in section 7 above, text data for each field, key word, or variable name in the completed form 2400 may also be post-processed to extract the data for entry into a database, spreadsheet, text processor template, electronic form produced by OCR software, or other options. This post-processing can be performed using document processor server software available from Custom Speech USA, Inc. (Crown Point, Ind.), or other standard document processing and data extraction applications, as those skillful in the art will readily understand. Therefore, use of a second generation session file becomes a valuable tool in correcting data entered by voice using free form dictation and, ultimately, entering that data into a database for further processing and distribution.

Similarly, the second generation session file permits a party reviewing a supposedly verbatim text to more quickly determine if the transcribed word or phrase corresponds to the spoken word. The process of proofing text with reference to the audio envisions using the speech editor 225. This text will often be returned to the original speaker or another party to "sign-off" on the report or document. If the person who is entrusted with approving the text cannot hear or remember what the dictating speaker actually said, he or she cannot know whether the transcription prepared by the correctionist using the speech editor was verbatim, or even faithful to the speaker's intent. While the reviewer can play back the audio using a standard software sound recorder, it may be time consuming to find the exact location of the audio that corresponds to the text in a lengthy dictation. Using the speech editor 225, however, the reviewer may open the second generation session file as a primary 602 or secondary 604 transcribed text, select the displayed text in the verbatim 606 or final 608 text windows, immediately play back the corresponding audio, and make corrections in the modifiable 606, 608 windows.

For example, a lawyer who is reviewing a supposedly verbatim transcript of from a legal proceeding can select the text and listen to the associated audio to confirm that the transcription is accurate. A doctor who is asked to sign-off and approve another physician's report may have a question about a single word or phrase, not know if the doctor actually said or meant what appears in the final report, and need to hear only a small part of the dictated patient note. A law enforcement officer reviewing the on-the-scene description by a policeman may want to go back and quickly determine if the typed transcription is verbatim.

Another purpose of the invention is to facilitate training and development of speech recognition software. Here the object is quality assurance as it applies to computer-generated output. For example, a developer of speech recognition software may transcribe audio using two speech engines, such as Dragon NaturallySpeaking™ and IBM ViaVoice™, generate verbatim 606 and final 608 text using the speech editor, and save the verbatim text as a second generation session (.sx2) file. The audio may also be transcribed by a third speech engine that generates a session file readable by the speech editor 225. The second generation file can be loaded as the primary 602 or secondary transcribed 604 file and compared to the third engine's output using previously described comparison techniques. When a difference is detected, the audio from the second generation file and the third engine can be listened to quickly confirm that the differences correspond to the same audio. Those familiar with the art will recognize that the third engine may represent a new version of Dragon NaturallySpeaking™ or IBM ViaVoice™ software, or an engine from different manufacturer, such as Microsoft, Philips, ATT, or other developer.

In another exemplary embodiment, these second generation files may be easily transmitted across the internet for comparison with primary session files or text. Off-the-shelf Dragon NaturallySpeaking™ and IBM ViaVoice™ create primary session files that are quite large, as they consume about 1 MB of hard disk for each minute of dictation. Section II B (Compressed Session File) describes a method for producing a compressed session (.csf) file. The second generation session (.sx2) file may be derived from the compressed session (.csf) file as the primary session file, and therefore includes tagged audio in a compressed format.

The foregoing exemplary embodiments and explanation are not intended to be an exhaustive description of the potential uses that may be developed consistent with the scope and spirit of the present invention.

D. Speech Editor having Word Mapping Tool

Returning to FIG. 2, after the decision to create verbatim text 229 at step 228 and the decision to create final text 231 at step 230, the process 200 may proceed to step 232. At step 232, the process 200 may determine whether to do word mapping. If no, the process 200 may proceed to step 234 where the verbatim text 229 may be saved as a training file. If yes, the process 200 may encounter a word mapping tool 235 at step 236. For instance, when the accuracy of the transcribed text is poor, mapping may be too difficult. Accordingly, a correctionist may manually indicate that no mapping is desired.

The word mapping tool 235 of the invention provides a graphical user interface window within which an editor may align or map the transcribed text "A" to the verbatim text 229 to create a word mapping file. Since the transcribed text "A" is already aligned to the audio file 205 through audio tags, mapping the transcribed text "A" to the verbatim text 229 creates an chain of alignment between the verbatim text 229 and the audio file 205. Essentially, this mapping between the verbatim text 229 and the audio file 205 provides speaker acoustic information and a speaker language model. The word mapping tool 235 provides at least the following advantages.

First, the word mapping tool 235 may be used to reduce the number of transcribed words to be corrected in a correction window. Under certain circumstances, it may be desirable to reduce the number of transcribed words to be corrected in a correction window. For example, as a speech engine, Dragon NaturallySpeaking™ permits an unlimited number of transcribed words to be corrected in the correction window. However, the correction window for the speech engine by IBM ViaVoice™ SDK can substitute no more than ten words (and the corrected text itself cannot be longer than ten words). The correction windows 306, 308 of FIG. 3 in comparison with FIG. 4 or FIG. 5 illustrates drawbacks of limiting the correction windows 306, 308 to no more than ten words. If there were a substantial number of errors in the transcribed text "A" where any of those errors comprised more than ten words, these errors could not be corrected using the IBM ViaVoice™ SDK speech engine, for example. Thus, it may be desirable to reduce the number of transcribed words to be corrected in a correction window to less than eleven.

Second, because the mapping file represents an alignment between the transcribed text "A" and the verbatim text 229, the mapping file may be used to automatically correct the transcribed text "A" during an automated correction session. Here, automatically correcting the transcribed text "A" during the correction session provides a training event from which the user speech files may be updated in advance correcting the speech engine. The inventors have found that this initial boost to the user speech files of a speech engine works to achieve a greater accuracy for the speech engine as compared to those situations where no word mapping file exists.

And third, the process of enrollment—creating speaker acoustic information and a speaker language model—and continuing training may be removed from the human speaker so as to make the speech engine a more desirable product to the speaker. One of the most discouraging aspects of conventional speech recognition programs is the enrollment process. The idea of reading from a prepared text for fifteen to thirty minutes and then manually correcting the speech engine merely to begin using the speech engine could hardly appeal to any speaker. Eliminating the need for a speaker to enroll in a speech program may make each speech engine more significantly desirable to consumers.

Figure 7:
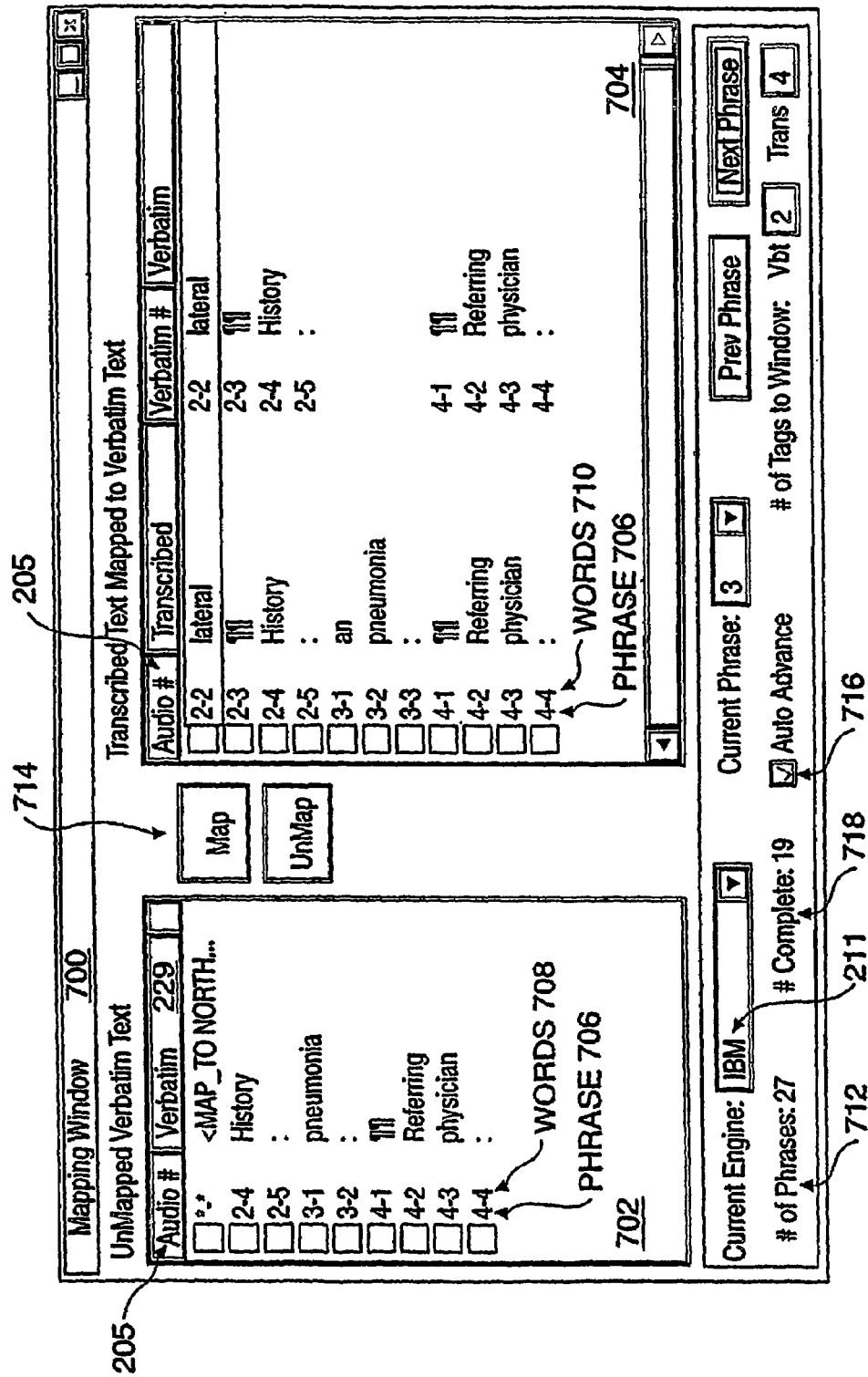
FIG. 7 illustrates an example of an exemplary graphical user interface for a mapping window 700.

On encountering the word mapping tool 235 at step 236, the process 200 may open a mapping window 700. FIG. 7 illustrates an example of a mapping window 700. The mapping window 700 may appear, for example, on the video monitor 110 of FIG. 1 as a graphical user interface based on instructions executed by the computer 120 that are associated as a program with the word mapping tool 235 of the invention.

As seen in FIG. 7, the mapping window 700 may include a verbatim text window 702 and a transcribed text window 704. Verbatim text 229 may appear in the verbatim text window 702 and transcribed text "A" may appear in the transcribed text window 704.

The verbatim text window 702 may display the verbatim text 229 in a column, word by word. As set of words, the verbatim text 229 may be grouped together based on match/difference phrases 706 by running a difference program (such as DIFF available in GNU and MICROSOFT) between the transcribed text "A" (produced by the first speech engine 211) and a transcribed text "B" produced by the second speech engine 213. Within each phrase 706, the number of verbatim words 708 may be sequentially numbered. For example, for the third phrase "pneumonia.", there are two words: "pneumonia" and the punctuation mark "period" (seen as "." in FIG. 7). Accordingly, "pneumonia" of the verbatim text 229 maybe designated as phrase three, word one ("3-1") and "." may be designated as phrase three, word 2 ("3-2"). In comparing the transcribed text "A" produced by the first speech engine 211 and the transcribed text produced by the second speech engine 213, consideration must be given to commands such as "new paragraph." For example, in the fourth phrase of the transcribed text "A", the first word is a new paragraph command (seen as "¶¶") that resulted in two carriage returns.

At step 238, the process 200 may determine whether to do word mapping for the first speech engine 211. If yes, the transcribed text window 704 may display the transcribed text "A" in a column, word by word. A set of words in the transcribed text "A" also may be grouped together based on the match/difference phrases 706. Within each phrase 706 of the transcribed text "A", the number of transcribed words 710 may be sequentially numbered.

In the example shown in FIG. 7, the transcribed text "A" resulting from a sample audio file 205 transcribed by the first speech engine 211 is illustrated. Alternatively, a correctionist may have selected the second speech engine 213 to be used and shown in the transcribed text window 704. As seen in transcribed text window 704, passing the audio file 205 through the first speech engine 211 resulted in the audio phrase "pneumonia" being translated into the transcribed text "A" as "an ammonia." by the first speech engine 211 (here, the IBM ViaVoice™ SDK speech engine). Thus, for the third phrase "an ammonia.", there are three words: "an", "ammonia" and the punctuation mark "period" (seen as "." in FIG. 7, transcribed text window 704). Accordingly, the word "an" may be designated 3-1, the word "ammonia" may be designated 3-2, and the word "." may be designated as 3-3.

In the example shown in FIG. 7, the verbatim text 229 and the transcribed text "A" were parsed into twenty seven phrases based on the difference between the transcribed text "A" produced by the first speech engine 211 and the transcribed text produced by the second speech engine 213. The number of phrases may be displayed in the GUI and is identified as element 712 in FIG. 7. The first phrase (not shown) was not matched; that is the first speech engine 211 translated the audio file 205 into the first phrase differently from the second speech engine 213. The second phrase partially seen in FIG. 7) was a match. The first speech engine 211 (here, IBM ViaVoice™ SDK), translated the third phrase "pneumonia." of the audio file 205 as "an ammonia". In a view not shown, the second speech engine 213 (here, Dragon NaturallySpeaking™) translated "pneumonia." as "Himalayan." Since "an ammonia." is different from "Himalayan.", the third phrase within the phrases 706 was automatically characterized as a difference phrase by the process 200.

Since the verbatim text 229 represents exactly what was spoken at the third phrase within the phrases 706, it is known that the verbatim text at this phrase is "pneumonia". Thus, "an ammonia" must somehow map to the phrase "pneumonia.". Within the transcribed text window 704 of the example of FIG. 7, the editor may select the box next to phrase three, word one (3-1) "an", the box next to 3-2 "ammonia". Within the verbatim window 702, the editor may select the box next to 3-1 "pneumonia". The editor then may select "map" from buttons 714. This process may be repeated for each word in the transcribed text "A" to obtain a first mapping file at step 240 (see FIG. 2). In making the mapping decisions, the computer may limit an editor or self-limit the number of verbatim words and transcribed words mapped to one another to less than eleven. Once phrases are mapped, they may be removed from the view of the mapping window 700.

At step 202, the mapping may be saved ads a first training file and the process 200 advanced to step 244. Alternatively, if at step 238 the decision is made to forgo doing word mapping for the first speech engine 211, the process advances to step 244. At step 244, a decision is made as to whether to do word mapping for the second speech engine 213. If yes, a second mapping file may be created at step 246, saved as a second training file at step 248, and the process 200 may proceed to step 250 to encounter a correction session 251. If the decision is made to forgo word mapping of the second speech engine 213, the process 200 may proceed to step 250 to encounter the correction session 251.

1. Efficient Navigation

Although mapping each word of the transcribed text may work to create a mapping file, it is desirable to permit an editor to efficiently navigate though the transcribed text in the mapping window 700. Some rules may be developed to make the mapping window 700 a more efficient navigation environment.

If two speech engines manufactured by two different corporations are employed with both producing various transcribed text phrases at step 214 (FIG. 2) that match, then it is likely that such matched phrases of the transcribed text and their associated verbatim text phrases can be aligned automatically by the word mapping tool 235 of the invention. As another example, for a given phrase, if the number of the verbatim words 708 is one, then all the transcribed words 710 of that same phrase could only be mapped to this one word of the verbatim words 708, no matter how many number of the words X are in the transcribed words 710 for this phrase. The converse is also true. If the number of the transcribed words 710 for a give phrase is one, then all the verbatim words 708 of that same phrase could only be mapped to this one word of the transcribed words 710. As another example of automatic mapping, if the number of the words X of the verbatim words 708 for a given phrase equals the number of the words X of the transcribed words 710, then all of the verbatim words 708 of this phrase may be automatically mapped to all of the transcribed words 710 for this same phrase. After this automatic mapping is done, the mapped phrases are no longer displayed in the mapping window 700. Thus, navigation may be improved.

Figure 8:
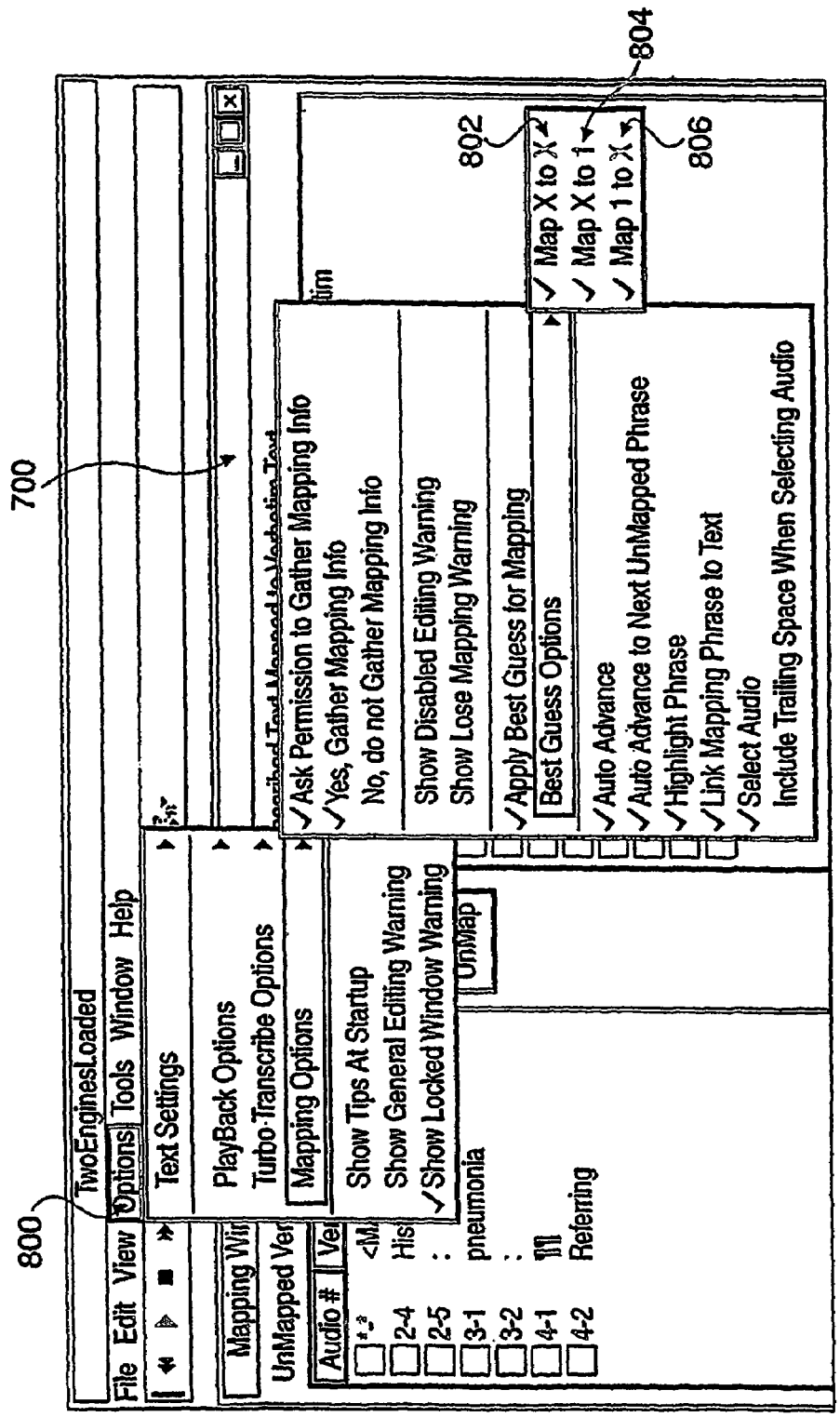
FIG. 8 illustrates options 800 having automatic mapping options for the word mapping tool 235 of the invention.

FIG. 8 illustrates options 800 having automatic mapping options for the word mapping tool 235 of the invention. The automatic mapping option Map X to X 802 represents the situation where the number of the words X of the verbatim words 708 for a given phrase equals the number of the words X of the transcribed words 710. The automatic mapping option Map X to 1 804 represents the situation where the number of words in the transcribed words 710 for a given phrase is equal to one. Moreover, the automatic mapping option Map 1 to X 806 represents the situation where the number of words in the verbatim words 708 for a given phrase is equal to one. As shown, each of these options may be selected individually in various manners known in the user interface art.

Returning to FIG. 7 with the automatic mapping options selected and an auto advance feature activated as indicated by a check 716, the word mapping tool 235 automatically mapped the first phrase and the second phrase so as to present the third phrase at the beginning of the subpanels 702 and 704 such that the editor may evaluate and map the particular verbatim words 708 and the particular transcribed words 710. As may be seen FIG. 7, a "# complete" label 718 indicates that the number of verbatim and transcribed phrases already mapped by the word mapping tool 235 (in this example, nineteen). This means that the editor need only evaluate and map eight phrases as opposed to manually evaluating and mapping all twenty seven phrases.

Figure 9:
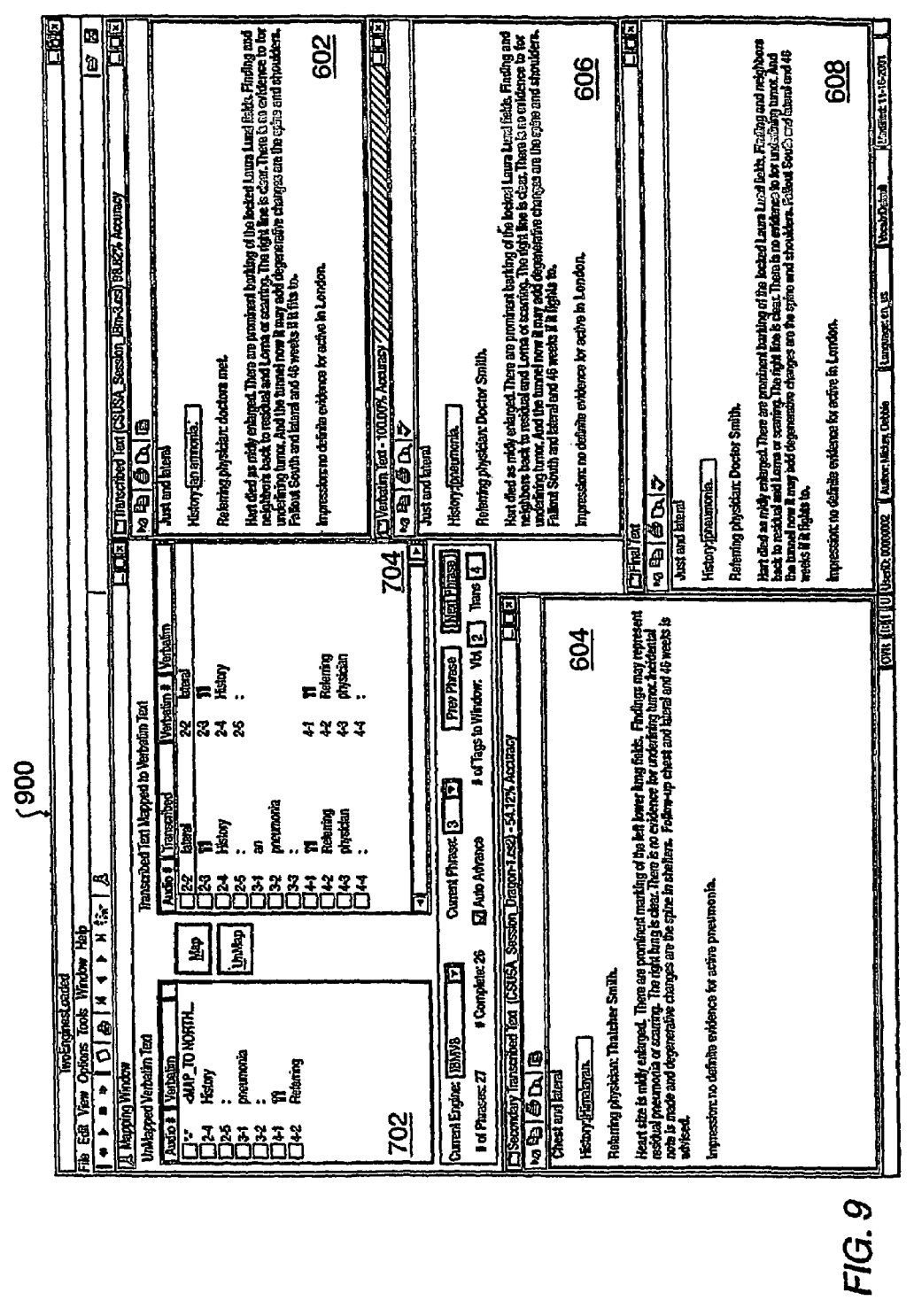

FIG. 9 of the drawings is a view of an exemplary graphical user interface 900 to support the present invention. As seen, GUI 900 may include multiple windows, including the first transcribed text window 602, the second transcribed text window 604, and two correction windows—the verbatim text window 606 and the final text window 608. Moreover, GUI 900 may include the verbatim text window 702 and the transcribed text window 704. As known, the location, size, and shape of the various windows displayed in FIG. 9 may be modified to a correctionist's taste.

2. Reliability Index

Above, it was presumed that if two different speech engines (e.g., manufactured by two different corporations or one engine run twice with different settings) are employed with both producing transcribed text phrases that match, then it is likely that such a match phrase and its associated verbatim text phrase can be aligned automatically by the word mapping tool 235. However, even if two different speech engines are employed and both produce matching phrases, there still is a possibility that both speech engines may have made the same mistake. Thus, this presumption or automatic mapping rule raises reliability issues.

If only different phrases of the phrases 706 are reviewed by the editor, the possibility that the same mistake made by both speech engines 211, 213 will be overlooked. Accordingly, the word mapping tool 235 may facilitate the review of the reliability of transcribed text matches using data generated by the word mapping tool 235. This data may be used to create a reliability index for transcribed text matches similar to that used in FIG. 6. This reliability index may be used to create a "stop word" list. The stop word list may be selectively used to override automatic mapping and determine various reliability trends.

E. The Correction Session 251

With a training file saved at either step 234, 242, or 248, the process 200 may proceed to the step 250 to encounter the correction session 251. The correction session 251 involves automatically correcting a text file. The lesson learned may be input into a speech engine by updating the user speech files.

At step 252, the first speech engine 211 may be selected for automatic correction. At step 254, the appropriate training file may be loaded. Recall that the training files may have been saved at steps 234, 242, and 248. At step 256, the process 200 may determine whether a mapping file exists for the selected speech engine, here the first speech engine 211. If yes, the appropriate session file (such as an engine session file (.ses)) may be read in at step 258 from the location in which it was saved during the step 218.

At step 260, the mapping file may be processed. At step 262 the transcribed text "A" from the step 214 may automatically be corrected according to the mapping file. Using the preexisting speech engine, this automatic correction works to create speaker acoustic information and a speaker language model for that speaker on that particular speech engine. At step 264, an incremental value "N" is assigned equal to zero. At step 266, the user speech files may be updated with the speaker acoustic information and the speaker language model created at step 262. Updating the user speech files with this speaker acoustic information and speaker language model achieves a greater accuracy for the speech engine as compared to those situations where no word mapping file exists.

If no mapping file exists at step 256 for the engine selected in step 252, the process 200 proceeds to step 268. At step 268, a difference is created between the transcribed text "A" of the step 214 and the verbatim text 229. At step 270, an incremental value "N" is assigned equal to zero. At step 272, the differences between the transcribed text "A" of the step 214 and the verbatim text 229 are automatically corrected based on the user speech files in existence at that time in the process 200. This automatic correction works to create speaker acoustic information and a speaker language model with which the user speech files may be updated at step 266.

In an embodiment of the invention, the matches between the transcribed text "A" of the step 214 and the verbatim text 229 are automatically corrected in addition to or in the alternate from the differences. As disclosed more fully in co-pending U.S. Non-Provisional application Ser. No. 09/362, 255, the assignees of the present patent disclosed a system in which automatically correcting matches worked to improve the accuracy of a speech engine. From step 266, the process 200 may proceed to the step 274.

At the step 274, the correction session 251 may determine the accuracy percentage of either the automatic correction 262 or the automatic correction at step 272. This accuracy percentage is calculated by the simple formula: Correct Word Count/Total Word Count. At step 276, the process 200 may determine whether a predetermined target accuracy has been reached. An example of a predetermined target accuracy is 95%.

If the target accuracy has not been reached, then the process 200 may determine at step 278 whether the value of the increment N is greater than a predetermined number of maximum iterations, which is a value that may be manually selected or other wise predetermined. Step 278 works to prevent the correction session 251 from continuing forever.

If the value of the increment N is not greater than the predetermined number of maximum iterations, then the increment N is increased by one at step 280 (so that now N=1) and the process 200 proceeds to step 282. At step 282, the audio file 205 is transcribed into a transcribed text 1. At step 284, differences are created between the transcribed text 1 and the verbatim text 229. These differences may be corrected at step 272, from which the first speech engine 211 may learn at step 266. Recall that at step 266, the user speech files may be updated with the speaker acoustic information and the speaker language model.

This iterative process continues until either the target accuracy is reached at step 276 or the value of the increment N is greater than the predetermined number of maximum iterations at step 278. At the occurrence of either situation, the process 200 proceeds to step 286. At step 286, the process may determine whether to do word mapping at this juncture (such as in the situation of an non-enrolled user profile as discussed below). If yes, the process 200 proceeds to the word mapping tool 235. If no, the process 200 may proceed to step 288.

At step 288, the process 200 may determine whether to repeat the correction session, such as for the second speech engine 213. If yes, the process 200 may proceed to the step 250 to encounter the correction session. If no the process 200 may end.

F. Non-Enrolled User Profile cont.

As discussed above, the inventors have discovered that iteratively processing the audio file 205 with a non-enrolled user profile through the correction session 251 of the invention surprisingly resulted in growing the accuracy of a speech engine to a point at which the speaker may be presented with a speech product from which the accuracy reasonably may be grown. Increasing the accuracy of a speech engine with a non-enrolled user profile may occur as follows.

At step 208 of FIG. 2, a non-enrolled user profile may be created. The transcribed text "A" may be obtained at the step 214 and the verbatim text 229 may be created at the step 228. Creating the final text at step 230 and the word mapping process as step 232 may be bypassed so that the verbatim text 229 may be saved at step 234.

At step 252, the first speech engine 211 may be selected and the training file from step 234 may be loaded at step 254. With no mapping file, the process 200 may create a difference between the transcribed text "A" and the verbatim text 229 at step 268. When the user files 266 are updated at step 266, the correction of any differences at step 272 effectively may teach the first speech engine 211 about what verbatim text should go with what audio for a given audio file 205. By iteratively muscling this automatic correction process around the correction cycle, the accuracy percentage of the first session engine 211 increases.

Under these specialized circumstances (among others), the target accuracy at step 276 may be set low (say, approximately 45%) relative to a desired accuracy level (say, approximately 95%). In this context, the process of increasing the accuracy of a speech engine with a non-enrolled user profile may be a precursor process to performing word mapping. Thus, if the lower target accuracy is reached at step 276, the process 200 may proceed to the word mapping tool 235 through step 286. Alternatively, in the event the lowered target accuracy may not be reached with the initial model and the audio file 205, the maximum iterations may cause the process 200 to continue to step 286. Thus, if the target accuracy has not been reached at step 276 and the value of the increment N is greater than the predetermined number of maximum iterations at step 278, it may be necessary to engage in word mapping to give the accuracy a leg up. Here, step 286 may be reached from step 278. At step 278, the process 200 may proceed to the word mapping tool 235.

In the alternative, the target accuracy at step 276 may be set equal to the desired accuracy. In this context, the process of increasing the accuracy of a speech engine with a non-enrolled user profile may in and of itself be sufficient to boost the accuracy to the desired accuracy of, for example, approximately 95% accuracy. Here, the process 200 may advance to step 290 where the process 200 may end.

G. Conclusion

The present invention relates to speech recognition and to methods for avoiding the enrollment process and minimizing the intrusive training required to achieve a commercially acceptable speech to text converter. The invention may achieve this by transcribing dictated audio by two speech recognition engines (e.g., Dragon NaturallySpeaking™ and IBM ViaVoice™ SDK), saving a session file and text produced by each engine, creating a new session file with compressed audio for each transcription for transfer to a remote client or server, preparation of a verbatim text and a final text at the client, and creation of a word map between verbatim text and transcribed text by a correctionist for improved automated, repetitive corrective adaptation of each engine.

The Dragon NaturallySpeaking™ software development kit does not provide the exact location of the audio for a given word in the audio stream. Without the exact start point and stop point for the audio, the audio for any given word or phrase may be obtained indirectly by selecting the word or phrase and playing back the audio in the Dragon NaturallySpeaking™ text processor window. However, the above described word mapping technique permits each word of the Dragon NaturallySpeaking™ transcribed text to be associated to the word(s) of the verbatim text and automated corrective adaptation to be performed.

Moreover, the IBM ViaVoice™ SDK software development kit permits an application to be created that lists audio files and the start point and stop point of each file in the audio stream corresponding to each separate word, character, or punctuation. This feature can be used to associate and save the audio in a compressed format for each word in the transcribed text. In this way, a session file can be created for the dictated text and distributed to remote speakers with text processor software that will open the session file.

The foregoing description and drawings merely explain and illustrate the invention and the invention is not limited thereto. While the specification in this invention is described in relation to certain implementation or embodiments, many details are set forth for the purpose of illustration. Thus, the foregoing merely illustrates the principles of the invention. For example, the invention may have other specific forms without departing for its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A method for creating a second file having text segments synchronized with an audio file, comprising:
    (a) receiving a text segment and a first file associated with the text segment, the first file including an audio file and at least one tag information line, each tag information line containing a respective portion of original text transcribed from the audio file and an audio length value reflecting time elapsed in the audio file corresponding to the respective original text portion;
    (b) identifying a current tag as a first of the at least one tag information lines;
    (c) storing the audio length value from the current tag in a new tag information line of the second file;
    (d) determining whether the original text portion of the current tag is found in the text segment; and
    (e) when it is determined that the original text portion of the current tag is not found in the text segment, identifying a corrected text of the text segment and adjusting the audio length value of the new tag information line of the second file to reflect time elapsed in the audio file corresponding to the corrected text.

2. A method according to claim 1, further comprising:
    (f) when it is determined that the original text portion of the current tag is found in the text segment, identifying a next of the least one tag information lines as the current tag;
    (g) when it is determined that the original text portion of the current tag is not found in the text segment, identifying a next of the least one tag information lines that has a respective original text portion found in the text segment as the current tag; and
    (h) repeating (c) through (g) until the first file has no more tag information lines.

3. A method according to claim 1, further comprising setting a text starting position for the new tag information line of the second file equal to a text starting position from the current tag.

4. A method according to claim 1, further comprising setting an audio starting position for the new tag information line of the second file equal to an audio starting position of the current tag.

5. A method according to claim 1, wherein identifying includes finding a next of the tag information lines in the first file that has a respective original text portion found in the text segment.

6. A method according to claim 5, wherein adjusting includes adding each audio length from each of the tag information lines from the first file between the current tag and the next information lines to the audio length value of the new tag information line of the second file.

7. A method according to claim 5, wherein the corrected text corresponds to a portion of the text segment that ends with the respective original text portion of the next tag information found in the text segment.

8. A method according to claim 1, further comprising:
when it is determined that the original text portion of the current tag is not found in the text segment, storing the corrected text in the new tag information line of the second file.

9. A method according to claim 1, further comprising:
when it is determined that the original text portion of the current tag is not found in the text segment, counting a number of characters in the corrected text and storing the number as a text length value in the new tag information line of the second file.

10. A method according to claim 9, further comprising storing a sum of the text starting position of the new tag information line plus the text length of the new tag information line of the second file in a text starting position for a next new tag information line of the second file.

11. A method according to claim 10, further comprising:
when it is determined that the original text portion of the current tag is not found in the text segment, incrementing the text starting position for the next new tag information line of the second file in response to determining that a last character of the corrected text is one of a period, letter, and number.

12. A method according to claim 1, further comprising:
when it is determined that the original text portion of the current tag is found in the text segment, storing the original text portion of the current tag in the new tag information line of the second file.

13. A method according to claim 1, further comprising:
when it is determined that the original text portion of the current tag is found in the text segment, setting a text length value of the new tag information line of the second file equal to a text length value of the first tag information of the first file.

14. A method according to claim 1, wherein the text segment is one of a previously created final text and a previously created verbatim text.

15. A method for creating a final text from an audio file, comprising:
receiving a preexisting file formed by:
(a) receiving a text segment and a first file associated with the text segment, the first file including an audio file and at least one tag information line, each tag information line containing a respective portion of original text transcribed from the audio file and an audio length value reflecting time elapsed in the audio file corresponding to the respective original text portion;
(b) identifying a current tag as a first of the at least one tag information lines;
(c) storing the audio length value from the current tag in a new tag information line of the preexisting file;
(d) determining whether the original text portion of the current tag is found in the text segment;
(e) when it is determined that the original text portion of the current tag is not found in the text segment, identifying a corrected text of the text segment, storing the corrected text in the new tag information line of the preexisting file, adjusting the audio length value of the new tag information line of the preexisting file to reflect time elapsed in the audio file corresponding to the corrected text, and identifying a next of the least tag information lines that has a respective original text portion found in the text segment as the current tag;
(f) when it is determined that the original text portion of the current tag is found in the text segment, storing the original text portion of the current tag in the new tag information line of the preexisting file and identifying a next of the least tag information lines as the current tag; and
(g) repeating (b) through (f) until the first file has no more tag information lines;
creating a first text file from the tag information lines of the preexisting file;
comparing the first text file with a previously created text file to determine differences between the first text file and the previously created text file, where the previously created text file corresponds to a form; and
correcting one of the first text file or the previously created text file based upon the differences to create the final text.

16. A method according to claim 15, wherein correcting includes playing back a portion of the audio file corresponding to one of the corrected texts in the preexisting file in response to a user selection of any portion of the one corrected text.

17. A computer-readable medium containing instructions that cause a data processing system to perform a method for creating a second file having text segments synchronized with an audio file, the method comprising the steps of:
(a) receiving a text segment and a first file associated with the text segment, the first file including an audio file and at least one tag information line, each tag information line containing a respective portion of original text transcribed from the audio file and an audio length value reflecting time elapsed in the audio file corresponding to the respective original text portion;
(b) identifying a current tag as a first of the at least one tag information lines;
(c) storing the audio length value from the current tag in a new tag information line of the second file;
(d) determining whether the original text portion of the current tag is found in the text segment; and
(e) when it is determined that the original text portion of the current tag is not found in the text segment, identifying a corrected text of the text segment and adjusting the audio length value of the new tag information line of the second file to reflect time elapsed in the audio file corresponding to the corrected text.

18. The computer-readable medium according to claim 17, wherein the method further comprises:
(f) when it is determined that the original text portion of the current tag is found in the text segment, identifying a next of the least one tag information lines as the current tag;
(g) when it is determined that the original text portion of the current tag is not found in the text segment, identifying a next of the least one tag information lines that has a respective original text portion found in the text segment as the current tag; and
(h) repeating (c) through (g) until the first file has no more tag information lines.

19. The computer-readable medium according to claim 17, wherein the method further comprises setting a text starting position for the new tag information line of the second file equal to a text starting position from the current tag.

20. The computer-readable medium according to claim 17, wherein the method further comprises setting an audio starting position for the new tag information line of the second file equal to an audio starting position of the current tag.

* * * * *